United States Patent
Nakano et al.

(10) Patent No.: US 7,772,739 B2
(45) Date of Patent: Aug. 10, 2010

(54) COMMUTATOR, DIRECT CURRENT MOTOR, AND MANUFACTURING METHOD OF COMMUTATOR

(75) Inventors: Yoshiki Nakano, Hamamatsu (JP); Masayuki Kuwano, Kosai (JP); Shinji Santo, Kosai (JP); Toshio Yamamoto, Kosai (JP)

(73) Assignee: ASMO Co., Ltd, Kosai-shi, Shizuoka-ken (JP)

(*) Notice: Subject to any disclaimer, the term of this patent is extended or adjusted under 35 U.S.C. 154(b) by 693 days.

(21) Appl. No.: 11/645,790

(22) Filed: Dec. 27, 2006

(65) Prior Publication Data

US 2007/0170807 A1 Jul. 26, 2007

(30) Foreign Application Priority Data

| Dec. 27, 2005 | (JP) | ............................. | 2005-375084 |
| Dec. 27, 2005 | (JP) | ............................. | 2005-375085 |
| May 9, 2006 | (JP) | ............................. | 2006-130508 |
| Aug. 23, 2006 | (JP) | ............................. | 2006-226790 |

(51) Int. Cl.
- H01R 39/04 (2006.01)
- H02K 13/00 (2006.01)
- H02K 31/00 (2006.01)
- H02K 13/04 (2006.01)

(52) U.S. Cl. ...................... 310/233; 310/148; 310/177; 310/236; 310/237

(58) Field of Classification Search ................ 310/148, 310/177, 237, 204, 233

See application file for complete search history.

(56) References Cited

U.S. PATENT DOCUMENTS

| 3,538,365 | A | * | 11/1970 | Reisnecker Ludwig | ..... 310/237 |
| 3,662,201 | A | | 5/1972 | Madsen | |
| 5,637,944 | A | * | 6/1997 | Shimoyama | ................ 310/237 |
| 5,710,473 | A | * | 1/1998 | Nobe et al. | ................ 310/236 |

(Continued)

FOREIGN PATENT DOCUMENTS

JP 11-252870 9/1999

(Continued)

OTHER PUBLICATIONS

Machine Translation JP2003259604A (2003) and JP2006325318A (2006).*

(Continued)

*Primary Examiner*—Quyen Leung
*Assistant Examiner*—Jose A Gonzalez Quinones
(74) *Attorney, Agent, or Firm*—Pearl Cohen Zedek Latzer, LLP

(57) ABSTRACT

A commutator has a tabular holding portion defining a thickness direction. A plurality of segments are arranged in one end in the thickness direction of the holding portion in a radial pattern. Each of the segments has a slidable contact surface which is perpendicular to the thickness direction. A feeding brush is brought into slidable contact with the slidable contact surface. A tabular short-circuit unit short-circuits the segments to be set to the same electric potential with each other. The short-circuit unit is arranged parallel to the slidable contact surface. Accordingly, it is possible to enlarge a cross-sectional area which is perpendicular to a current passing direction of the coupling portion while suppressing an enlargement of a dimension in the axial direction of the commutator.

22 Claims, 43 Drawing Sheets

U.S. PATENT DOCUMENTS

| | | | |
|---|---|---|---|
| 6,057,623 A | 5/2000 | Tanaka et al. | |
| 6,181,046 B1 | 1/2001 | Daikoku et al. | |
| 6,285,106 B1 | 9/2001 | Oki | |
| 6,362,555 B1 | 3/2002 | Katagiri et al. | |
| 6,756,717 B2 | 6/2004 | Yamamoto et al. | |
| 6,819,025 B2 | 11/2004 | Egawa et al. | |
| 6,836,049 B2 | 12/2004 | Terada et al. | |
| 6,903,483 B2 | 6/2005 | Yamamoto et al. | |
| 7,550,893 B2 * | 6/2009 | Aoyama et al. | 310/264 |
| 7,583,004 B2 | 9/2009 | Terada et al. | |
| 2006/0208605 A1 * | 9/2006 | Aoyama et al. | 310/264 |
| 2007/0069603 A1 | 3/2007 | Terada et al. | |

FOREIGN PATENT DOCUMENTS

| | | | |
|---|---|---|---|
| JP | 2003259604 A | * | 9/2003 |
| JP | 2005-137193 | | 5/2005 |
| JP | 2006067724 A | * | 3/2006 |
| JP | 2006325318 A | * | 11/2006 |

OTHER PUBLICATIONS

Machine Translation JP2006067724 (2006) and JP2006325318 (2006).*

Office Action of U.S. Appl. No. 10/574,430, mailed on Jan. 9, 2009.

* cited by examiner

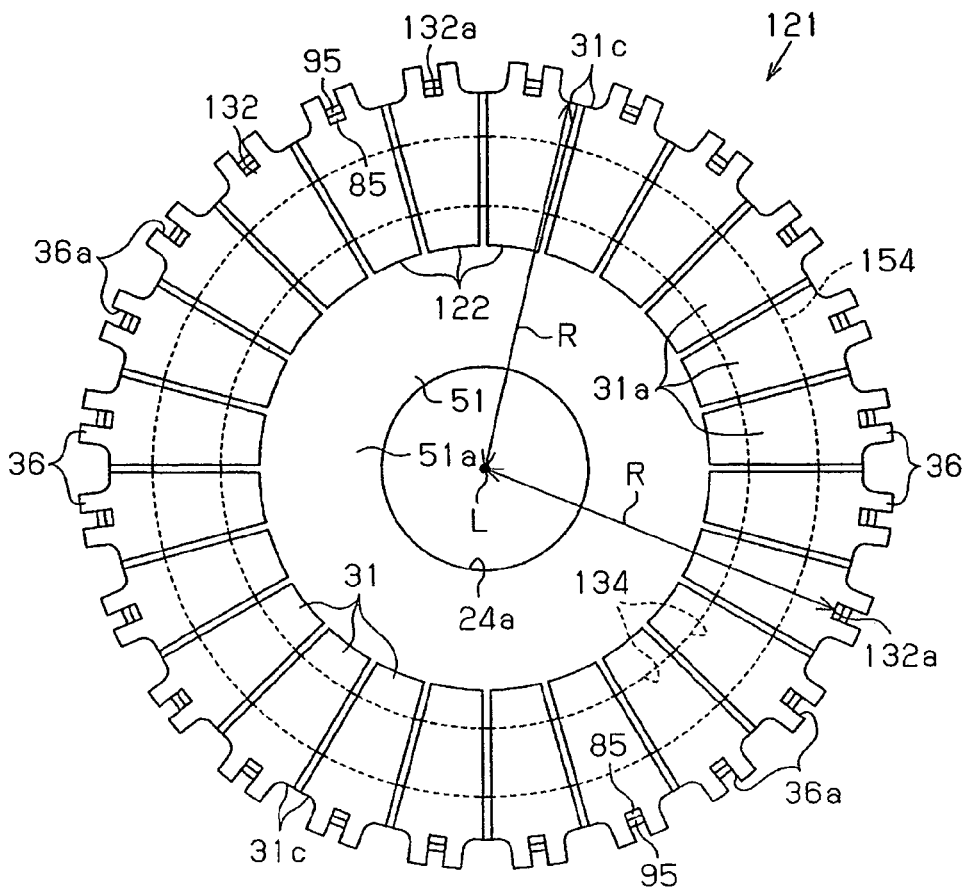
Fig.10
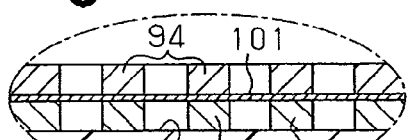
Fig.11A  Fig.11B
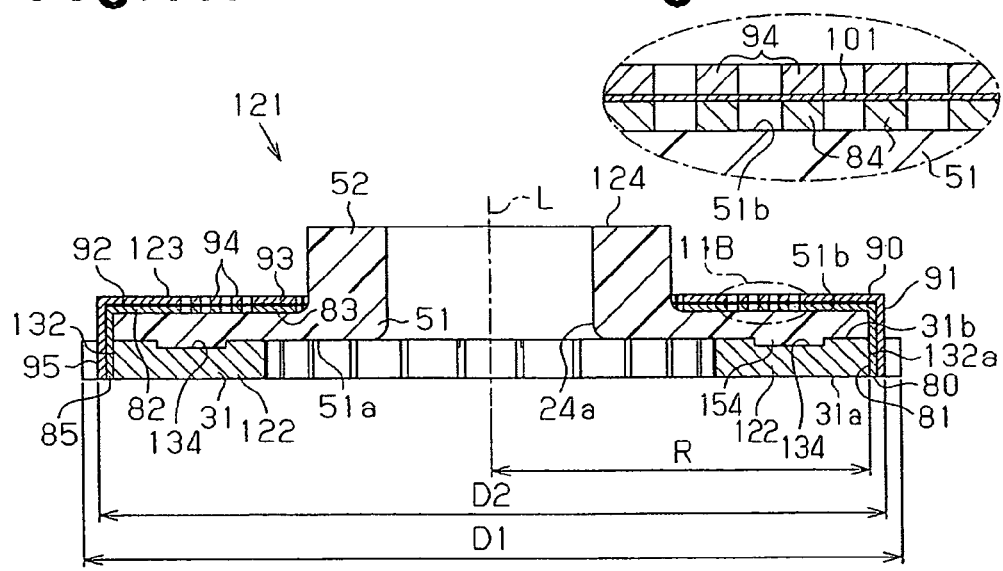

COMMUTATOR, DIRECT CURRENT MOTOR, AND MANUFACTURING METHOD OF COMMUTATOR

PRIOR APPLICATION DATA

The present application claims priority from Japanese Application No. 2005-375084, filed on Dec. 27, 2005, Japanese Application No. 2005-375085, filed on Dec. 27, 2005, Japanese Application No. 2006-130508, filed on May 9, 2006, and Japanese Application No. 2006-226790, filed on Aug. 23, 2006, all of which are incorporated by reference in their entirety.

BACKGROUND OF THE INVENTION

The present invention relates to a commutator, a direct-current motor provided with the commutator and a manufacturing method of the commutator.

Conventionally, in order to downsize a direct-current motor, it is desired to downsize a commutator provided in an armature. A commutator described in Japanese Laid-Open Patent Publication No. 2005-137193 has a cylindrical insulative holding portion fixed to a rotary shaft of an armature. A plurality of segments are distributed in a circumferential direction on an outer circumferential surface of the holding portion. A tabular short-circuit unit is arranged on one end surface in the axial direction of the holding portion. The short-circuit unit is connected to the segments.

The short-circuit unit is constituted by two short-circuit groups. Each of the short-circuit groups has the same number of outer short-circuit ends as the segments, the same number of inner short-circuit ends as the outer short-circuit ends, and the same number of coupling portions as the outer short-circuit ends. The outer short-circuit ends are arranged in a circumferential direction. The inner short-circuit ends are arranged in a circumferential direction in an inner side of the outer short-circuit ends. The coupling portion couples the outer short-circuit end to the inner short-circuit end positioned so as to be displaced by a predetermined angle in the circumferential direction from the outer short-circuit end. The inner short-circuit end, the outer short-circuit end and the coupling portion are formed on the same plane. Two short-circuit groups are laminated in such a manner that the coupling portions are directed inversely to each other. The outer short-circuit end is electrically connected to the segment. The outer short-circuit ends of two short-circuit groups are brought into contact with each other in a laminating direction. The inner short-circuit ends of two short-circuit groups are brought into contact with each other in the laminating direction. Each of the coupling portions is not in contact with each other in the laminating direction.

A tabular short-circuit unit is used for the commutator in the publication. Accordingly, for example, in comparison with the case that a conducting wire is used as the short-circuit unit, it is possible to make a structure for short-circuiting the segments to be set to the same electric potential small in the axial direction. As a result, it is possible to intend to downsize the commutator provided with the short-circuit unit in the axial direction.

In the commutator in the publication mentioned above, a plurality of segments are firmly fixed to an outer circumferential surface of the cylindrical holding portion. Accordingly, a feeding brush is brought into slidable contact with the outer circumferential surface of the commutator from a radial direction. In this case, the outer diameter of the commutator tends to become smaller at a degree of a layout space of the feeding brush. In the case that a direct-current motor is downsized in the radial direction, the outer diameter of the commutator becomes further smaller. Generally, the dimension in the radial direction of the short-circuit unit is substantially equal to the outer diameter of the commutator. Accordingly, if the outer diameter of the commutator becomes small, the dimension in the radial direction of the short-circuit unit becomes smaller. Therefore, a cross-sectional area orthogonal to a current passing direction of the coupling portion becomes smaller, an electric resistance of the coupling portion becomes larger, and the short-circuit unit tends to generate heat. Accordingly, it is desired to enlarge the cross-sectional area orthogonal to the current passing direction of the coupling portion. In order to enlarge the cross-sectional area of the coupling portion, there are considered to enlarge the dimension in the axial direction of each of the coupling portions, and to enlarge the dimension in the circumferential direction of each of the coupling portion.

However, in the case of enlarging the dimension in the axial direction of each of the coupling portions, a laminating number of the short-circuit groups is increased. In this case, not only the number of components is increased, but also the dimension in the axial direction of the short-circuit unit is increased. As a result, even in the case of using the tabular short-circuit unit, it is hard to downsize the commutator in the axial direction.

Generally, the dimension in the radial direction of the short-circuit unit is substantially equal to the outer diameter of the commutator. It is necessary to make the adjacent coupling portions in the circumferential direction non-contact. Accordingly, it is hard to enlarge the dimension in the circumferential direction of the coupling portions.

An objective of the present invention is to provide a commutator which can enlarge a cross-sectional area in a current passing direction of a coupling portion while suppressing an enlargement of the dimension in the axial direction. Further, an object of the present invention is to provide a motor provided with the commutator. Further, an object of the present invention is to provide a manufacturing method of the commutator.

SUMMARY OF THE INVENTION

In accordance with one aspect of the present invention, there is provided a commutator with which a feeding brush is brought into slidable contact. The commutator has a tabular holding portion defining a thickness direction. The holding portion has one end in the thickness direction. A plurality of segments are arranged in the one end in a radial pattern. Each of the segments has a slidable contact surface which is perpendicular to the thickness direction. The feeding brush is brought into slidable contact with the slidable contact surface. A tabular short-circuit unit short-circuits the segments to be set to the same electric potential. The short-circuit unit is arranged parallel to the slidable contact surface. The short-circuit unit includes a tabular short-circuit group. The short-circuit group includes a plurality of outer short-circuit ends, the same number of inner short-circuit ends as the outer short-circuit ends, and the same number of coupling portions as the outer short-circuit ends. The outer short-circuit ends are arranged in the circumferential direction. The inner short-circuit ends are arranged in a circumferential direction in an inner side in a radial direction than the outer short-circuit ends. Each of the coupling portions couples the outer short-circuit end corresponding thereto to the inner short-circuit end which is displaced by a predetermined angle in a circumferential direction from the outer short-circuit end. At least one of the outer short-circuit end and the inner short-circuit end is connected to the segment.

Further, in accordance with one aspect of the present invention, there is provided a direct-current motor provided with a motor housing having a cylinder portion, a magnet fixed to an inner circumferential surface of the cylinder portion, and an armature arranged in an inner side in a radial direction than the magnet. The armature has a rotary shaft, a commutator fixed to the rotary shaft, and a core fixed to the rotary shaft. The core has a plurality of teeth extending in a radial pattern, and a plurality of coils constituted by conducting wires respectively wound around the teeth. The feeding brush is brought into slidable contact with the slidable contact surface from the axial direction. The axial direction agrees with the thickness direction of the holding portion. The outer diameter of the commutator is equal to or more than the outer diameter of the core.

Further, in accordance with one aspect of the present invention, there is provided a manufacturing method of a commutator with which a feeding brush is brought into slidable contact. The manufacturing method includes arranging a plurality of segments in a radial pattern. Each of the segments has a slidable contact surface with which the feeding brush is brought into slidable contact. A plurality of the slidable contact surfaces are arranged within the same plane. A holding portion holding a plurality of the segments is formed by an insulative resin. The holding portion is formed in a tabular shape having a thickness direction which is perpendicular to the slidable contact surface. A short-circuit unit is prepared for short-circuiting the segments to be set to the same electric potential with each other. The short-circuit unit formed in a tabular shape includes a tabular short-circuit group. The short-circuit group includes a plurality of outer short-circuit ends, the same number of inner short-circuit ends as the outer short-circuit ends, and the same number of coupling portions as the outer short-circuit ends. The outer short-circuit ends are arranged in a circumferential direction. The inner short-circuit ends are arranged in a circumferential direction in an inner side in a radial direction than the outer short-circuit ends. Each of the coupling portions couples the outer short-circuit end corresponding thereto to the inner short-circuit end which is displaced by a predetermined angle in a circumferential direction from the outer short-circuit end. The short-circuit unit is arranged in a plurality of the segments in such a manner that the short-circuit unit is parallel to the slidable contact surface. The segments to be set to the same electric potential are short-circuited with each other by connecting at least one of the outer short-circuit end and the inner short-circuit end to the segment.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 10 is a bottom elevational view of the commutator in FIG. 9;

FIG. 11A is a cross-sectional view of the commutator taken along line 11A-11A in FIG. 9;

FIG. 11B is a partly enlarged view of FIG. 11A;

DETAILED DESCRIPTION OF PREFERABLE EMBODIMENTS

A description will be given of a first embodiment of the present invention with reference to FIGS. 1 to 8.

Figure 1:
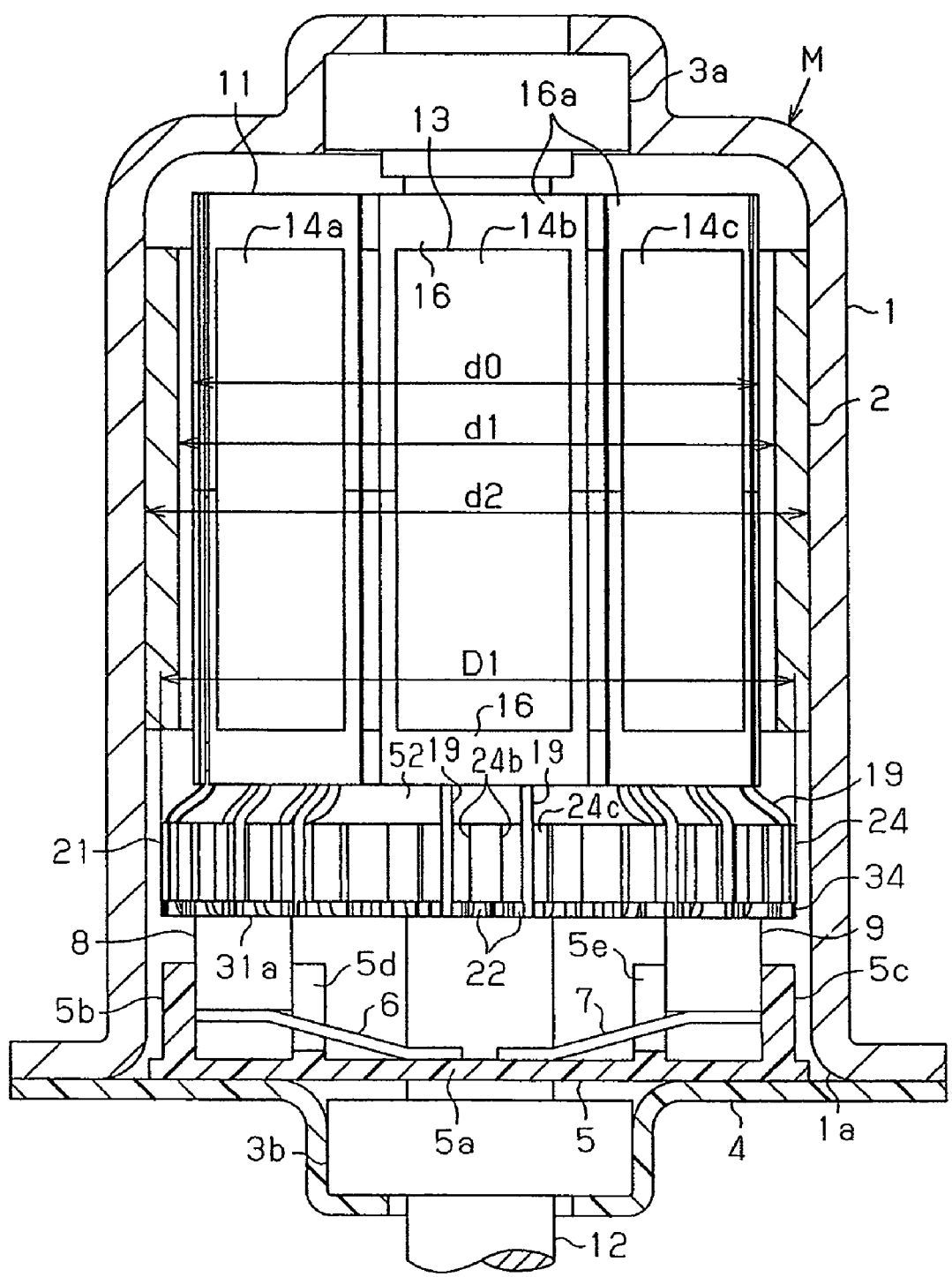
FIG. 1 is a vertical cross-sectional view of a direct-current motor in accordance with a first embodiment of the present invention.

As shown in FIG. 1, a direct-current motor M in accordance with a first embodiment has a closed-end cylindrical motor housing 1. A first bearing 3a is fixed to a center of a bottom portion of the motor housing 1. A plurality of magnets 2 are circumferentially distributed and firmly fixed to an inner circumferential surface of the motor housing 1. A plurality of magnets 2 form six magnetic poles in a circumferential direction. The dimension in a radial direction of the magnet 2 is equal to the thickness of the motor housing 1. An opening edge 1a of the motor housing 1 is closed by a disc-shaped end frame 4. A second bearing 3b forming a pair with the first bearing 3a is fixed to a center of the end frame 4.

A brush holder 5 made of a synthetic resin is fixed to the end frame 4 so as to be directed to the motor housing 1. The brush holder 5 has a disc-shaped fixed plate 5a fixed to the end frame 4, and two brush accommodating portions 5b and 5c integrally formed with the fixed plate 5a. The rectangular tubular brush accommodating portions 5b and 5c have an opening edge directed to a bottom portion of the motor housing 1. Two brush accommodating portions 5b and 5c are arranged symmetrically with respect to a center portion of the fixed plate 5a. Side walls of two brush accommodating portions 5b and 5c have insertion grooves 5d and 5e facing each other. The insertion grooves 5d and 5e extend in the same direction as a thickness direction of the fixed plate 5a.

Proximal ends of two leaf springs 6 and 7 are fixed to a center of the fixed plate 5a. The leaf springs 6 and 7 respectively extend obliquely toward the brush accommodating portions 5b and 5c from the center portion of the fixed plate 5a. The leaf springs 6 and 7 are gradually spaced away from the fixed plate 5a in accordance that they leave for their distal ends. The leaf springs 6 and 7 are respectively inserted to the brush accommodating portions 5b and 5c from the insertion grooves 5d and 5e. The distal ends of the leaf springs 6 and 7 are arranged within the brush accommodating portions 5b and 5c.

A substantially rectangular parallelepiped anode brush 8 is inserted to the brush accommodating portion 5b in a left side in FIG. 1. A substantially rectangular parallelepiped cathode brush 9 is inserted to the brush accommodating portion 5c in a right side in FIG. 1. The anode brush 8 and the cathode brush 9 can reciprocate in the axial direction of the motor. The distal ends of the leaf springs 6 and 7 are brought into contact with the anode brush 8 and the cathode brush 9. The leaf springs 6 and 7 are brought into contact with end surfaces directed to the fixed plate 5a, in the anode brush 8 and the cathode brush 9. The anode brush 8 and the cathode brush 9 are respectively energized in such a manner as to protrude from opening edges of the brush accommodating portions 5b and 5c, by the leaf springs 6 and 7. The anode brush 8 and the cathode brush 9 are connected to an external power supply apparatus.

Figure 6:
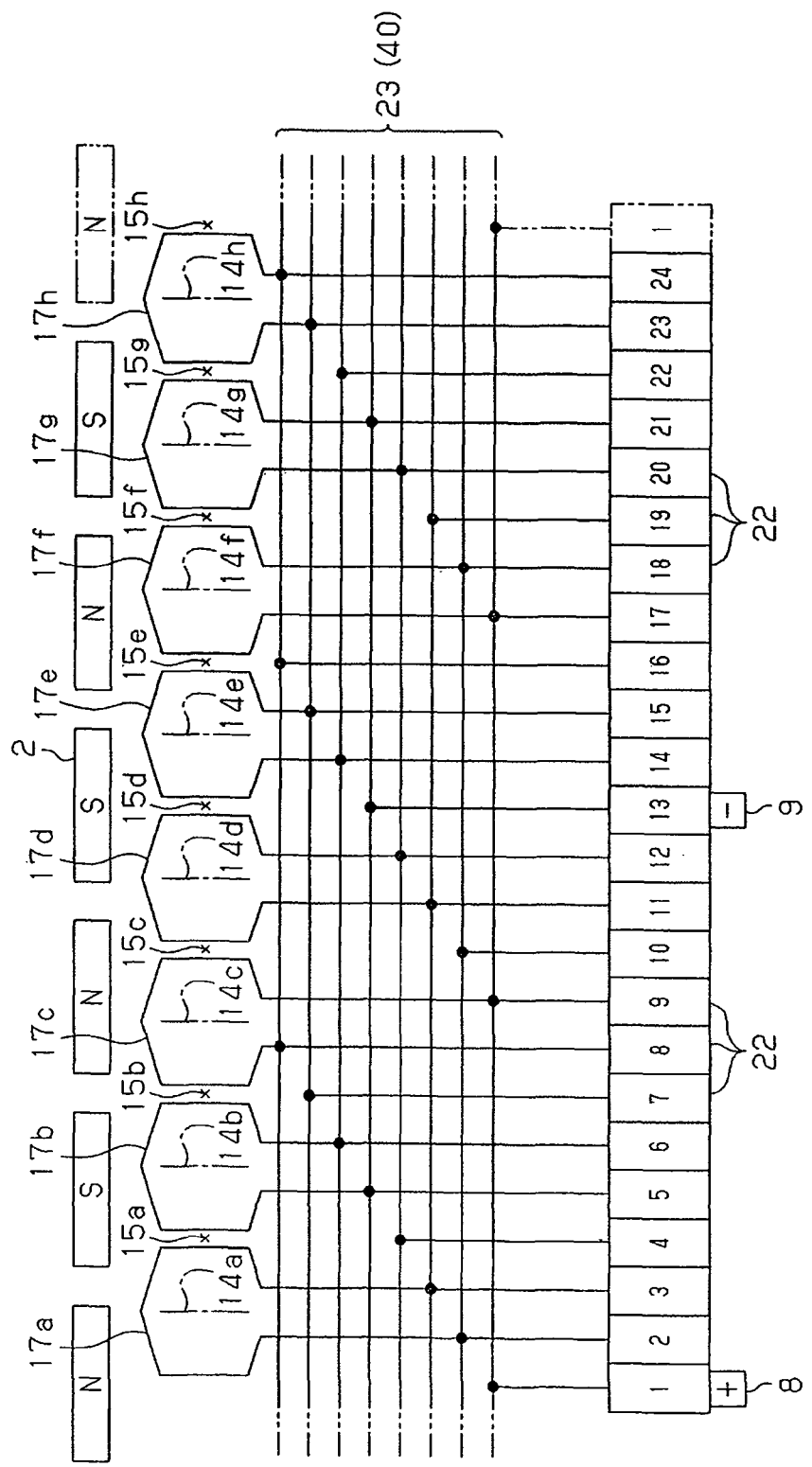
FIG. 6 is a connection diagram of the direct-current motor shown in FIG. 1.

The armature 11 is rotatably accommodated in a space surrounded by the motor housing 1 and the end frame 4. The armature 11 has a rotary shaft 12 rotatably supported by the first bearing 3a and the second bearing 3b. The rotary shaft 12 has an output end passing through a center portion of the center portions of the fixed plate 5a and the end frame 4, and exposed to an outer portion of the motor housing 1. A core 13 is fixed to the rotary shaft 12. The core 13 is adjacent to a bottom portion of the motor housing 1. The core 13 has eight teeth 14a to 14h extending in a radial pattern along a radial direction of the rotary shaft 12. A space between eight teeth 14a to 14h correspond to slots 15a to 15h. FIG. 1 shows only the teeth 14a to 14c. FIG. 6 shows the teeth 14d to 14h and the slots 15a to 15h.

As shown in FIG. 1, a pair of insulators 16 are installed to the core 13. The insulator 16 covers both ends in the axial direction of the core 13. In other words, the insulator 16 does not cover an inner circumferential surface and an outer circumferential surface of the core 13. The insulator 16 is formed by a synthetic resin having an insulating characteristic.

An outer circumferential surface of the core 13 corresponds to distal end surfaces of the teeth 14a to 14h. A first coil 17a to an eighth coil 17h are respectively wound around the teeth 14a to 14h by concentrated winding from the above of the insulator 16. The core 13 and each of the coils 17a to 17h are insulated by the insulator 16. Conducting wires of the coils 17a to 17h pass through the slots 15a to 15h existing in both sides in a circumferential direction of the respective teeth 14a to 14h.

As shown in FIG. 1, the insulator 16 has a prevention wall 16a preventing each of the coils 17a to 17h from protruding to an outer side in a radial direction. The prevention wall 16a extends in the axial direction from an outer end in a radial direction of the insulator 16.

Figure 2A:
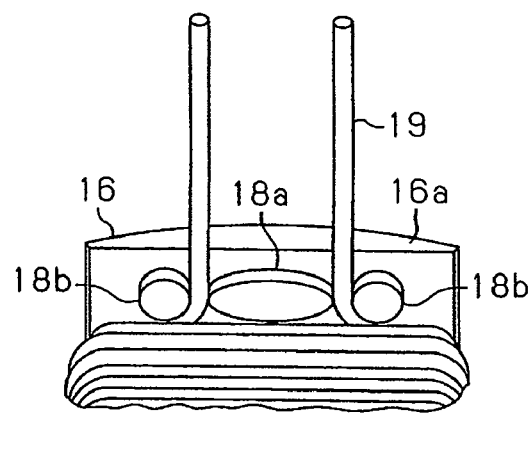
FIG. 2A is an enlarged perspective view of the insulator in FIG. 1 and shows first to second holding projections.

As shown in FIG. 2A, the prevention wall 16a has a first holding projection 18a extending to an inner side in a radial direction, and a pair of second holding projections 18b pinching the first holding projection 18a. The first holding projection 18a and the second holding projections 18b are arranged in the circumferential direction in an inward surface in the radial direction of the prevention wall 16a. The first holding projection 18a is positioned in a center with respect to the circumferential direction of the prevention wall 16a. The first holding projection 18a is formed in a columnar shape having an oval cross section, and the second holding projection 18b is formed in a columnar shape. An interval between the first holding projection 18a and the second holding projection 18b is equal to the diameter of the conducting wires 19 of the coils 17a to 17h, or slightly smaller than the diameter of the conducting wires 19.

Figure 2B:
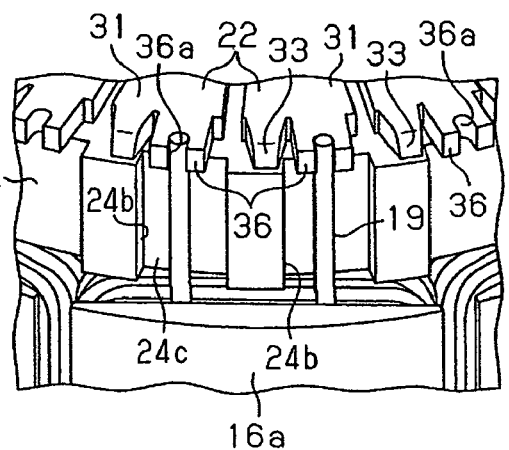
FIG. 2B is a partly enlarged perspective view of a commutator in FIG. 1 including a conducting wire in FIG. 2A.

As shown in FIGS. 2A and 2B, a first end of the conducting wire 19 in each of the coils 17a to 17h is led out in the axial direction through a portion between the first holding projection 18a and one of the second holding projections 18b. A second end of the conducting wire 19 is led out in the axial direction through a portion between the first holding projection 18a and the other of the second holding projections 18b. Each of the conducting wires 19 is pinched by the first holding projection 18a and the second holding projection 18b arranged in the circumferential direction. Accordingly, each of the conducting wires 19 is kept in a state of extending in the axial direction.

Figure 3:
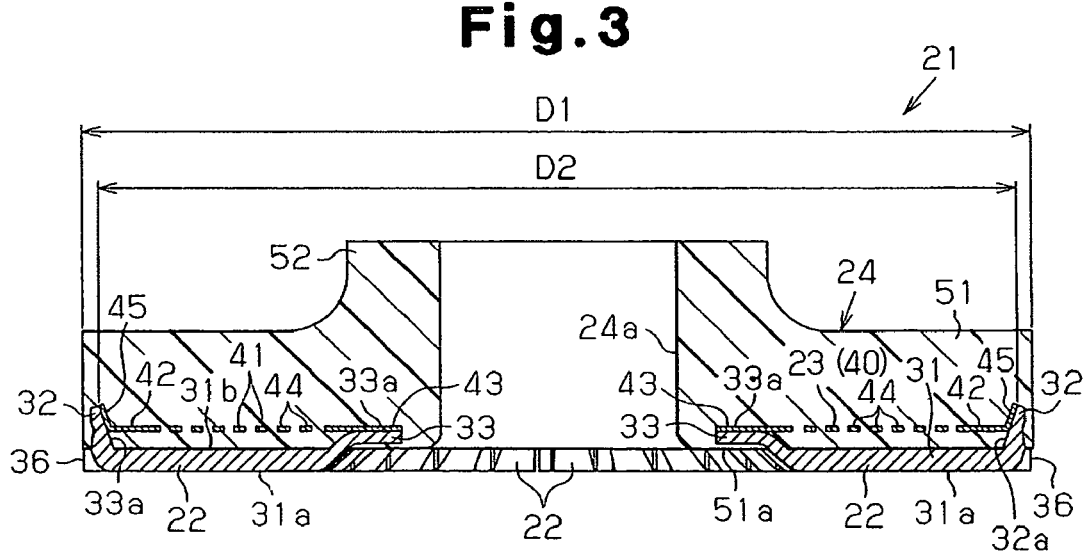
FIG. 3 is a vertical cross-sectional view of the commutator in FIG. 1, that is, a cross-sectional view of the commutator taken along line 3-3 in FIG. 4.
Figure 4:
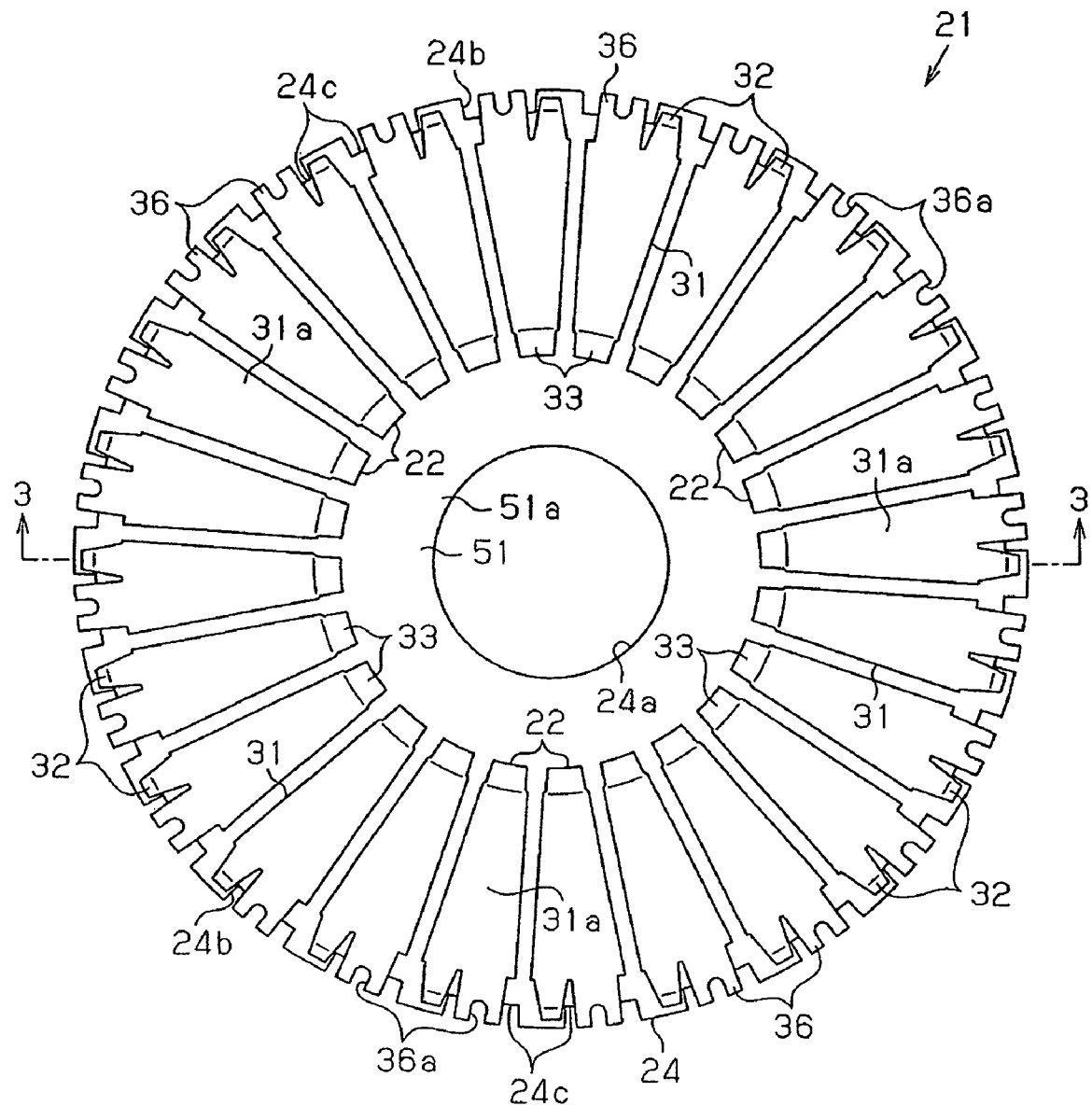
FIG. 4 is a bottom elevational view of the commutator in FIG. 3.

As shown in FIG. 1, a commutator 21 is fixed to the rotary shaft 12. The commutator 21 is positioned between the core 13 and the brush holder 5. As shown in FIG. 4, the commutator 21 includes a plurality of segments 22 arranged in the circumferential direction, and a plurality of short-circuit units 23. The short-circuit unit 23 short-circuits the predetermined segments 22 having the same electric potential with each other. As shown in FIG. 3, the commutator 21 further includes a holding portion 24 holding the segment 22 and the short-circuit unit 23. As shown in FIG. 4, the number of the segments 22 is twenty-four.

As shown in FIG. 4, a plurality of segments 22 are arranged at a uniform angular interval in the circumferential direction so as to be spaced with each other. The segments 22 are arranged in a radial pattern. Each of the segments 22 is formed in a sectoral shape in which an outer end in a radial direction is larger than an inner end in the radial direction. An interval between the adjacent segments 22 is constant over the radial direction.

As shown in FIG. 4, each of the segments 22 has a tabular segment main body 31 formed in a sectoral shape, an inner connection portion 33 extending from an inner end in a radial direction of the segment main body 31, and an outer connection portion 32 extending from an outer end in the radial direction of the segment main body 31. Further, each of the segments 22 has a coil connection portion 36 which is adjacent to the outer connection portion 32.

As shown in FIG. 3, the segment main body 31 has a flat slidable contact surface 31a. The slidable contact surface 31a corresponds to a lower surface of the segment main body 31 in FIG. 3. The segment main body 31 has a bonded surface 31b which is in an opposite side to the slidable contact surface 31a. The bonded surface 31b is parallel to the slidable contact surface 31a. The bonded surface 31b is bonded to the holding portion 24. The inner connection portion 33 has a diagonal portion extending diagonally away from the slidable contact surface 31a, from the inner end in the radial direction of the segment main body 31, and a parallel portion extending parallel to the slidable contact surface 31a and to the inner side in the radial direction. The parallel portion is formed in a trapezoidal shape which becomes smaller toward the inner side in the radial direction as viewed in the axial direction, as shown in FIG. 4. As shown in FIG. 3, the parallel portion has an inner connection surface 33a which is parallel to the slidable contact surface 31a. The inner connection surface 33a corresponds to an upper surface of the inner connection portion 33. The thickness of the inner connection portion 33 is smaller than the thickness in the axial direction of the segment main body 31.

Each of the slidable contact surfaces 31a is arranged within the same plane. Each of the inner connection surfaces 33a is arranged in another common plane. The diameter of a virtual circle defined by the inner end in the radial direction of the inner connection portion 33 is larger than the diameter of the rotary shaft 12.

As shown in FIG. 4, the outer connection portion 32 is deviated from the center in the circumferential direction, in the outer end in the radial direction of the segment main body 31. The outer connection portion 32 and the coil connection portion 36 are arranged in the circumferential direction. As shown in FIG. 3, the outer connection portion 32 is sloped, and a distal end thereof extends away from the slidable contact surface 31a. The thickness of the outer connection portion 32 is smaller than the segment main body 31. An angle of inclination of the outer connection portion 32 is larger than an angle of inclination of the inner connection portion 33. The outer connection portion 32 has an outer connection surface 32a directed to an inner side in the radial direction. An angle between the outer connection surface 32a and the slidable contact surface 31a is an obtuse angle. A recess between the outer connection portion 32 and the inner connection portion 33 can serve as a separating recess facing a coupling portion 44.

As shown in FIG. 3, the coil connection portion 36 has the same thickness as the segment main body 31, and protrudes toward an outer side in a radial direction. As shown in FIG. 4, an outer end in the radial direction of the coil connection portion 36 has a connection groove 36a. The connection groove 36a extends along the thickness direction of the segment main body 31. As shown in FIG. 2B, the dimension in a circumferential direction of the connection groove 36a is substantially equal to the diameter of the conducting wire 19. The dimension in the radial direction of the connection groove 36a is slightly larger than the diameter of the conducting wire 19.

Figure 5:
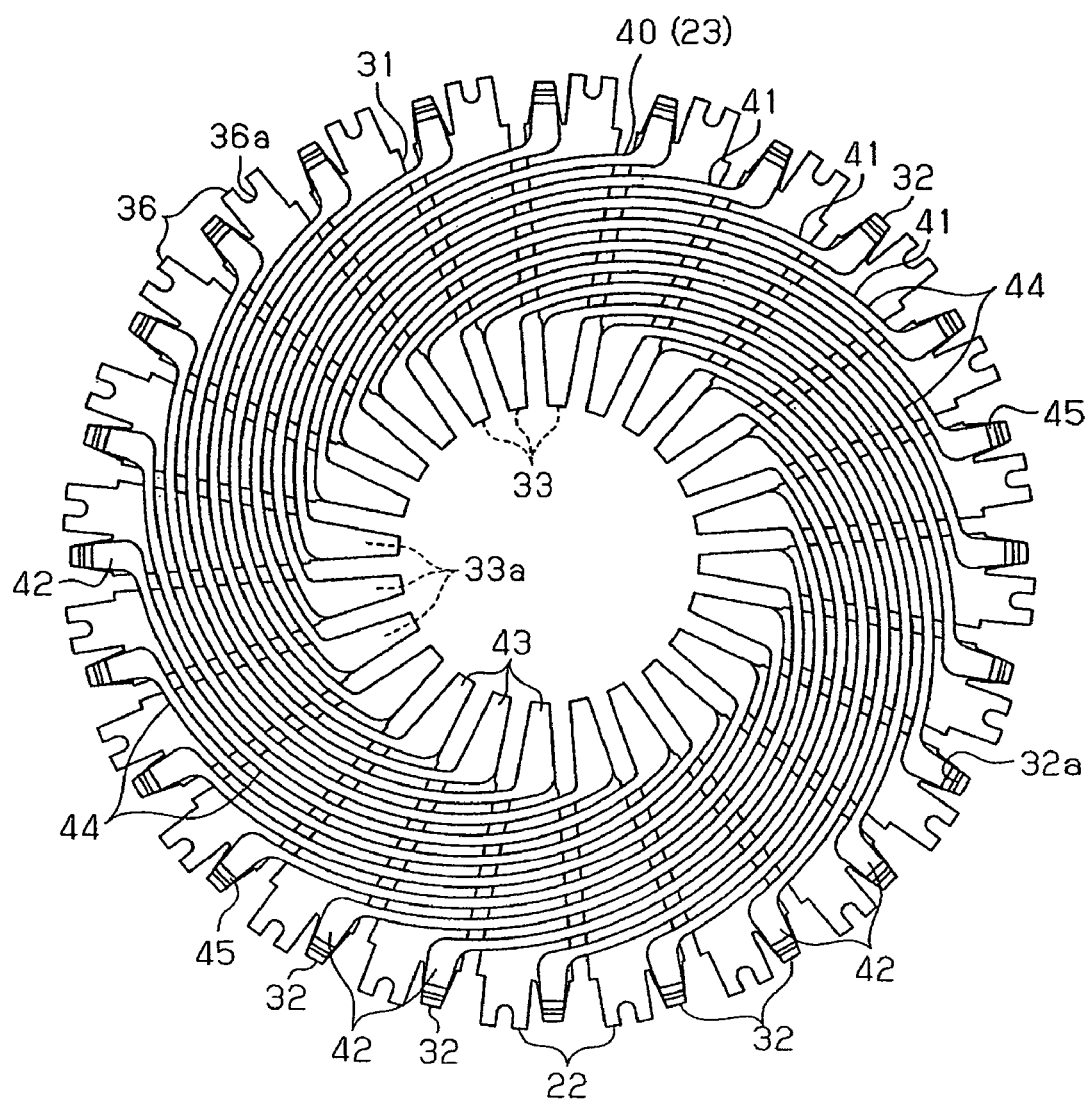
FIG. 5 is a plan view of a plurality of segments and short-circuit units included in the commutator in FIG. 3.

As shown in FIG. 5, the short-circuit unit 23 in accordance with the present embodiment is structured by one short-circuit group 40. FIG. 5 shows the segment 22 of the commutator 21 and the short-circuit unit 23, and omits an illustration of the holding portion 24. The short-circuit group 40 includes twenty-four outer short-circuit ends 42 connected to the outer connection portion 32, twenty-four inner short-circuit ends 43 arranged in an inner side in a radial direction than the outer short-circuit ends 42, and twenty-four coupling portions 44 connecting the outer short-circuit ends 42 to the inner short-circuit ends 43. In other words, one short-circuit group 40 includes twenty-four short-circuit pieces 41. One short-circuit piece 41 has one outer short-circuit end 42, one inner short-circuit end 43 and one coupling portion 44. The inner short-circuit end 43 is mounted on the inner connection portion 33. Each of the coupling portions 44 connects the outer short-circuit end 42 to the inner short-circuit end 43 which is displaced by a predetermined angle in the circumferential direction.

As shown in FIG. 3, the outer short-circuit end 42 is formed in a tabular shape which is parallel to the slidable contact surface 31a of the segment 22. A connection piece 45 is integrally formed in an outer end in a radial direction of the outer short-circuit end 42. The connection piece 45 is formed in a tabular shape which is parallel to the outer connection surface 32a.

The inner short-circuit end 43 is formed in the same trapezoidal tabular shape as the inner connection surface 33a. The inner short-circuit end 43 is parallel to the slidable contact surface 31a. In other words, the inner short-circuit end 43 is parallel to the inner connection surface 33a.

As shown in FIG. 5, the coupling portion 44 connects the outer short-circuit end 42 to the inner short-circuit end 43 which is displaced by 120°. The coupling portion 44 is formed in a curved shape along an involute curve. As shown in FIG. 5, as viewed in the above in FIG. 3, the coupling portion 44 extends to the inner short-circuit end 43 which is displaced by 120° in a counterclockwise direction from each of the outer short-circuit ends 42. The coupling portions 44 which are adjacent in the circumferential direction are arranged so as to be spaced. In other words, the coupling portions 44 are in non-contact with each other. As shown in FIG. 3, the outer short-circuit end 42, the inner short-circuit end 43 and the coupling portion 44 are integrally formed, and are formed in one flat plate shape. The thickness of the short-circuit group 40, that is, the dimension in the axial direction thereof is smaller than the thickness of the segment main body 31.

As shown in FIGS. 3 and 4, each of the connection pieces 45 is brought into contact with the corresponding outer connection surface 32a. Each of the inner short-circuit ends 43 is brought into contact with corresponding inner connection surface 33a. In a state in which the short-circuit unit 23 is assembled in the segment 22, the short-circuit unit 23 has a surface on the same plane as the inner connection surface 33a. In FIG. 3, a surface facing the segment 22 in the short-circuit unit 23 exists on the same plane as the inner connection surface 33a. Accordingly, the short-circuit unit 23 is parallel to the slidable contact surface 31a. The coupling portion 44 faces the bonded surface 31b of the segment main body 31 so as to be spaced. In other words, the coupling portion 44 is in a non-contact state with the segment main body 31.

The connection piece 45 is welded to the outer connection portion 32, and the inner short-circuit end 43 is welded to the inner connection portion 33. The welding employs, for example, a tungsten inert gas (TIG) welding. Accordingly, the outer short-circuit end 42 is electrically connected to the outer connection portion 32 via the connection piece 45. The inner short-circuit end 43 is electrically connected to the inner connection portion 33. In other words, if the short-circuit unit 23 is electrically connected to the segment 22, the segments 22 spaced at 120° are short-circuited with each other.

As shown in FIG. 3, the holding portion 24 is formed in a flat cylindrical shape. The holding portion 24 is made of an insulative resin. The holding portion 24 has a fitting hole 24a extending in the axial direction in the center. The rotary shaft 12 is fitted and inserted to the fitting hole 24a. The diameter of the fitting hole 24a is equal to or slightly smaller than the outer diameter of the rotary shaft 12.

A part of the segment 22 and the short-circuit unit 23 are embedded in the holding portion 24. In other words, the holding portion 24 is integrated with the segment 22 and the short-circuit unit 23.

As shown in FIG. 3, the holding portion 24 has a ring plate 51 serving as a holding portion main body, and a boss portion 52 evaginating from the ring plate 51. The cylindrical boss portion 52 surrounds the fitting hole 24a. The dimension in the axial direction of the boss portion 52 is substantially equal to the thickness of the holding portion 24.

The ring plate 51 has an end surface 51a which is positioned in an opposite side to the boss portion 52, and a contact surface 51b which is adjacent to the boss portion 52. The end surface 51a is perpendicular to the axial direction. The end surface 51a is adjacent to the segment 22. In FIG. 3, the end surface 51a corresponds to a lower end surface of the holding portion 24. The slidable contact surface 31a is farther from the short-circuit unit 23 than the end surface 51a. In other words, the slidable contact surface 31a protrudes in the axial direction than the end surface 51a. The slidable contact surface 31a is parallel to the end surface 51a.

As shown in FIG. 3, the outer diameter of the ring plate 51, that is, the outer diameter D1 of the holding portion 24 is equal to the diameter of a virtual circle defined by distal ends of a plurality of coil connection portions 36. The outer diameter D1 of the holding portion 24 is equal to the outer diameter of the commutator 21. As shown in FIG. 1, the outer diameter D1 of the holding portion 24 is larger than the inner diameter d1 of a virtual cylinder defined by a plurality of arcuate shaped magnets 2, and smaller than the inner diameter d2 of the motor housing 1 (d1<D1<d2). The outer diameter D2 of the short-circuit unit 23 is smaller than the outer diameter D1 of the holding portion 24 (D2<D1). The outer diameter D2 of the short-circuit unit 23 is also larger than the inner diameter d1 of the virtual cylinder formed by a plurality of magnets 2, and smaller than the inner diameter d2 of the motor housing 1 (d1<D2<D1<d2).

As shown in FIG. 4, the resin holding portion 24 gets into a portion between the segments 22 which are adjacent to each other in the circumferential direction. Accordingly, it is possible to prevent the segments 22 which are adjacent to each other in the circumferential direction from being short-circuited. A whole of the short-circuit unit 23 is embedded in the holding portion 24.

As shown in FIG. 3, the holding portion 24 gets into the portion between the bonded surface 31b between the segments 22 facing each other in the axial direction, and the coupling portion 44. Accordingly, it is possible to prevent the coupling portion 44 from being short-circuited with the segment 22.

As shown in FIG. 4, twenty-four guide grooves 24b are formed on an outer circumferential surface of the ring plate 51 so as to correspond to the coil connection portion 36. The guide groove 24b extends in the axial direction. The dimension in the circumferential direction of the guide groove 24b is slightly larger than the dimension in the circumferential direction of the coil connection portion 36. The coil connection portion 36 protrudes to an outer side in the radial direction than the bottom surface 24c of the guide groove 24b. In other words, the connection groove 36a does not lap over the holding portion 24 in the axial direction.

As shown in FIG. 1, the rotary shaft 12 is pressed into the fitting hole 24a of the holding portion 24. The segment 22 is positioned in an opposite side to the core 13 in the commutator 21. The thickness direction of the holding portion 24 agrees with the axial direction of the rotary shaft 12. The anode brush 8 and the cathode brush 9 are brought into slidable contact with the slidable contact surface 31a of each of the segments 22 from the axial direction. A distance between the commutator 21 and the opening of the motor housing 1 is smaller than a distance between the magnet 2 and the opening of the motor housing 1. The commutator 21 faces the lower end surface of the magnet 2 in the axial direction.

FIG. 6 shows a wiring diagram of the direct-current motor. The conducting wire 19 corresponding to the end portion of the corresponding coil 17a to 17h is connected to the segment 22. Number "1" is attached to the segment 22 arranged between the teeth 14a and the teeth 14h. Numbers "2" to "24" are attached alphabetically in the counterclockwise direction from the segment 22 of the number "1". The conducting wires 19 of the corresponding coils 17a to 17h are connected to eight pairs of segments 22 forming a pair adjacently in the circumferential direction. The segments 22 which are not connected to the coils 17a to 17h are arranged one by one between eight pairs of segments 22.

Describing in detail, a first end of the first coil 17a is connected to the segment 22 of the number "2", and a second end of the first coil 17a is connected to the segment 22 of the number "3". The conducting wire 19 of any of the coils 17a to 17h is not connected to the segment 22 of the number "4". A first end of the second coil 17b is connected to the segment 22 of the number "5", and a second end of the second coil 17b is connected to the segment 22 of the number "6".

The conducting wire 19 of any of the coils 17a to 17h is not connected to every third segments 22 from the segment 22 of the number "1", or the segments 22 of the numbers "1", "4", "7", "10", "13", "16", "19" and "22". A first end of the third coil 17c is connected to the segment 22 of the number "8", and a second end of the third coil 17c is connected to the segment 22 of the number "9". A first end of the fourth coil 17d is connected to the segment 22 of the number "11", and a second end of the fourth coil 17d is connected to the segment 22 of the number "12". A first end of the fifth coil 17e is connected to the segment 22 of the number "14", and a second end of the fifth coil 17e is connected to the segment 22 of the number "15". A first end of the sixth coil 17f is connected to the segment 22 of the number "17", and a second end of the sixth coil 17f is connected to the segment 22 of the number "18". A first end of the seventh coil 17g is connected to the segment 22 of the number "20", and a second end of the seventh coil 17g is connected to the segment 22 of the number "21". A first end of the eighth coil 17h is connected to the segment 22 of the number "23", and a second end of the eighth coil 17h is connected to the segment 22 of the number "24".

As shown in FIG. 2B, the conducting wire 19 corresponding to the end portion of each of the coils 17a to 17h is guided to the connection groove 36a of the segment 22 through the guide groove 24b in the outer circumferential surface of the holding portion 24. In this state, the conducting wire 19 of each of the coils 17a to 17h is electrically connected to the coil connection portion 36 by applying a welding from the outer side in the radial direction.

If an electric current is supplied to the direct-current motor from an external power supply apparatus, the electric current is selectively supplied to the coils 17a to 17h via the anode brush 8 and the cathode brush 9. As a result, a rotating magnetic field is generated from the coils 17a to 17h, and the armature 11 is rotated. If the armature 11 is rotated, the commutator 21 is rotated. Accordingly, the segments 22 brought into slidable contact with the anode brush 8 and the cathode brush 9 are switched, and rectifications of the coils 17a to 17h are executed sequentially.

Next, a description will be given of a manufacturing method of the commutator 21.

Figure 7A:
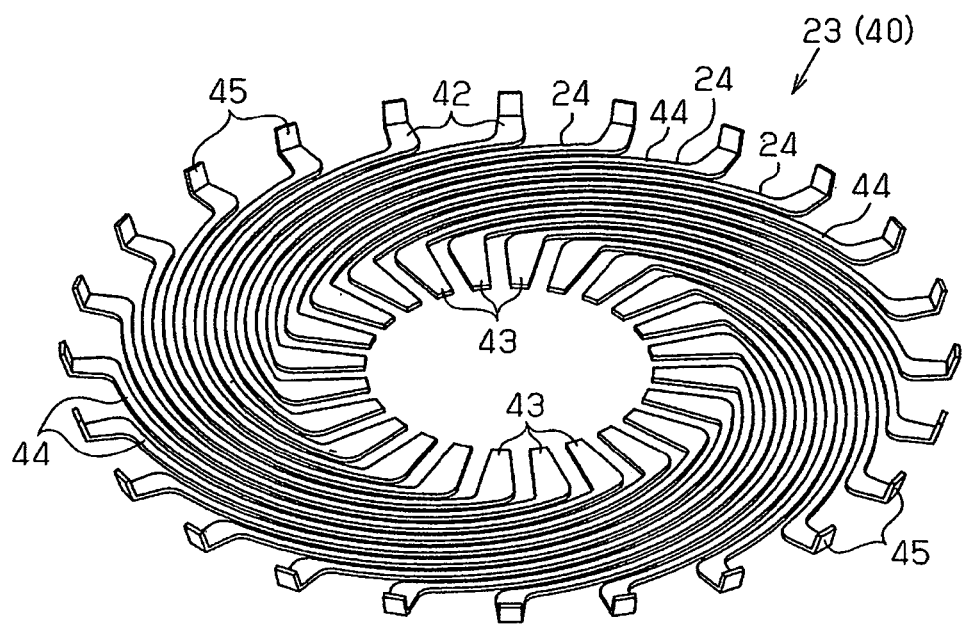
FIG. 7A is a perspective view of the short-circuit unit shown in FIG. 5.

First, there is executed a short-circuit unit forming step of forming the short-circuit unit 23. FIG. 7A shows a perspective view of the short-circuit unit 23 formed by the short-circuit unit forming step. At a time of forming the short-circuit unit 23, that is, the short-circuit group 40, the connection piece 45 is formed by stamping a conductive plate member, for example, a copper plate by a punch and thereafter bending the outer short-circuit end. In the short-circuit unit 23, the outer short-circuit end 42, the inner short-circuit end 43 and the coupling portion 44 are integrally formed, and are formed in the flat shape.

Figure 7B:
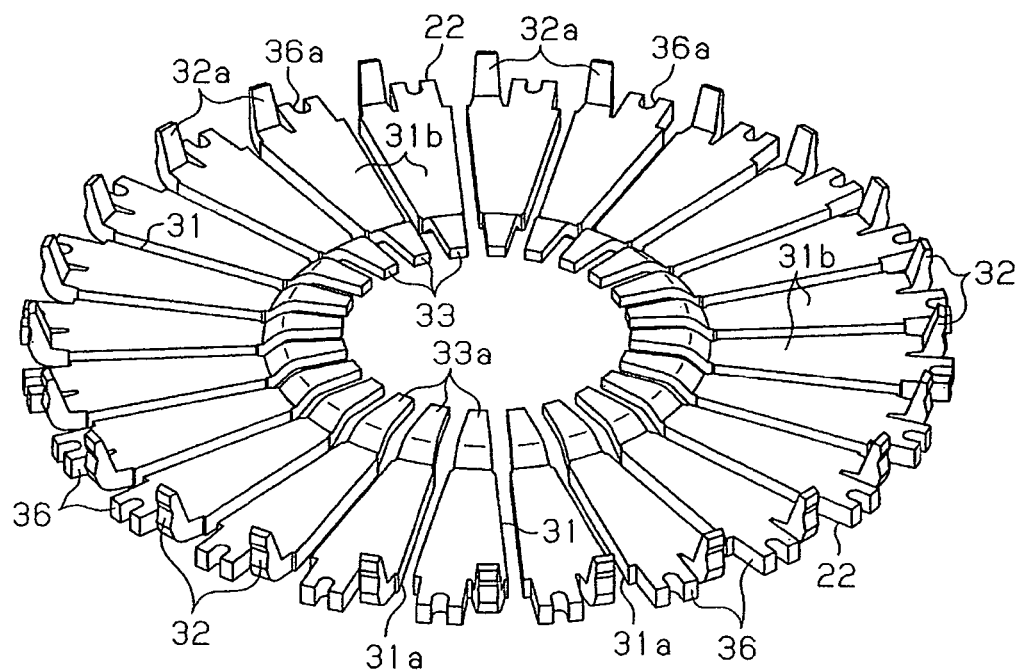
FIG. 7B is a perspective view of a plurality of segments shown in FIG. 5.

Next, there is executed a segment forming step of forming the segment 22 shown in FIG. 7B. At a time of forming the segment 22, the outer connection portion 32 and the inner connection portion 33 are formed by stamping the conductive plate member by a punch and thereafter bending both ends of the stamped piece. Twenty-four segments 22 are formed by being stamped individually from the conductive plate member.

Next, there is executed an arranging step of arranging the short-circuit unit 23 in the segment 22. As shown in FIG. 7B, the slidable contact surfaces 31a of the respective segments 22 are arranged in a radial pattern within the same plane. The tabular short-circuit units 23 are arranged parallel twenty-four slidable contact surfaces 31a arranged in the radial pattern. As shown in FIG. 3, the inner short-circuit end 43 of the short-circuit unit 23 is brought into contact with the inner connection surface 33a of the segment 22. The connection piece 45 of the short-circuit unit 23 is brought into contact with the outer connection surface 32a of the segment 22. FIG. 5 shows a plan view of the short-circuit unit 23 in which the segment 22 is arranged. In a state in which the short-circuit unit 23 is arranged on the segments 22, the short-circuit unit 23 is brought into contact with the inner connection surface 33a of the segment 22. The bonded surface 31b of the segment main body 31 and the coupling portion 44 of the short-circuit unit 23 are arranged so as to be spaced in such a manner as to be in non-contact with each other.

Next, there is executed a bonding step of connecting the short-circuit unit 23 to the segment 22. The inner short-circuit end 43 of the segment 22 is bonded to the inner connection portion 33 of the short-circuit unit 23 by welding. In other words, the inner short-circuit end 43 of the segment 22 is electrically connected to the inner connection portion 33. The outer connection portion 32 of the segment 22 is bonded to the connection piece 45 of the short-circuit unit 23 by welding. In other words, the outer short-circuit end 42 of the segment 22 is electrically connected to the outer connection portion 32 via the connection piece 45.

Next, there is executed a holding portion forming step of forming the holding portion 24. Twenty-four segments 22 are arranged in a forming die such as a lower die 491 and an upper die 492 shown in FIG. 33, while keeping a state of being connected to twenty-four short-circuit units 23. Thereafter, the forming die is filled with a molten insulative resin. The insulative resin fills a gap between the segments 22 which are adjacent in the circumferential direction, a gap between the coupling portions 44 which are adjacent in the circumferential direction, and a gap between the segment main body 31 and the coupling portion 44 which face each other in the axial direction. The insulative resin is cooled so as to be hardened, whereby the holding portion 24 having the boss portion 52 is formed. The holding portion 24 integrally holds the segment 22 and the short-circuit unit 23. As a result, the commutator 21 is finished. The commutator 21 is removed from the forming die after the holding portion 24 is formed.

Figure 8:
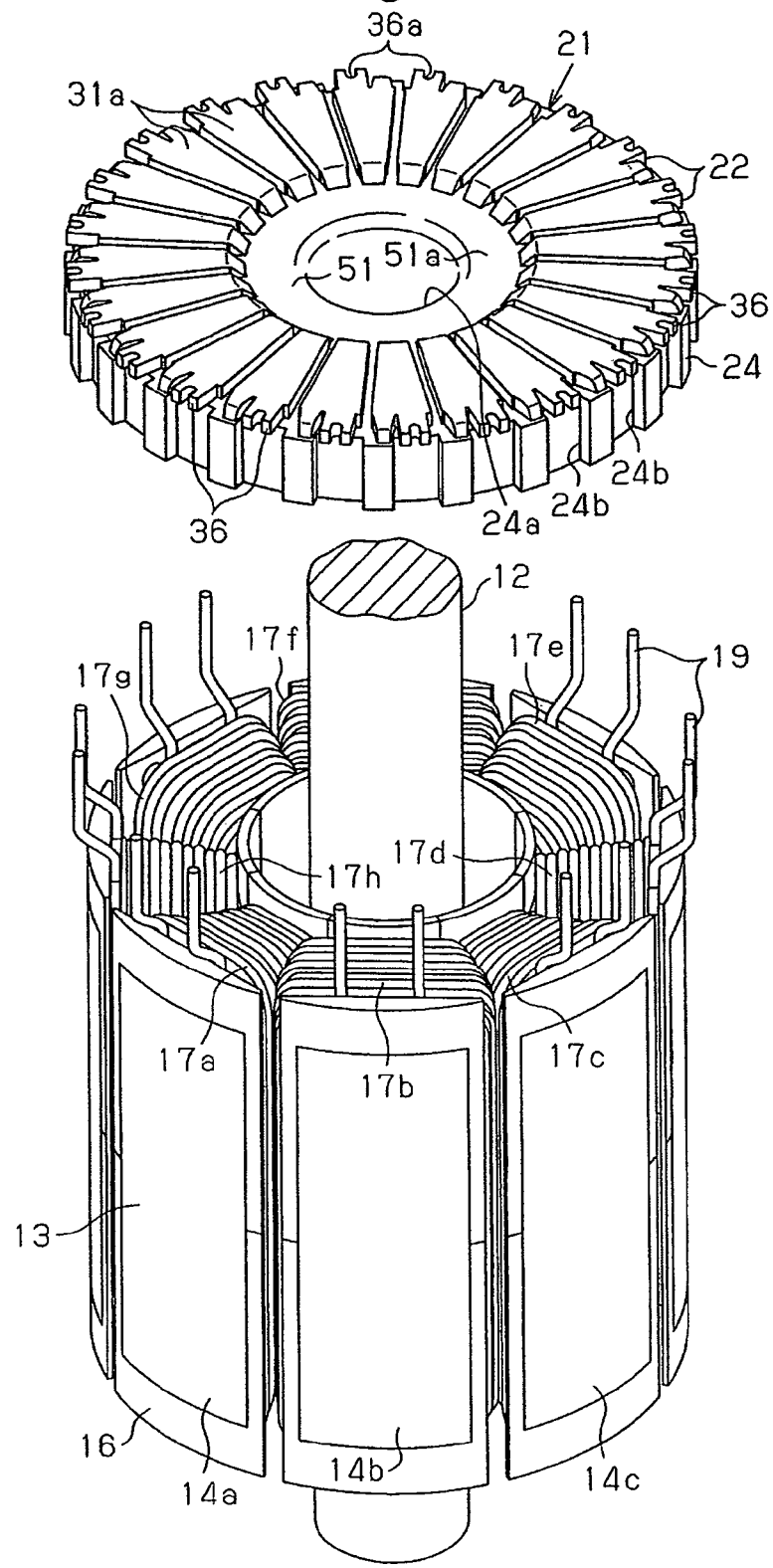
FIG. 8 is an exploded perspective view of the commutator shown in FIG. 1 and a rotary shaft.

As shown in FIG. 8, the core 13 around which the coils 17a to 17h are wound is fixed to the rotary shaft 12. The rotary shaft 12 is pressed into the fitting hole 24a, whereby the commutator 21 is fixed to the rotary shaft 12. Thereafter, the conducting wire 19 of each of the coils 17a to 17h is connected to the coil connection portion 36 of the segment 22.

As shown in FIG. 3, the outer diameter D1 of the commutator 21 is substantially equal to the virtual circle passing through the distal ends of twenty-four coil connection portions 36 arranged in the radial pattern. Accordingly, the conducting wires 19 of the respective coils 17a to 17h are arranged adjacently in the circumferential direction with respect to the coil connection portion 36.

As shown in FIG. 2A, the conducting wire 19 of each of the coils 17a to 17h is taken out along the axial direction while passing through the portion between the first holding projection 18a and the second holding projection 18b. Accordingly, each of the conducting wires 19 is held by the first and second holding projections 18a and 18b, and tends to keep a state of extending in the axial direction. Therefore, it is easy to arrange each of the conducting wires 19 with respect to the connection groove 36a of the segment 22.

In a state in which the conducting wire 19 of each of the coils 17a to 17h is arranged in the connection groove 36a of the segment 22, the coil connection portion 36 of the segment 22 is welded to the conducting wire 19 from the outer side in the radial direction of the commutator 21, thereby being electrically connected. Accordingly, the armature 11 is finished.

The first embodiment mentioned above has the following advantages.

(1) The holding portion 24 holding the segment 22 is formed in a disc shape. Twenty-four segments 22 are arranged in one end in the thickness direction of the holding portion 24 in the radial pattern. The slidable contact surface 31a in the holding portion 24 is orthogonal to the thickness direction of the holding portion 24. The commutator 21 is fixed to the rotary shaft 12 in such a manner that the thickness direction of the holding portion 24 agrees with the axial direction of the rotary shaft 12. The anode brush 8 and the cathode brush 9 are brought into slidable contact with the slidable contact surface 31a in the axial direction.

In contrast, the feeding brush is brought into slidable contact with the commutator in accordance with the prior art from the radial direction. Accordingly, the present embodiment can enlarge the outer diameter of the commutator 21 without enlarging the outer diameter of the direct-current motor in comparison with the prior art. Accordingly, in comparison with the short-circuit unit provided in the conventional commutator, it is possible to enlarge the dimension in the radial direction of the short-circuit unit 23 in accordance with the present embodiment in correspondence to the outer diameter of the commutator 21. Therefore, it is possible to enlarge the dimension in the circumferential direction of the coupling portion 44. As a result, it is possible to enlarge the cross section area perpendicular to the current passing direction of the coupling portion 44.

Further, the short-circuit unit 23 in accordance with the present embodiment can enlarge the cross-sectional area of the coupling portion 44 without increasing the number of the short-circuit group 40. Accordingly, it is possible to prevent the parts number of the commutator 21 from being increased. Further, it is possible to suppress the commutator 21 from being enlarged in size in the axial direction.

Further, the tabular short-circuit unit 23 is arranged parallel to the slidable contact surface 31a in the commutator 21. In other words, the short-circuit unit 23 is arranged parallel to the holding portion 24 holding the segment 22. As mentioned above, it is possible to further downsize the commutator 21 in the axial direction by arranging the tabular short-circuit unit 23 parallel to the disc-shaped holding portion 24.

The feeding brush is brought into slidable contact with the conventional commutator from the radial direction. Accordingly, in order to secure the position where the circumferential surface of the commutator is brought into slidable contact with the feeding brush, a certain degree of dimension in the axial direction is required in the commutator. In other words, it is hard to downsize the commutator in accordance with the prior art in the axial direction. However, the anode brush 8 and the cathode brush 9 are brought into slidable contact with the commutator 21 in accordance with the present embodiment from the axial direction. Accordingly, the thickness of the holding portion 24 can be set regardless of the thickness of the distal ends of the anode brush 8 and the cathode brush 9. Therefore, it is possible to reduce the thickness of the holding portion 24. In other words, it is possible to further downsize the commutator 21 provided with the short-circuit unit 23 in the axial direction.

(2) The short-circuit unit 23 is fixed to the segment 22 in both of the outer short-circuit end 42 and the inner short-circuit end 43. Accordingly, the short-circuit unit 23 is stably arranged on the segments 22.

The outer short-circuit end 42 of the short-circuit unit 23 is connected to the outer connection portion 32 of the segment 22. The inner short-circuit end 43 of the short-circuit unit 23 is connected to the inner connection portion 33 of the segment 22. Accordingly, the dimension in the radial direction of the segment 22 is substantially equal to the dimension in the radial direction of the short-circuit unit 23. Therefore, it is possible to do away with the wasteful space of the motor housing 1, for example, in comparison with the case that the dimension in the radial direction of the segment 22 is different from the dimension in the radial direction of the short-circuit unit 23.

(3) Each of the coupling portions 44 of the short-circuit group 40 connects the outer short-circuit end 42 to the inner short-circuit end 43 which is displaced by 120° in the circumferential direction from the outer short-circuit end 42. In other words, one short-circuit group 40 short-circuits a plurality of segments 22 which are arranged so as to be spaced at 120° in the circumferential direction with each other. Since the short-circuit unit 23 is constituted by one short-circuit group 40, the parts number of the commutator 21 is reduced. Further, it is easy to assemble the parts of the commutator 21 with each other, that is, assemble the segment 22 in the short-circuit unit 23. Further, it is easy to downsize the commutator 21 in the axial direction in comparison with the case that the short-circuit unit 23 is constituted by a plurality of short-circuit groups.

(4) The outer diameter of the holding portion 24 is substantially equal to the circle passing through the outer ends in the radial direction of twenty-four segments 22 which are arranged in the circumferential direction. The outer diameter D1 of the holding portion 24 is larger than the inner diameter d1 of the virtual cylinder defined by a plurality of magnets 2, and smaller than the inner diameter d2 of the motor housing 1. In other words, the outer diameter D1 of the commutator 21 is larger than the inner diameter d1 of the virtual cylinder defined by a plurality of magnets 2 within the motor housing 1.

Further, the outer ends in the radial direction of the segments 22 to which the conducting wires 19 of the coils 17a to 17h are connected, are arranged in such a manner as to lap over the outer circumferential surface of the holding portion 24. In other words, the distal end of the coil connection portion 36 is arranged at an equal position to the outer circumferential surface of the holding portion 24 in the radial direction. Accordingly, the dimension in the radial direction between the outer circumferential surface of the segment 22 in the present embodiment and the outer circumferential surface of the core 13 is smaller in comparison with the prior art in which the feeding brush is brought into slidable contact with the commutator from the radial direction.

The conducting wire 19 of each of the coils 17a to 17h is led out along the axial direction from the outer periphery of the core 13. The dimension in the radial direction between the lead-out position of the conducting wire 19 of each of the coil 17a to 17h and the coil connection portion 36 of the segment 22 in the present embodiment is smaller in comparison with the prior art in which the feeding brush is brought into slidable contact with the commutator from the radial direction. Accordingly, it is possible to make the length of the conducting wire 19 connecting each of the coils 17a to 17h to the segment 22 smaller.

(5) As shown in FIG. 1, the outer diameter D1 of the commutator 21 is larger than the inner diameter d1 of the virtual cylinder sectioned by a plurality of magnets 2, and smaller than the inner diameter d2 of the motor housing 1 (d1<D1<d2). In the present embodiment, the outer diameter D1 of the commutator 21 is equal to the outer diameter of the holding portion 24.

Accordingly, it is possible to make the outer diameter of the commutator 21 further larger within the motor housing 1. Therefore, it is possible to enlarge the area of the slidable contact surface 31a of the commutator 21 to the maximum without enlarging the outer diameter of the motor housing 1. Accordingly, it is possible to enlarge the feeding amount to the armature 11.

The outer diameter D1 of the commutator 21 is larger than the outer diameter d0 of the core 13 (d0<d1<D1). Accordingly, for example, in comparison with the case that the outer diameter of the commutator is smaller than the outer diameter d0, the present embodiment can enlarge the area of the slidable contact surface 31a. Therefore, it is possible to enlarge the anode brush 8 and the cathode brush 9 in the radial direction. Accordingly, it is possible to enlarge the feeding amount to the armature 11 without enlarging the outer diameter of the motor housing 1.

(6) The commutator 21 is closer to the opening edge 1a of the motor housing 1 than the magnet 2. The commutator 21 faces the magnet 2 in the axial direction. In other words, the commutator 21 does not lap over the magnet 2 in the radial direction. Accordingly, even if the outer diameter of the commutator 21 is larger than the inner diameter of the magnet 2, it is possible to prevent the commutator 21 from being brought into contact with the magnet 2.

(7) The coil connection portion 36 connected to the conducting wire 19 of each of the coils 17a to 17h is arranged in the outer peripheral portion of the commutator 21. Accordingly, welding for connecting the conducting wire 19 of each of the coils 17a to 17h to the corresponding segment 22 is executed from the outer side in the radial direction. For example, in the case that welding is executed from the axial direction, there is a case that the core 13 and the rotary shaft 12 interfere with the weld. However, if welding is executed from the radial direction as in the present embodiment, it is possible to secure the space for the welding work without being affected by the core 13 and the rotary shaft 12. Accordingly, it is possible to further easily execute the welding mentioned above.

Further, for example, in comparison with the case that the coil connection portion is provided in the inner side in the radial direction of the segment 22, the distance between the coil connection portions 36 in accordance with the present embodiment is larger. Accordingly, it is possible to suppress the short-circuit between the conducting wires 19 of the coils 17a to 17h. Further, it is possible to further suppress the contact between the coil connection portions 36 which are adjacent to each other in the circumferential direction. The welding work can be easily executed because the wider space can be secured in the present embodiment.

(8) The connection groove 36a is formed in the outer end in the radial direction of the segment 22. The conducting wire 19 of each of the coils 17a to 17h is welded to the segment 22 in a state of being arranged in the connection groove 36a. The conducting wire 19 is positioned in the circumferential direction by being arranged in the connection groove 36a. Accordingly, it is possible to easily weld each of the conducting wires 19 to the segment 22.

(9) The conducting wire 19 of each of the coils 17a to 17h is pinched from both sides in the circumferential direction by the first holding projection 18a and the second holding projection 18b. Accordingly, the conducting wire 19 of each of the coils 17a to 17h tends to be maintained in the state of being led out in the axial direction. As a result, it is possible to further easily connect the conducting wire 19 of each of the coils 17a to 17h to the outer end in the radial direction of the segment 22.

(10) The outer short-circuit end 42 of the short-circuit unit 23 is welded to the outer connection portion 32 of the segment 22, and the inner short-circuit end 43 of the short-circuit unit 23 is welded to the inner connection portion 33 of the segment 22. As a result, the short-circuit unit 23 is electrically connected to the segment 22. Therefore, the electric connection of the short-circuit unit 23 to the segment 22 is more securely executed than the case of the contact with each other, the case of the soldering and the case of the swaging.

(11) The holding portion 24 holds both of the segments 22 and the short-circuit unit 23. Accordingly, for example, in comparison with the case that the holding portion is formed in each of the segment 22 and the short-circuit unit 23, it is possible to more easily manufacture the commutator 21.

The holding portion 24 constituted by the insulative resin is integrally formed with the segment 22 and the short-circuit unit 23. Accordingly, it is possible to prevent the short-circuit unit 23 from being displaced from the segment 22 during the rotation of the commutator 21. For example, in comparison with the case that the segment 22 is only welded to the short-circuit unit 23, the short-circuit unit 23 in accordance with the present embodiment is hard to be detached from the segment 22.

(12) The holding portion 24 covers the connection portion of the outer short-circuit end 42 to the outer connection portion 32. Accordingly, it is possible to prevent the outer short-circuit end 42 from being separated from the outer connection portion 32.

In the same manner, the holding portion 24 covers the connection portion of the inner short-circuit end 43 to the inner connection portion 33. Accordingly, it is possible to prevent the inner short-circuit end 43 from being separated from the inner connection portion 33. As a result, it is possible to improve a connection reliability of the commutator 21.

A description will be given below of a second embodiment of the present invention with reference to FIGS. 9 to 13B. The same reference numerals are attached to the same structures as those of the first embodiment, and a description thereof will be omitted.

Figure 9:
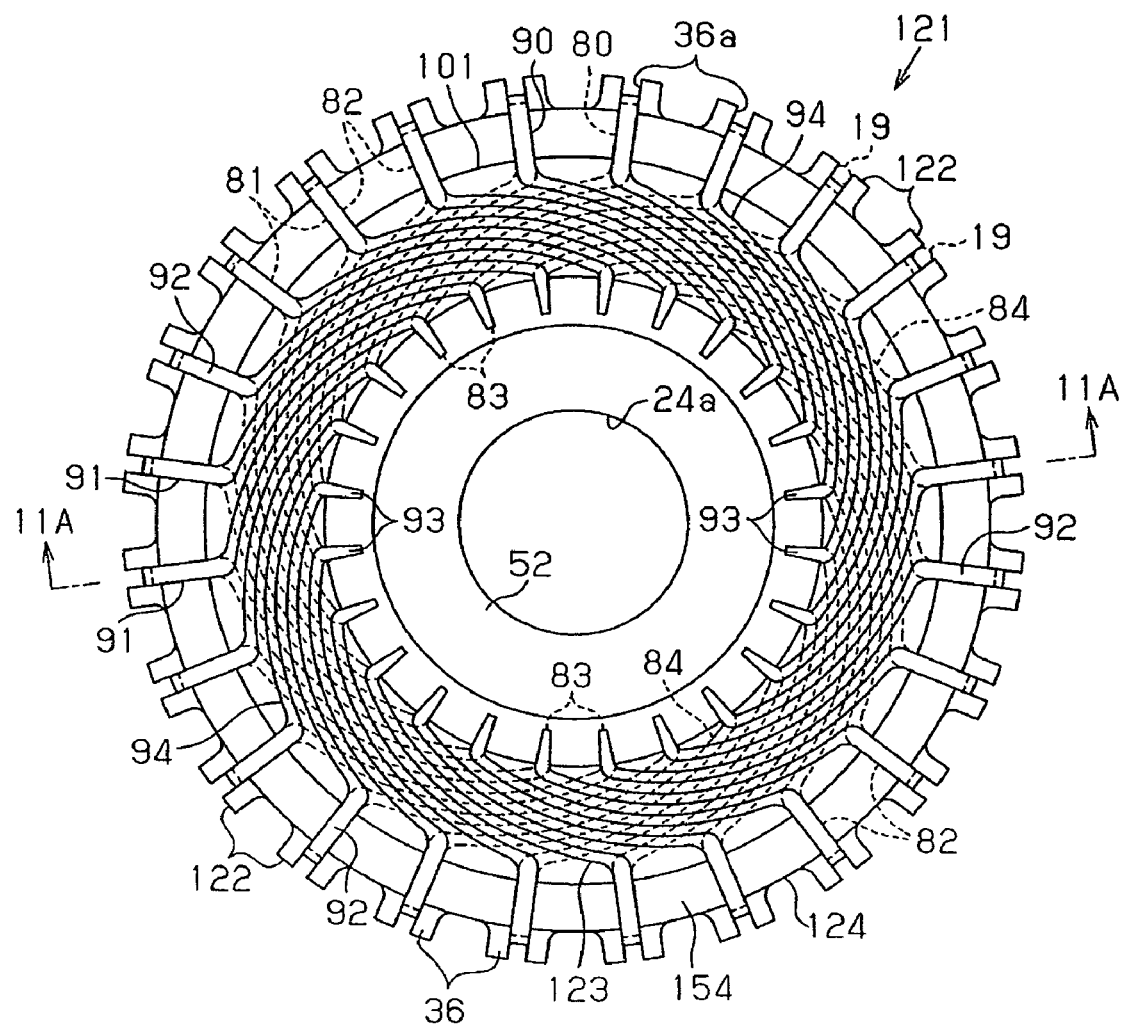
FIG. 9 is a plan view of a commutator in accordance with a second embodiment of the present invention.

As shown in FIG. 9, a commutator 121 in accordance with the present embodiment includes twenty-four segments 122 which are arranged in a circumferential direction, a short-circuit unit 123 which short-circuits the segments 122 having the same electric potential with each other, and a holding portion 124 holding the segments 122.

As shown in FIG. 10, the segment 122 has the segment main body 31, and the coil connection portion 36 protruding to an outer side in a radial direction from the outer end surface 31c in the radial direction of the segment main body 31. The coil connection portion 36 is positioned in a center portion in a circumferential direction of the outer end surface 31c in the radial direction. The segment 122 does not have the inner connection portion 33. An outer portion in the radial direction of the segment 122 serves as an outer connection portion 132. A bottom surface of a connection groove 36a serves as an outer connection surface 132a connected to the short-circuit unit 123 in an outer portion in the radial direction of the segment 122. A side wall of the coil connection portion 36 can serve as an outer connection surface. The conducting wire 19 is connected to the short-circuit unit 123 within the connection groove 36a.

As shown in FIG. 11A, the bonded surface 31b has a filling recess 135 in an intermediate portion in the radial direction. As shown in FIG. 11A, the filling recess 135 is formed in a rectangular shape in the case of being viewed from the circumferential direction. The filling recess 135 can serve as a separating recess facing the first coupling portion 84 and the second coupling portion 94.

As shown in FIG. 11A, the thickness of the ring plate 51 is smaller than the thickness of the segment main body 31. An annular holding projection 154 protruding in the axial direction is formed in the end surface 51a. The holding projection 154 is arranged in the filling recess 135. A distance R from a center L of the holding portion 124 to an outer circumferential surface of the holding portion 124 is equal to a distance from the center L to the outer end surface 31c in the radial direction. A distance from the center L to the outer connection surface 132a of the connection groove 36a is equal to the distance R. As shown in FIG. 11A, the contact surface 51b is parallel to the slidable contact surface 31a of the segment main body 31.

As shown in FIG. 9, the short-circuit unit 123 includes the first short-circuit group 80 and the second short-circuit group 90. In other words, the first short-circuit group 80 has twenty-four first short-circuit pieces 81. The second short-circuit group 90 has twenty-four second short-circuit pieces 91.

Each of the first short-circuit pieces 81 has a first outer short-circuit end 82, a first inner short-circuit end 83 and a first coupling portion 84. In other words, the first short-circuit group 80 is provided with twenty-four first outer short-circuit ends 82 which are arranged in the circumferential direction, twenty-four first inner short-circuit ends 83 which are arranged in an inner side of the first outer short-circuit end 82, and twenty-four first coupling portions 84. Each of the first coupling portions 84 connects the corresponding first outer short-circuit end 82 to the first inner short-circuit end 83 which is displaced by a predetermined angle in the circumferential direction from the first outer short-circuit end 82. Each of the first outer short-circuit ends 82 is formed in a substantially rectangular plate shape. Each of the first inner short-circuit ends 83 is formed in a substantially trapezoidal plate shape. The thickness of the first short-circuit group 80 is smaller than the thickness of the segment main body 31.

As shown in FIG. 9, the first outer short-circuit end 82 is arranged in such a manner as to correspond to the segment 122 on the contact surface 51b.

As shown in FIG. 11A, a first connection piece 85 extending toward the segment 122 is integrally formed in an outer end in the radial-direction of the first outer short-circuit end 82. The first connection piece 85 extends in a direction orthogonal to the first outer short-circuit end 82, that is, in the axial direction. The first connection piece 85 is brought into contact with the outer connection surface 132a in a state of being inserted to the connection groove 36a. The first connection piece 85 is brought into contact with the outer circumferential surface of the holding portion 124. The dimension in the circumferential direction of the first connection piece 85 is substantially equal to the dimension in the circumferential direction of the connection groove 36a. A distal end of the first connection piece 85 is positioned within the same plane as the slidable contact surface 31a.

The first inner short-circuit ends 83 are arranged around the boss portion 52 so as to be spaced at a uniform angular interval. The first inner short-circuit end 83 is brought into contact with the contact surface 51b. As shown in FIG. 9, the first inner short-circuit end 83 laps over the first outer short-circuit end 82. The dimension in the circumferential direction of the first inner short-circuit end 83 is slightly smaller than the dimension in the circumferential direction of the first outer short-circuit end 82.

As shown in FIG. 9, the first coupling portion 84 connects the first outer short-circuit end 82 to the first inner short-circuit end 83 which is displaced by 60° from the first outer short-circuit end 82. The first coupling portion 84 is formed in a curved shape which is along an involute curve. As shown in FIG. 9, the first coupling portion 84 extends to the first inner short-circuit end 83 which is displaced by 60° in a counterclockwise direction from the first outer short-circuit end 82, in a state in which the contact surface 51b is visible. The width of the first coupling portion 84 is set such that the adjacent first coupling portions 84 become in non-contact.

As shown in FIG. 9, each of the second short-circuit pieces 91 has a second outer short-circuit end 92, a second inner short-circuit end 93 and a second coupling portion 94. In other words, the second short-circuit group 90 is provided with twenty-four second outer short-circuit ends 92 which are arranged in the circumferential direction, twenty-four second inner short-circuit ends 93 which are arranged in an inner side of the second outer short-circuit end 92, and twenty-four second coupling portions 94. The second outer short-circuit end 92 is formed in a substantially rectangular plate shape. The second inner short-circuit end 93 is formed in a substantially trapezoidal plate shape. The thickness of the second short-circuit group 90 is smaller than the thickness of the segment main body 31.

The second outer short-circuit end 92 is laminated on the first outer short-circuit end 82. The dimension in the circumferential direction of the second outer short-circuit end 92 is equal to the first outer short-circuit end 82. As shown in FIG. 11A, the dimension in the radial direction of the second outer short-circuit end 92 is larger at the thickness of the first connection piece 85 than the first outer short-circuit end 82. A second connection piece 95 extending toward the segment 122 is integrally formed in an outer end in a radial direction of the second outer short-circuit end 92. The second connection piece 95 is inserted to the connection groove 36a, and is brought into contact with an outer surface in the radial direction of the first connection piece 85. A distal end of the second connection piece 95 is positioned within the same plane as the slidable contact surface 31a. The first connection piece 85 is positioned between the second connection piece 95 and the outer connection surface 132a.

As shown in FIG. 9, the second inner short-circuit end 93 is laminated on the first inner short-circuit end 83. The second inner short-circuit end 93 has the same shape as the first inner short-circuit end 83. In a state in which the contact surface 51b is visible, each of the second coupling portions 94 connects the corresponding second outer short-circuit end 92 to the second inner short-circuit end 93 which is displaced by 60° in the clockwise direction. The width of the second coupling portion 94 is set such that the second coupling portions 94 which are adjacent to each other in the circumferential direction become in non-contact.

Figure 12:
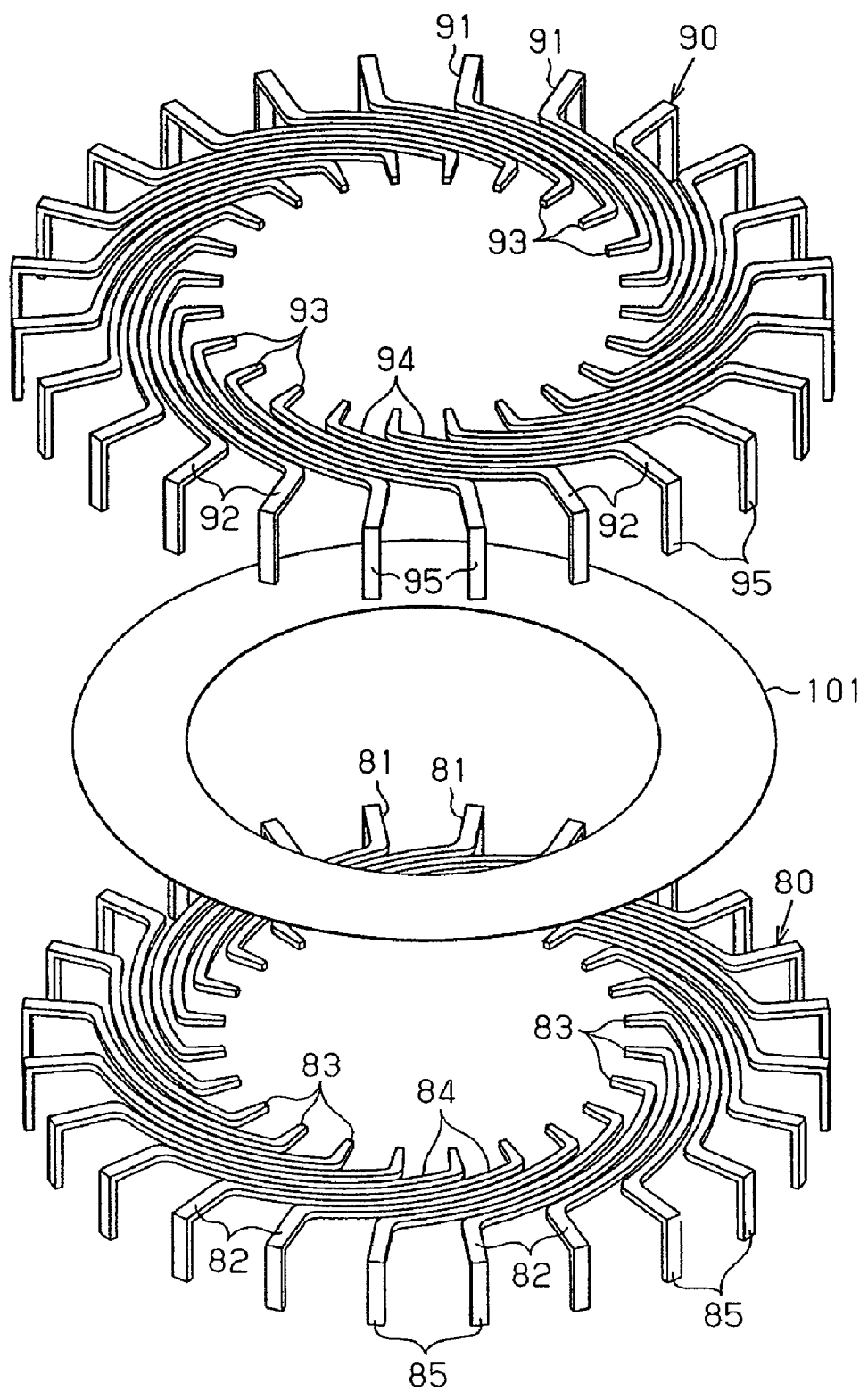
FIG. 12 is an exploded perspective view of a first short-circuit group and a second short-circuit group included in the commutator in FIG. 9.

As shown in FIGS. 11B and 12, a ring-shaped insulating paper sheet 101 is arranged between the first coupling portion 84 and the second coupling portion 94. The insulating paper sheet 101 makes the first coupling portion 84 non-contact from the second coupling portion 94.

The first short-circuit group 80 and the second short-circuit group 90 are laminated such that the first coupling portion 84 and the second coupling portion 94 are in the opposite direction. Accordingly, the short-circuit unit 123 short-circuits the segments 122 spaced at 120° with each other. The first outer short-circuit end 82 is electrically connected to the corresponding second outer short-circuit end 92 by welding. The first inner short-circuit end 83 is electrically connected to the corresponding second inner short-circuit end 93 by welding. Since the tabular first short-circuit group 80 is laminated on the tabular second short-circuit group 90, the short-circuit unit 123 is formed in a tabular shape.

The short-circuit unit 123 is arranged in the periphery of the boss portion 52 in a state of being bonded to the contact surface 51b. The end 823 is parallel to the slidable contact surface 31a. In a state in which the first connection piece 85 and the second connection piece 95 are inserted to the connection groove 36a, the short-circuit unit 123 is welded to the coil connection portion 36 from the radial direction.

The outer diameter D1 of the commutator 121, that is, the diameter of a virtual circle passing through the distal ends of the coil connection portions 36 of the segments 122 is larger than the inner diameter d1 of a virtual cylinder defined by a plurality of magnets 2, and smaller than the inner diameter d2 of the motor housing 1 (d1<D1<d2). The outer diameter D2 of the short-circuit unit 123 is smaller than the outer diameter D1 of the commutator 121. The outer diameter D2 of the short-circuit unit 123 is larger than the inner diameter d1 with regard to the magnet 2, and smaller than the inner diameter d2 of the motor housing 1 (d1<D2<D1<d2).

A distance between the opening edge 1a of the motor housing 1 and the commutator 121 is smaller than the distance between the opening edge 1a and the magnet 2. The commutator 121 does not lap over the magnet 2 in the axial direction.

Next, a description will be given of a manufacturing method of the commutator 121.

Figure 13A:
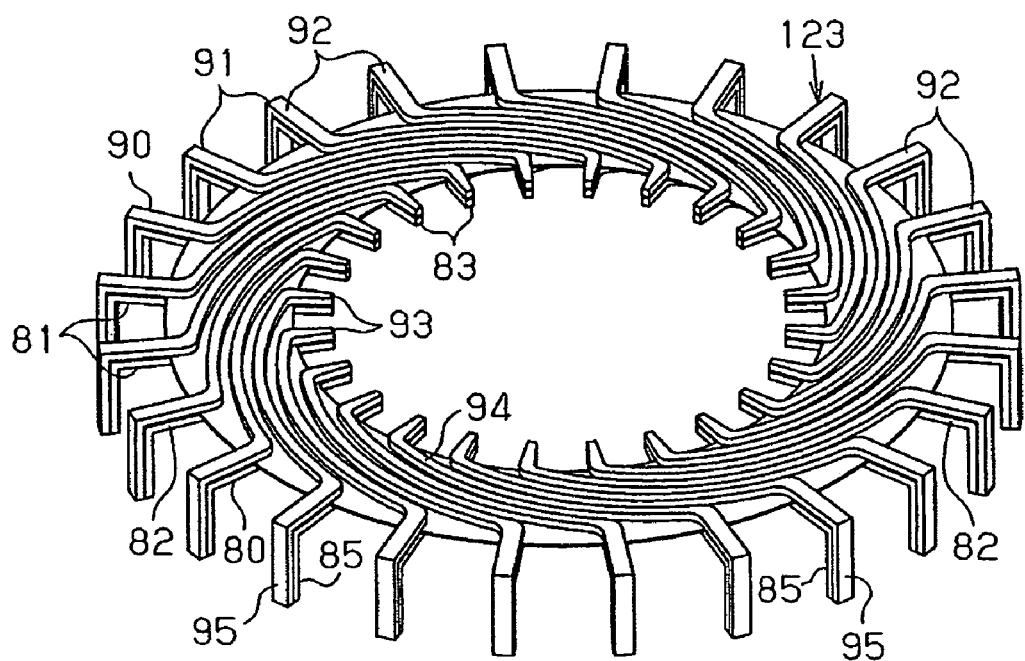
FIG. 13A is a perspective view of a short-circuit unit including a first short-circuit group and a second short-circuit group in FIG. 12.

As shown in FIG. 12, the first short-circuit group 80 and the second short-circuit group 90 of the short-circuit unit 123 are first formed. Each of the first connection piece 85 and the second connection piece 95 is formed by stamping the conductive plate member, for example, the copper plate by a punch, and bending the stamped piece. The insulating paper sheet 101 is arranged between the first coupling portion 84 and the second coupling portion 94. The inner surface in the radial direction of the second connection piece 95 is brought into contact with the outer surface in the radial direction of each of the first connection pieces 85. The second outer short-circuit end 92 is laminated on the first outer short-circuit end 82. The second inner short-circuit end 93 is laminated on each of the first inner short-circuit ends 83. As shown in FIG. 13A, the second outer short-circuit end 92 is welded to the first outer short-circuit end 82, and the second inner short-circuit end 93 is welded to the first inner short-circuit end 83, whereby the short-circuit unit 123 is finished.

The segment 122 is formed by stamping the conductive plate member by a punch. The filling recess 135 is formed by setting a part of the segment main body 31 thin at a time of stamping the segment 122. Twenty-four segments 122 are individually stamped and formed.

Figure 13B:
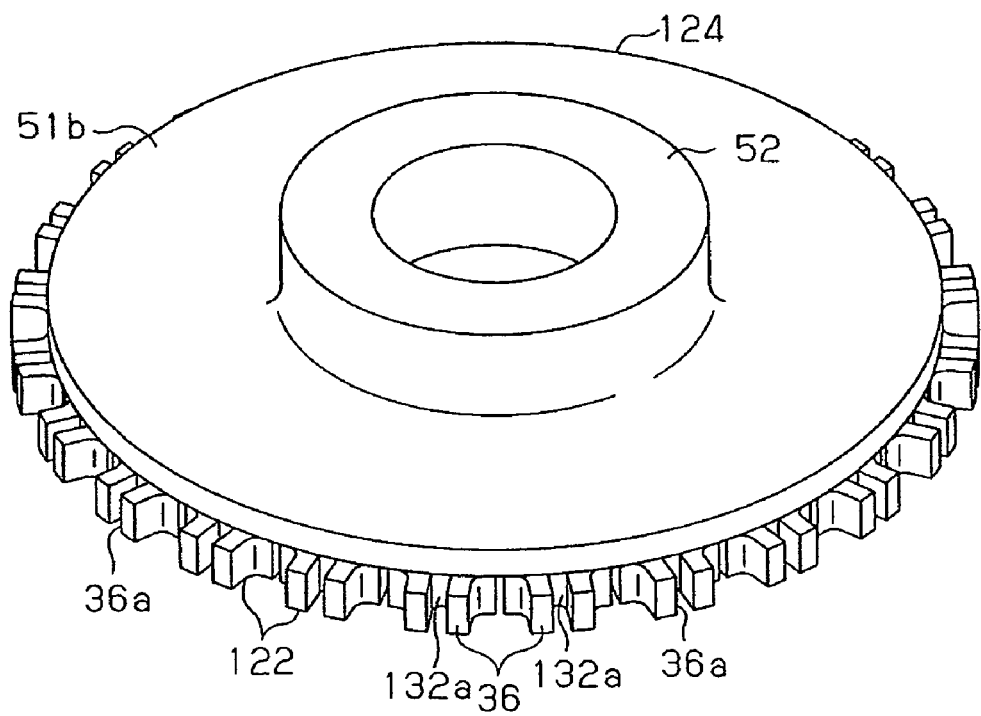
FIG. 13B is a perspective view of a holding portion included in the commutator in FIG. 9.
Figure 14:
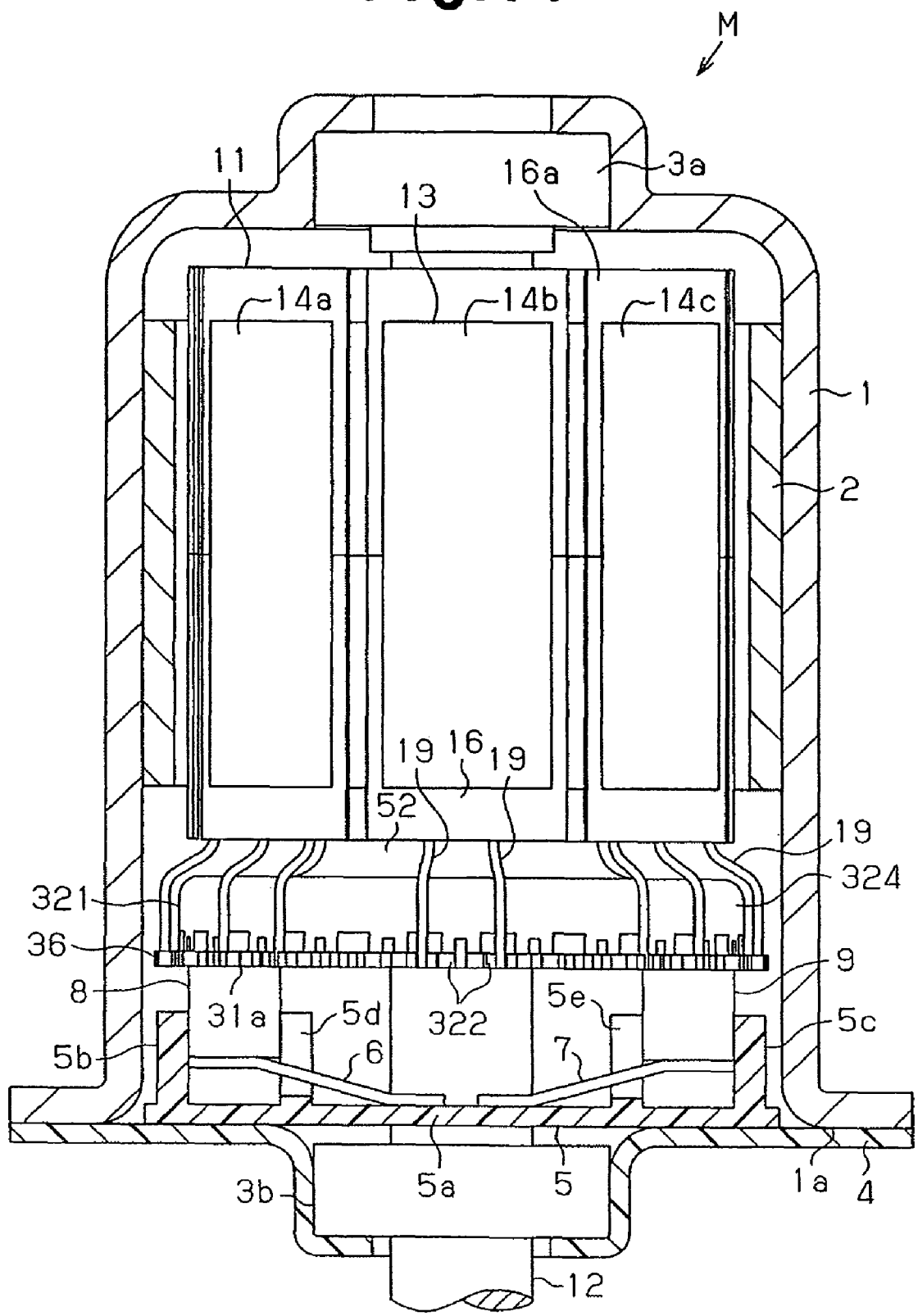
FIG. 14 is a vertical cross-sectional view of a direct-current motor in accordance with a third embodiment of the present invention.

Next, the holding portion 124 shown in FIG. 13B is formed. Twenty-four segments 122 are arranged in the radial pattern in a forming die for the holding portion 124. The forming die is filled with a molten insulative resin. The filling recess 135 is filled with the insulative resin, and the holding projection 154 is formed. The insulative resin is cooled so as to be hardened, whereby the holding portion 124 is finished and is removed from the forming die.

Next, the short-circuit unit 123 is arranged on the segments 122 which the holding portion 124 holds. As shown in FIGS. 13A and 13B, the first connection piece 85 and the second connection piece 95 of the short-circuit unit 123 are arranged so as to be directed to the holding portion 124. The first connection piece 85 and the second connection piece 95 are inserted to the connection groove 36a. The first short-circuit group 80 is brought into contact with the contact surface 51b of the holding portion 124.

Next, the short-circuit unit 123 is connected to the segment 122 which the holding portion 124 holds. The first connection piece 85 and the second connection piece 95 which are inserted to the connection groove 36a are welded to the outer connection surface 132a. Accordingly, the commutator 121 is finished.

After the rotary shaft 12 is pressed into the fitting hole 24a of the commutator 121, the conducting wire 19 of each of the coils 17a to 17h is arranged in the corresponding connection groove 36a. The conducting wire 19 is welded to the segment 122, the first connection piece 85 and the second connection piece 95 from the outer side in the radial direction. Accordingly, the armature provided with the commutator 121 is finished.

The second embodiment has the advantages (1) and (4) to (9) of the first embodiment mentioned above, and the following advantages.

(22) The short-circuit unit 123 is constituted by the first short-circuit group 80 and the second short-circuit group 90. The first coupling portion 84 is laminated in the opposite direction to the second coupling portion 94. Accordingly, the segments 122 spaced at 120° in the circumferential direction are connected so as to become at the same electric potential. The short-circuit unit 23 in accordance with the first embodiment is connected to the segment 22 in both of the outer short-circuit end 42 and the inner short-circuit end 43. The short-circuit unit 123 in accordance with the second embodiment is not connected to the segment 122 in the inner short-circuit end, but is connected to the segment 122 only in the first/outer short-circuit end 82 and the second outer short-circuit end 92. Accordingly, it is possible to easily execute a connecting work between the segment 122 and the short-circuit unit 123.

(23) The short-circuit unit 123 is constituted by the first short-circuit group 80 and the second short-circuit group 90 which are respectively rotated at 60°. Accordingly, for example, in comparison with the case of the short-circuit unit provided with three or more short-circuit groups rotating at 60°, it is possible to minimize the number of the short-circuit group. Accordingly, it is easy to execute an assembling work of the commutator 121, and it is possible to downsize the dimension in the axial direction of the commutator 21.

(24) The first connection piece 85 and the second connection piece 95 are inserted to the connection groove 36a which the coil connection portion 36 of the holding portion 124 has. Accordingly, it is possible to regulate a relative movement of the short-circuit unit 123 with respect to the segment 122. Therefore, it is easy to position the short-circuit unit 123 to the segment 122, and it is easy to stabilize the connection state of the short-circuit unit 123 to the segment 122.

(25) The thickness of each of the first short-circuit group 80 and the second short-circuit group 90 is smaller than the thickness of the segment 122. For example, in comparison with the segment 122, the first short-circuit group 80 and the second short-circuit group 90 are easily bent. Accordingly, it is easy to manufacture the short-circuit unit 123 and the segment 122.

(26) The boss portion 52 is inserted to the inner side of the short-circuit unit 123, whereby the short-circuit unit 123 is assembled in the holding portion 124. Accordingly, the movement in the radial direction of the short-circuit unit 123 is regulated by the boss portion 52. Therefore, the short-circuit unit 123 is hard to be displaced with respect to the holding portion 124.

(28) The short-circuit unit 123 is arranged on the segments 122 held by the holding portion 124. In other words, in a state in which the holding portion 124 defines the positions of a plurality of segments 122, the short-circuit unit 123 is arranged on the segments 122. Accordingly, it is easy to arrange the short-circuit unit 23 in the segment 122.

A description will be given below of a third embodiment in accordance with the present invention with reference to FIGS. 14 to 20.

Figure 17A:
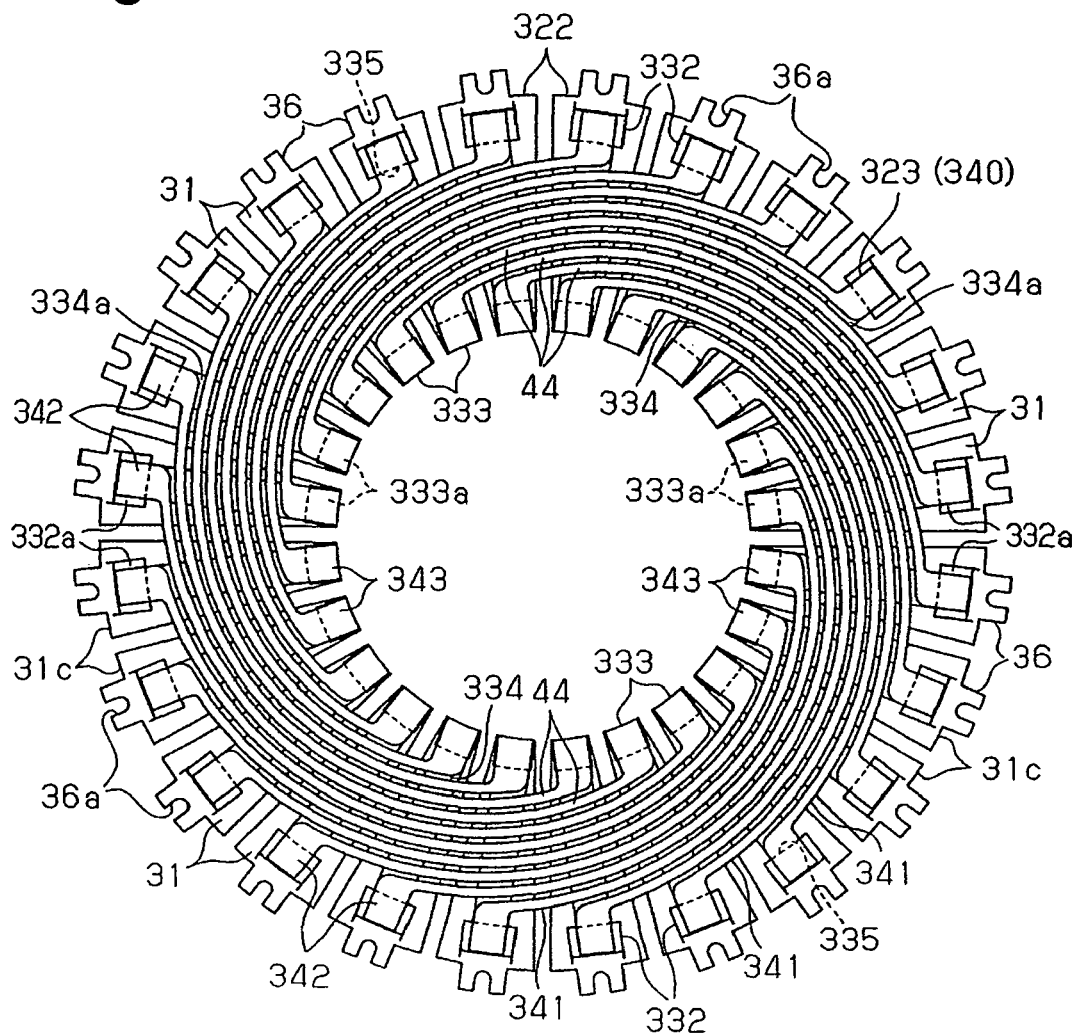
FIG. 17A is a plan view of a plurality of segments and short-circuit units shown in FIG. 15.
Figure 17B:
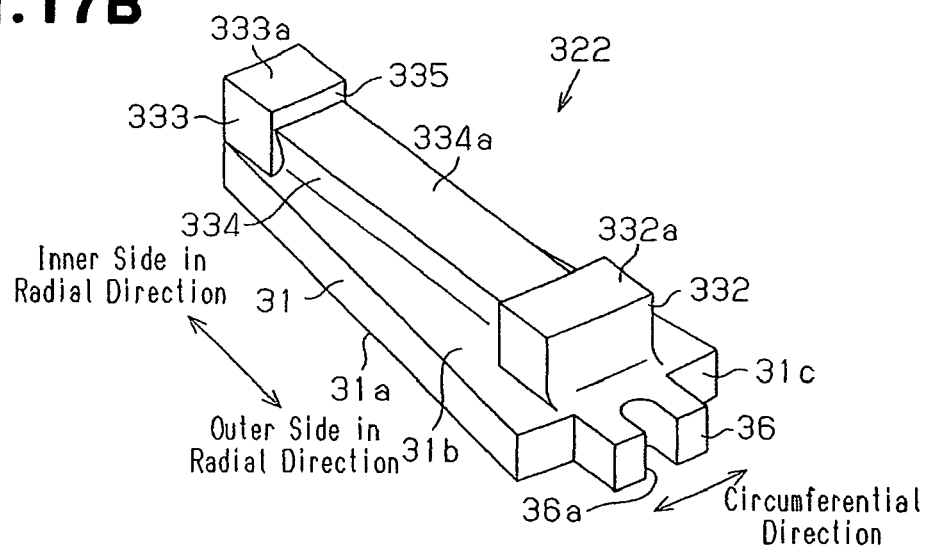
FIG. 17B is an enlarged perspective view of the segment shown in FIG. 17A.

As shown in FIGS. 17A and 17B, an outer connection portion 332 is formed in a rectangular parallelepiped shape in a segment 322 of a commutator 321. The outer connection portion 332 protrudes to an opposite side to the slidable contact surface 31a from a portion near an outer end in the radial direction of the segment main body 31. The dimension in the circumferential direction of the outer connection portion 332 is smaller than the dimension in the circumferential direction of the outer end in the radial direction of the segment main body 31. A protruding amount of the outer connection portion 332, that is, the dimension in the vertical direction in FIG. 17B is slightly larger than the thickness of the segment main body 31. In FIG. 17B, an upper end of the outer connection portion 332 is an outer connection surface 332a which is parallel to the slidable contact surface 31a.

As shown in FIG. 17B, an inner connection portion 333 is formed in a rectangular parallelepiped shape. The inner connection portion 333 protrudes to an opposite side to the slidable contact surface 31a from an inner end in the radial direction of the segment main body 31. The dimension in the circumferential direction of the inner connection portion 333 is equal to or slightly smaller than the dimension in a circumferential direction of the inner end in the radial direction of the segment main body 31. A protruding amount of the inner connection portion 333 is slightly larger than the thickness of the segment main body 31. In FIG. 17B, an upper end of the inner connection portion 333 is an inner connection surface 333a which is parallel to the slidable contact surface 31a. The inner connection surface 333a exists within the same virtual plane as the outer connection surface 332a.

As shown in FIG. 17B, the segment main body 31 has an intermediate protruding portion 334 extending to the inner connection portion 333 from the outer connection portion 332. The intermediate protruding portion 334 protrudes from the bonded surface 31b of the segment main body 31. In other words, the intermediate protruding portion 334 protrudes to an opposite side to the slidable contact surface 31a, and extends along a radial direction of the commutator 321. The thickness of the intermediate protruding portion 334 is smaller than the thickness of the outer connection portion 332. Accordingly, a separating recess 335 is positioned between the outer connection portion 332 and the inner connection portion 333. In other words, a separating recess 335 is defined by a second bonded surface 334a corresponding to an upper surface of the intermediate protruding portion 334, an inner surface in a radial direction of the outer connection portion 332, and an outer surface in a radial direction of the inner connection portion 333. The second bonded surface 334a, the slidable contact surface 31a, the outer connection surface 332a and the inner connection surface 333a are parallel to each other.

The coil connection portion 36 protrudes to the outer side in the radial direction from the outer end surface 31c in the radial direction of the segment main body 31.

As shown in FIG. 17A, the short-circuit unit 323 is constituted by one short-circuit group 340. The short-circuit group 340 has twenty-four short-circuit pieces 341. Each of the short-circuit pieces 341 has an outer short-circuit end 342, an inner short-circuit end 343 and a coupling portion 44.

Figure 15:
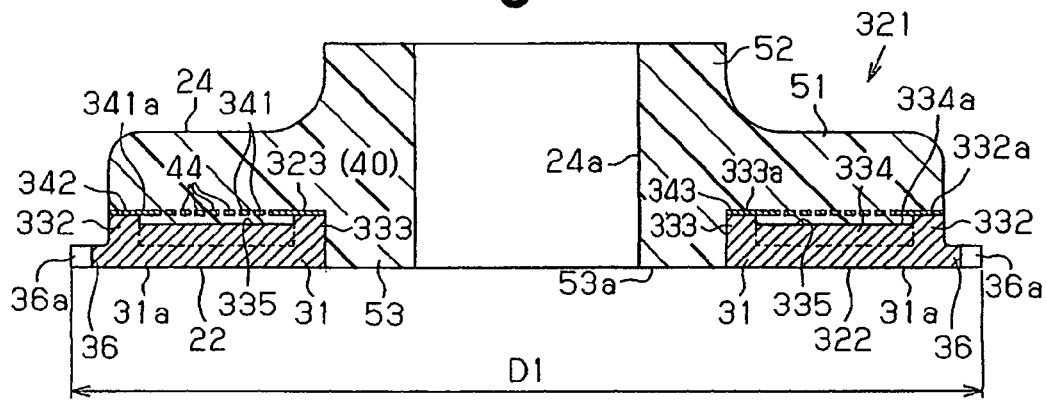
FIG. 15 is a vertical cross-sectional view of a commutator shown in FIG. 14, that is, a cross-sectional view taken along line 15-15 in FIG. 16.
Figure 16:
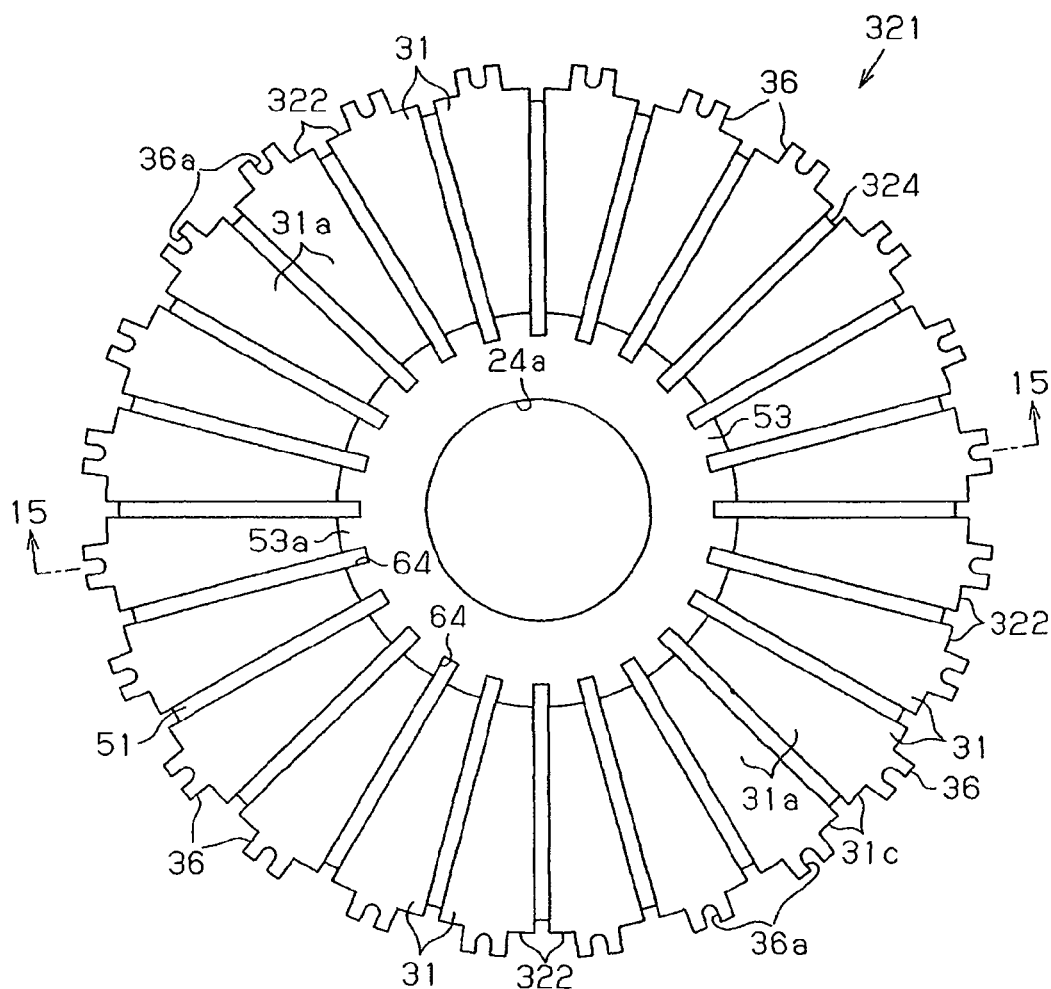
FIG. 16 is a bottom elevational view of the commutator in FIG. 15.

As shown in FIGS. 15 and 17A, the outer short-circuit end 342 has a rectangular tabular shape which is parallel to the slidable contact surface 31a of the segment 322. In other words, the outer short-circuit end 342 is parallel to the outer connection surface 332a. The dimension in the circumferential direction of the outer short-circuit end 342 is slightly smaller than the dimension in the circumferential direction of the outer connection surface 332a. The dimension in the radial direction of the outer short-circuit end 342 is slightly larger than the dimension in the radial direction of the outer connection surface 332a. An outer end in the radial direction of each of the outer short-circuit ends 342 agrees with the outer end in the radial direction of the outer connection surface 332a in the segment 322, as viewed in the axial direction.

Each of the inner short-circuit ends 43 has a rectangular tabular shape which is parallel to the slidable contact surface 31a of the segment 322, and the inner connection surface 333a. The dimension in the circumferential direction of each of the inner short-circuit ends 43 is substantially equal to the dimension in the circumferential direction of the inner connection surface 333a in the segment 322. The dimension in the radial direction of each of the inner short-circuit ends 43 is slightly larger than the dimension in the radial direction of the inner connection surface 333a. An inner end in the radial direction of each of the inner short-circuit ends 43 agrees with an inner end in the radial direction of the inner connection surface 333a.

As shown in FIG. 17A, each of the coupling portions 44 connects the corresponding outer short-circuit end 342 to the inner short-circuit end 43 which is displaced by 120° from the outer short-circuit end 342. As shown in FIG. 15, the thickness of the short-circuit group 340 is smaller than the thickness of the segment main body 31.

As shown in FIGS. 15 and 17A, the outer short-circuit end 342 is welded to the outer connection surface 332a of the segment 322. The inner short-circuit end 43 is welded to the inner connection surface 333a. The tabular short-circuit unit 323 is arranged parallel to the slidable contact surface 31a. Each of the coupling portions 44 of the short-circuit unit 323 faces the separating recess 335 with respect to the axial direction. Accordingly, the coupling portion 44 is in a non-contact state with respect to the second bonded surface 334a of the intermediate protruding portion 334.

The short-circuit unit 323 short-circuits the segments 322 arranged so as to be spaced at 120° in the circumferential direction with each other.

As shown in FIG. 15, the holding portion 324 has the ring plate 51, the boss portion 52, and the cylindrical support portion 53. The support portion 53 extends in an opposite direction to the boss portion 52 from the ring plate 51. Twenty-four segments 322 are arranged in a radial pattern around the support portion 53.

An inner end in the radial direction of each of the segments 322 is brought into contact with the support portion 53. The distal end surface 53a of the support portion 53 is positioned within the same plane as the slidable contact surface 31a.

The separating recess 335 of each of the segments 322 is filled with the insulative resin material constituting the ring plate 51. Accordingly, it is possible to secure the insulating state between the coupling portion 44 and the second bonded surface 334a of the intermediate protruding portion 334.

The conducting wire 19 of each of the coils 17a to 17h is welded to the coil connection portion 36 from the outer side in the radial direction, in the connection groove 36a.

Next, a description will be given of a manufacturing method of the commutator 321.

Figure 18:
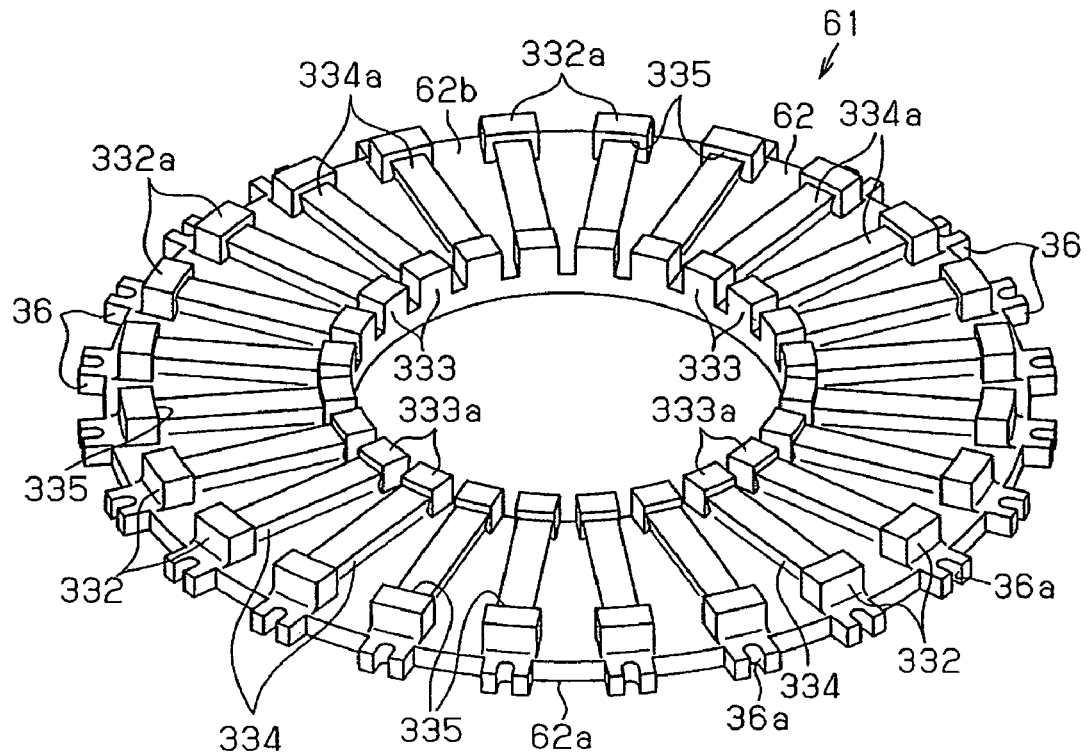
FIG. 18 is a perspective view of a mother member including a plurality of segments.

As shown in FIG. 18, in order to manufacture a plurality of segments 322, a mother member 61 is prepared. The mother member 61 is provided with an annular mother main body 62 to manufacture a plurality of the segment main bodies 31. The width in a radial direction of the mother main body 62 is equal to the dimension in the radial direction of the segment main body 31. The thickness of the mother main body 62 is equal to the thickness of the segment main body 31. The mother main body 62 has a flat surface 62a for forming the slidable contact surface 31a, and a bonded surface 62b in an opposite side to the flat surface 62a. In FIG. 18, the flat surface 62a faces downward is directed to a lower side, and the bonded surface 62b faces upward. Twenty-four outer connection portions 332, twenty-four inner connection portions 333 and twenty-four intermediate protruding portions 334 protrude from the bonded surface 62b. Twenty-four separating recesses 335 also exists in the bonded surface 62b. Twenty-four coil connection portions 36 protrude to an outer side in a radial direction from an outer circumferential surface of the mother main body 62.

The mother member 61 is formed by sintering a conductive metal pulverulent body, for example, a copper pulverulent body. The metal pulverulent body is pressurized in the axial direction of the mother member 61 at a time of sintering. In other words, the metal pulverulent body is pressurized from a direction perpendicular to the flat surface 62a.

Figure 19:
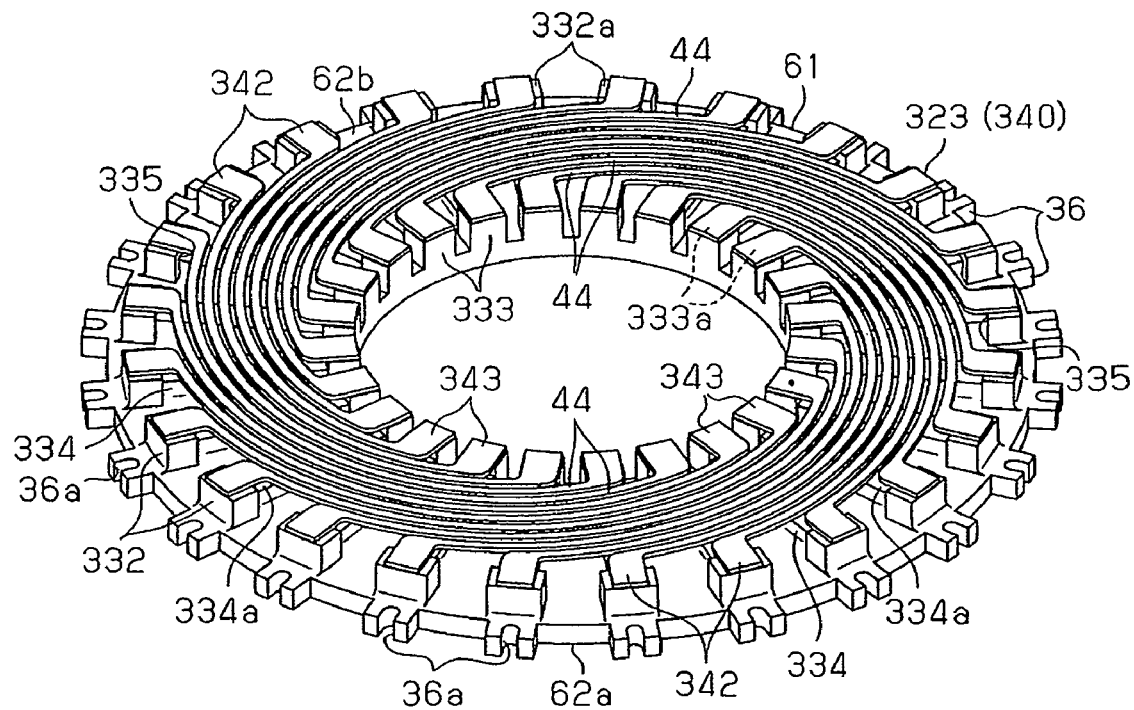
FIG. 19 is a perspective view of a mother member in FIG. 17B mounting the short-circuit unit in FIG. 17A.

Further, the short-circuit unit 323 shown in FIG. 19 is formed by stamping the conductive plate member, for example, the copper plate by a punch.

As shown in FIG. 19, the short-circuit unit 323 is arranged in the mother member 61. The outer short-circuit end 342 is arranged on the outer connection portion 332, and the inner short-circuit end 43 is arranged on the inner connection portion 333. The tabular short-circuit unit 323 is parallel to the flat surface 62a in a state of being arranged in the mother member 61. The coupling portion 44 faces the separating recess 335 in the axial direction. A gap exists between the second bonded surface 334a of the intermediate protruding portion 334 and the coupling portion 44. In other words, the segment 322 is in non-contact with the coupling portion 44.

After arranging the short-circuit unit 323 in the mother member 61, the outer short-circuit end 342 is welded to the outer connection portion 332. The inner short-circuit end 43 is welded to the inner connection portion 333.

Next, the holding portion 324 is formed. The mother member 61 and the short-circuit unit 323 which are connected to each other are accommodated in the forming die. The forming die is filled with molten insulative resin. The insulative resin fills between the coupling portions 44 which are adjacent in the circumferential direction, and in the separating recess 335. The insulative resin also fills the inner side in the radial direction of the mother member 61 so as to form the support portion 53. If the insulative resin is cooled, the holding portion 324 is finished, and is removed from the forming die.

Figure 20:
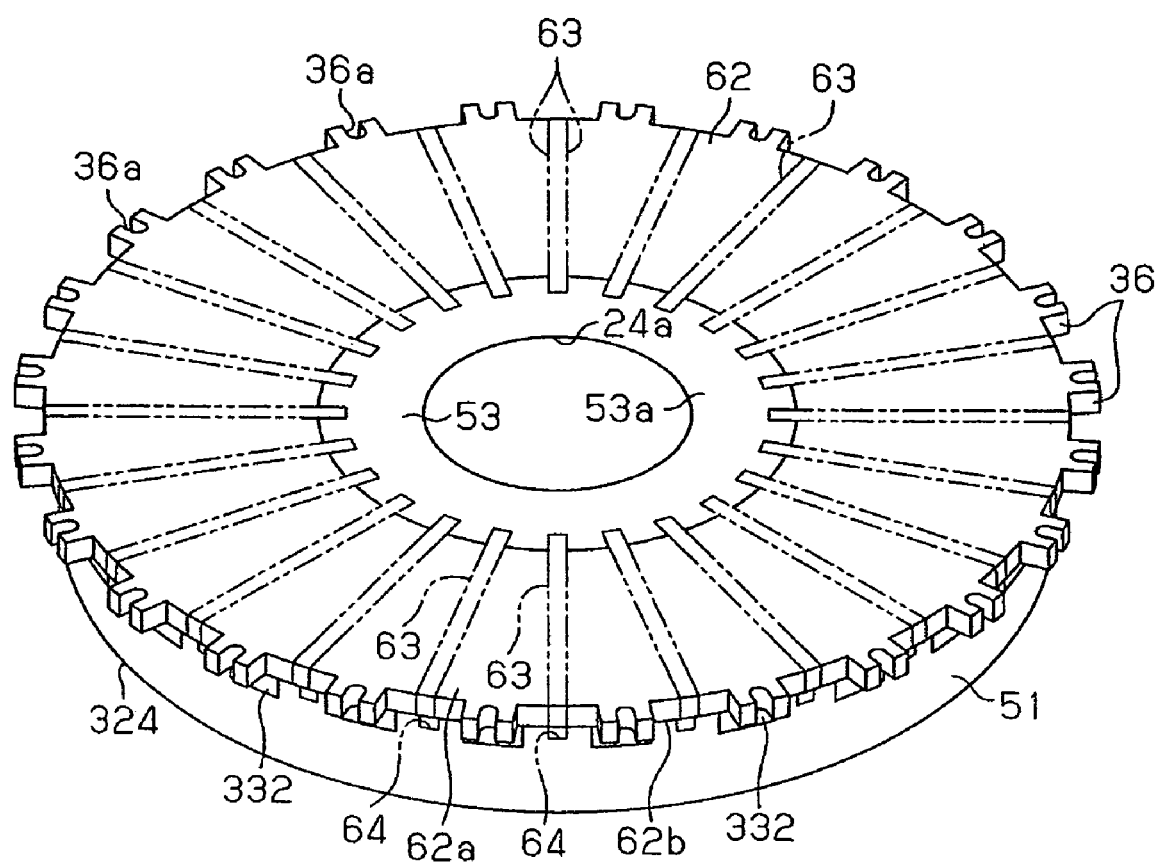
FIG. 20 is a perspective view of a holding portion embedding the mother member and the short-circuit unit in FIG. 19 as viewed from the bottom.
Figure 21:
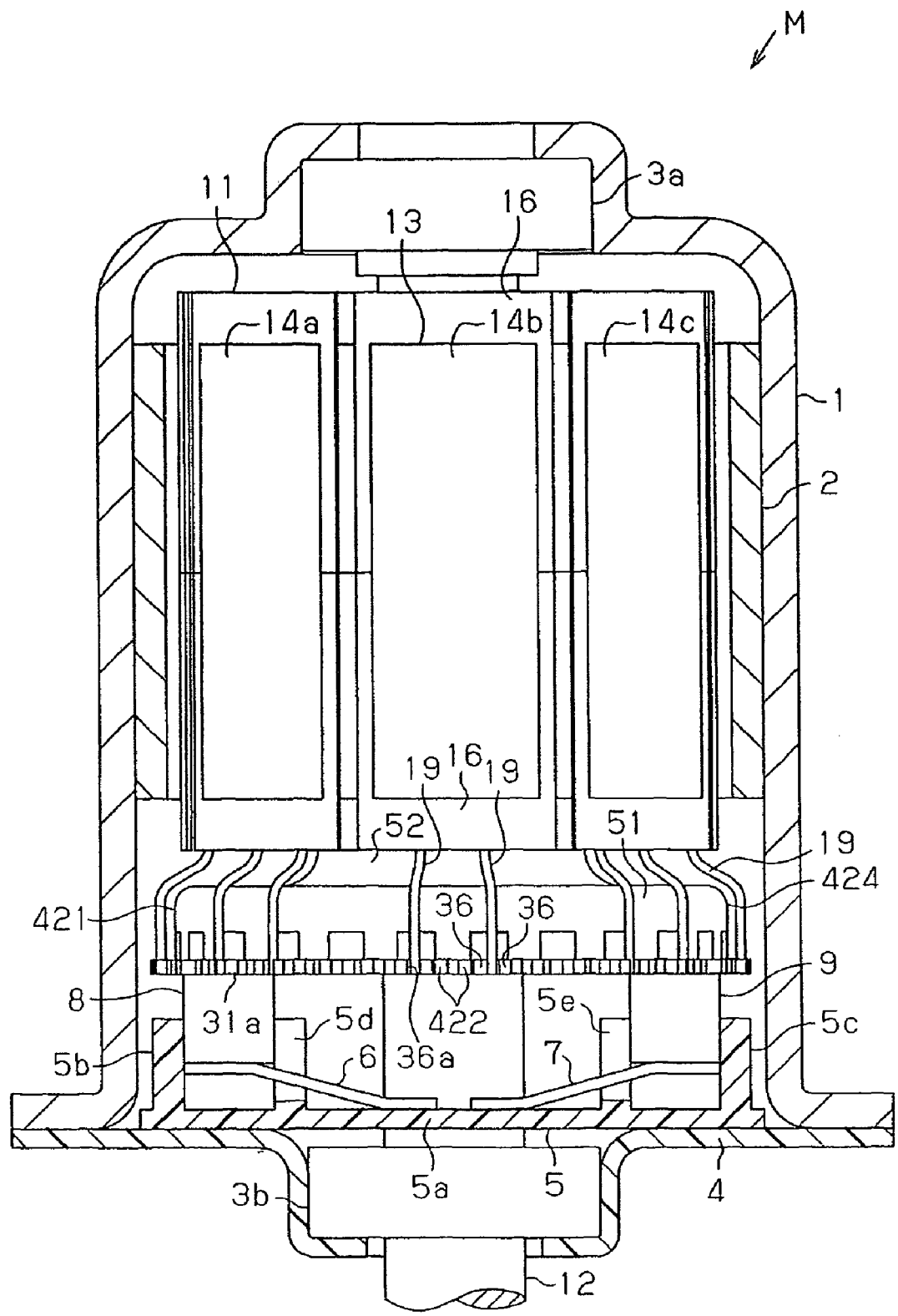
FIG. 21 is a vertical-cross-sectional view of a direct-current motor in accordance with a fourth embodiment of the present invention.
Figure 22:
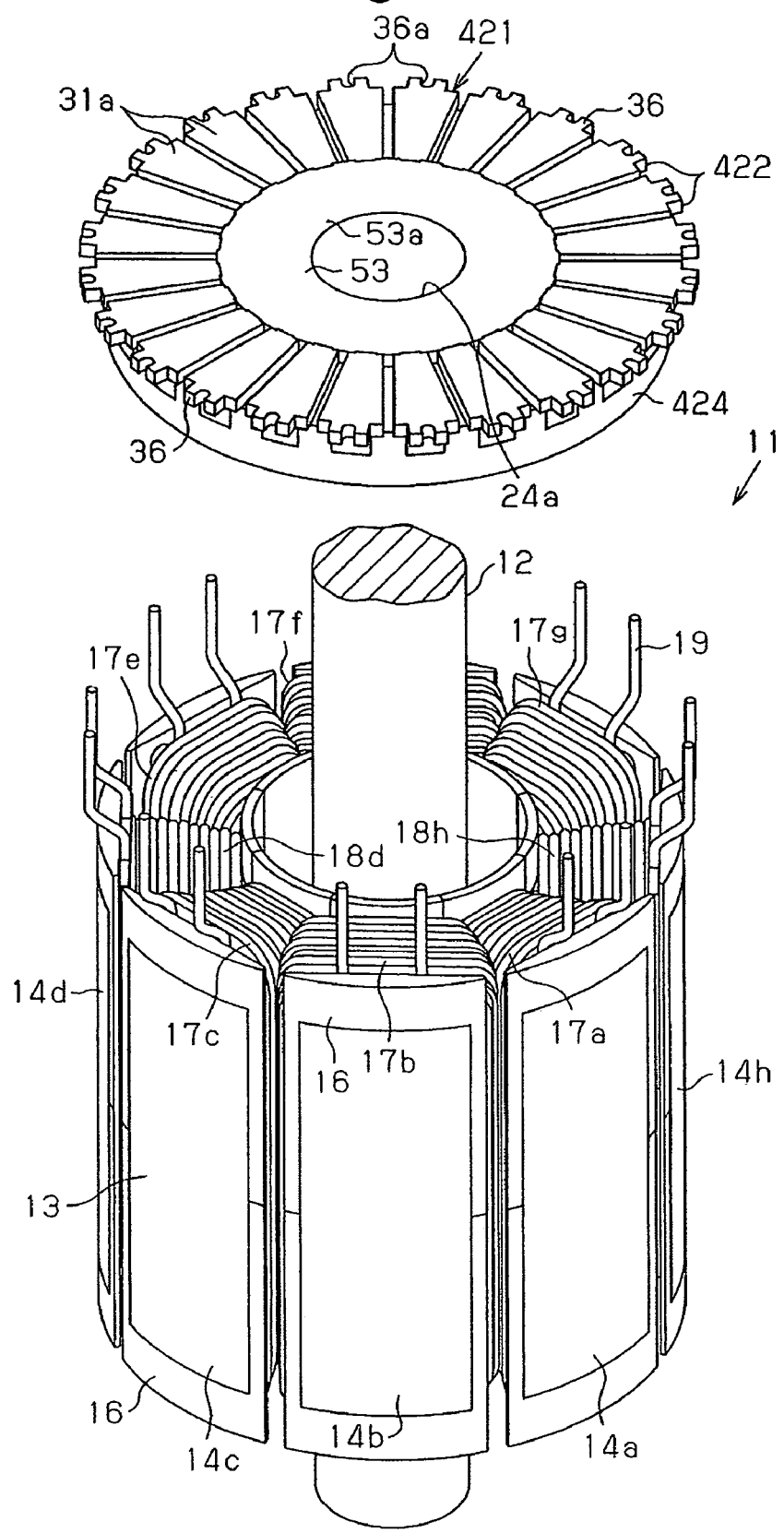
FIG. 22 is an exploded perspective view of an armature shown in FIG. 21.
Figure 23:
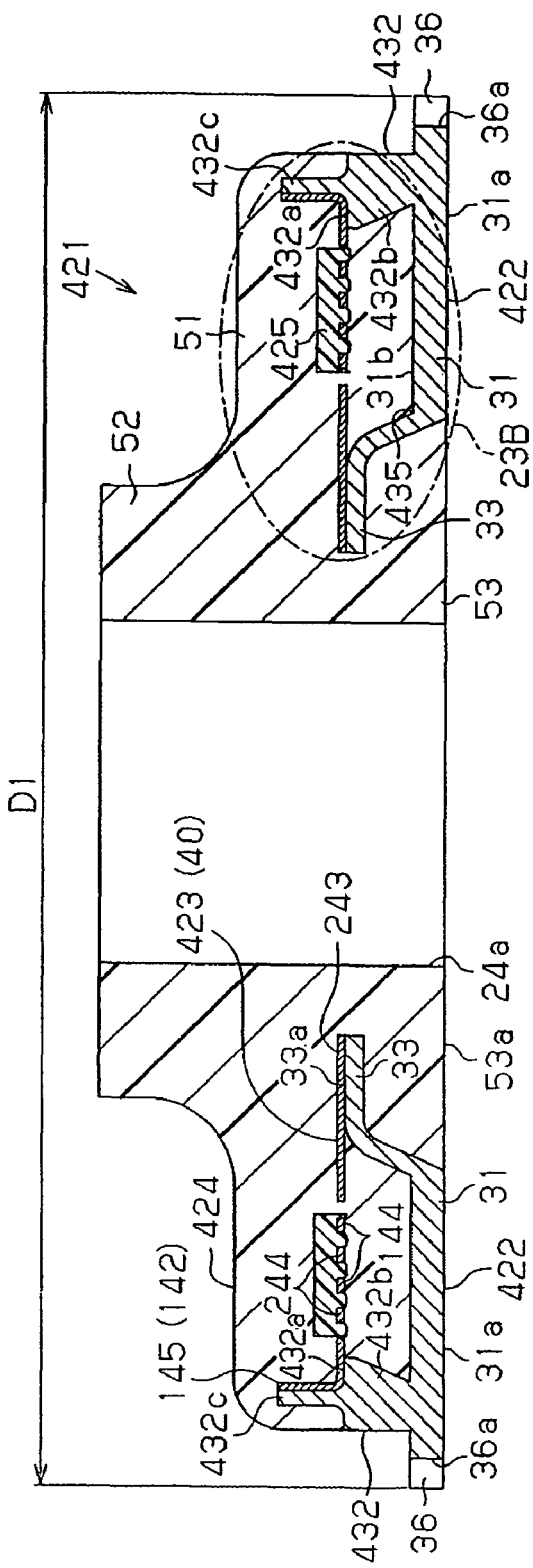
FIG. 23A is a vertical cross-sectional view of a commutator in FIG. 22, that is, a cross-sectional view taken along line 23A-23A in FIG. 24.
FIG. 23B is a partly enlarged view of FIG. 23A.

As shown in FIG. 20, twenty-four segments 322 are formed by cutting the mother member 61 and the holding portion 324 along a two-dot chain line 63. A groove 64 having a depth which does not reach the short-circuit unit 323 is formed in the holding portion 324. The two-dot chain line 63 extends in a radial direction of the mother main body 62 between the outer connection portions 332 which are adjacent in the circumferential direction. In a state in which each of the bonded surfaces 31b is held by the holding portion 324, the mother member 61 is cut. Accordingly, each of the segments 322 is already held by the holding portion 324 in a state of being disconnected from the mother member 61. As a result, the commutator 321 is finished.

The third embodiment has the following advantages.

(31) Each of the segments 322 has the separating recess 335 between the outer connection portion 332 and the inner connection portion 333. The coupling portion 44 of the short-circuit unit 323 faces the separating recess 335. Accordingly, it is possible to maintain the coupling portion 44 in non-contact with the segment 322, and it is possible to secure an insulating characteristic of the coupling portion 44 with respect to the segment 322. Each of the segments 322 is constituted by a comparatively simple structure having the outer connection portion 332 and the inner connection portion 333. Accordingly, it is possible to prevent the manufacturing step of the commutator 321, in which the insulating characteristic is secured, from being complicated.

(32) The separating recess 335 is filled with the insulating material of the holding portion 324. Accordingly, it is possible to prevent each of the segments 322 from being short-circuited with each of the coupling portions 44.

(34) The holding portion 324 has the support portion 53 which is brought into contact with the inner end in the radial direction of each of the segments 322. The support portion 53 regulates the movement in the radial direction of the segment 322. The distal end surface 53a of the support portion 53 exists within the same plane as the slidable contact surface 31a. Accordingly, the entire circumferential surface of the support portion 53 is brought into contact with the segment 322. In other words, it is possible to secure a contact area between the support portion 53 and the segment 322. Therefore, the holding portion 324 further stably holds each of the segments 322.

(35) In a state in which the holding portion 324 holds the mother member 61, the mother member 61 is cut, and a plurality of segments 322 are formed. Accordingly, a plurality of segments 322 are prevented from being scattered in all directions during the manufacturing step. Therefore, for example, in comparison with the case that the holding portion 324 is manufactured after individually manufacturing a plurality of segments 322, a handling of the parts of the commutator 321 is more easily executed during the manufacturing step.

(36) The mother member 61 is formed in accordance with the sintering process. Accordingly, even if the shape of the segment 322 is complicated, it is possible to easily form the segment 22. The present embodiment is easier, for example, than the case that the segment 322 is formed from a flat plate.

In the sintering process, the material of the mother member 61 is pressurized. Accordingly, a flatness of the slidable contact surface 31a is improved. As a result, the anode brush 8 and the cathode brush 9 can be further smoothly brought into slidable contact with the slidable contact surface 31a. Therefore, it is possible to improve a reliability of a current supply to the commutator 321 from the anode brush 8 and the cathode brush 9.

A description will be given of a fourth embodiment in accordance with the present invention with reference to FIGS. 21 to 35.

As shown in FIG. 23A, a commutator 421 has twenty-four segments 422, a short-circuit unit 423 and a holding portion 424. Further, the commutator 421 has a separating member 425 arranged in the short-circuit unit 423. The holding portion 424 holds the segments 422, the short-circuit unit 423 and the separating member 425.

Figure 24:
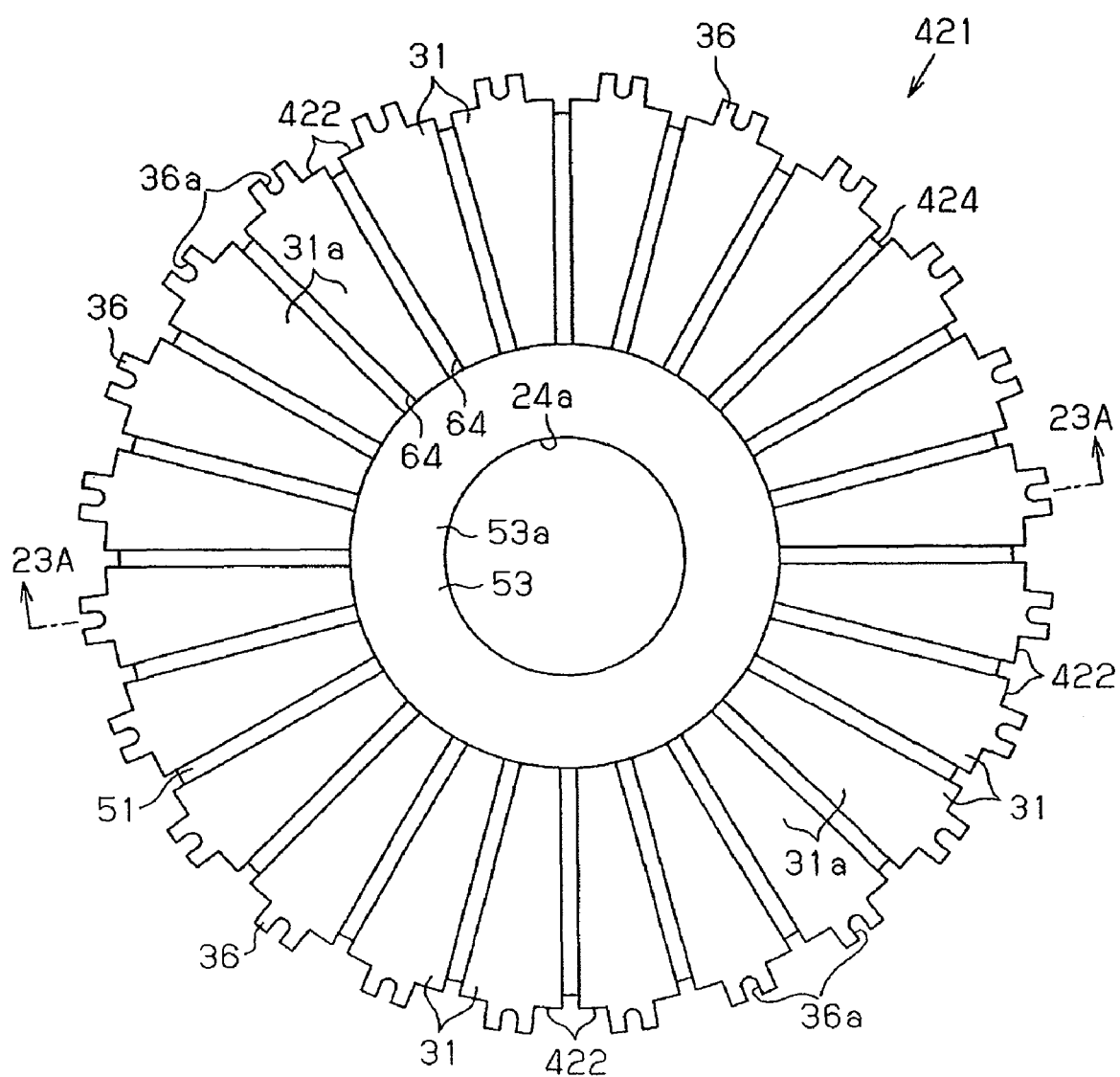
FIG. 24 is a bottom elevational view of the commutator in FIG. 23A.
Figure 25A:
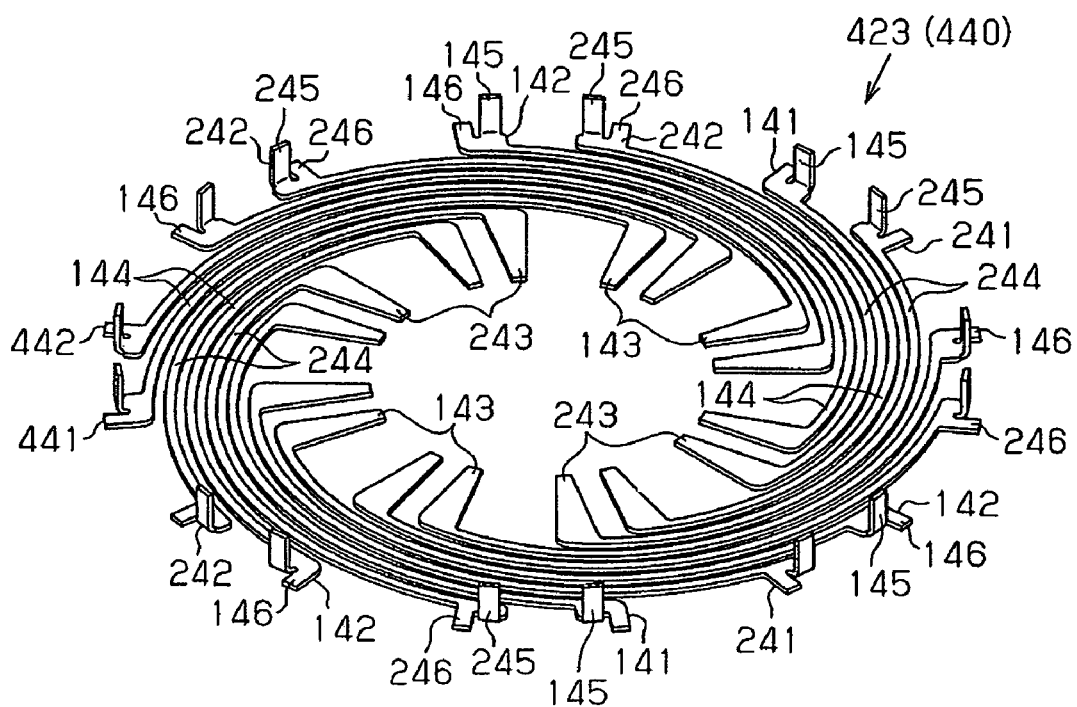
FIG. 25A is a perspective view of a short-circuit unit shown in FIG. 23A.
Figure 25B:
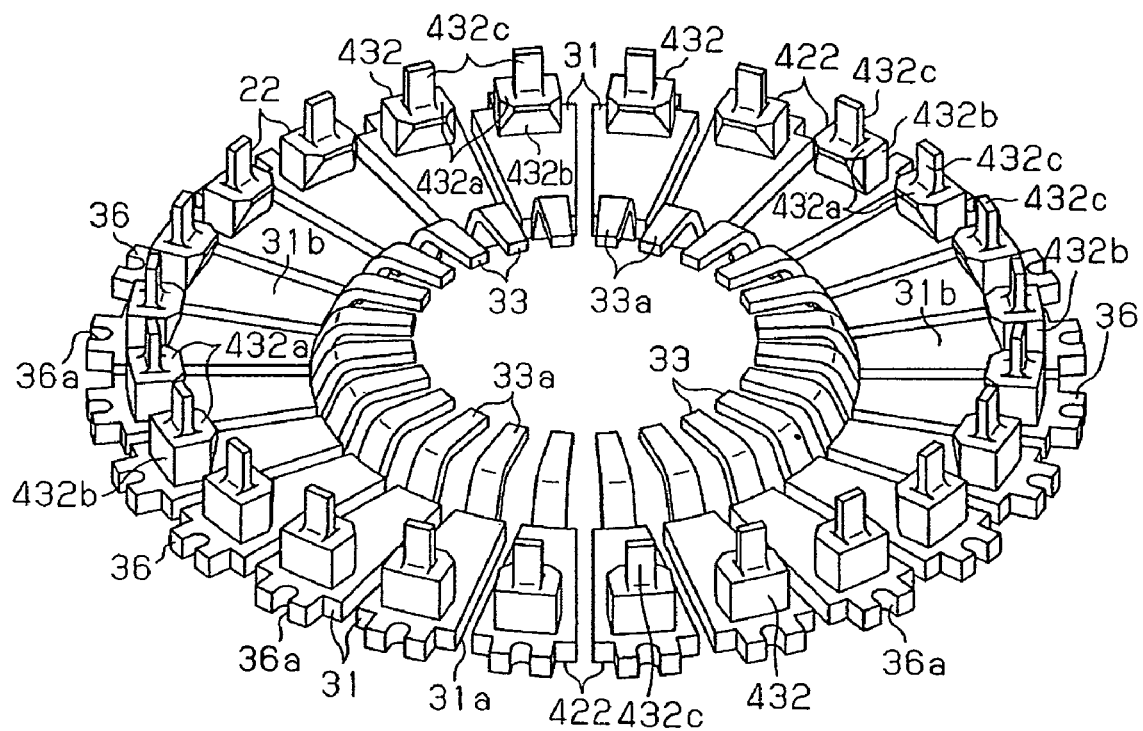
FIG. 25B is a perspective view of a plurality of segments shown in FIG. 23A.

As shown in FIGS. 24 and 25B, each of the segments 422 is provided with the segment main body 31, an outer connection portion 432, the inner connection portion 33, and the coil connection portion 36. The segment main body 31 and the inner connection portion 33 are the same as those shown in FIGS. 3 and 7B. The coil connection portion 36 is the same as that shown in FIG. 10.

The outer connection portion 432 is close to the outer end in the radial direction of the segment main body 31. The outer connection portion 432 includes a substantially rectangular parallelepiped base portion 432b protruding from the bonded surface 31b, and a connection projection 432c protruding to an opposite side to the slidable contact surface 31a from the base portion 432b. As shown in FIG. 25B, the dimension in the circumferential direction of the base portion 432b is smaller than the dimension in the circumferential direction of the corresponding portion of the segment main body 31. The base portion 432b has an outer connection surface 432a which is parallel to the slidable contact surface 31a. The connection projection 432c is formed in a strip shape, and extends to an opposite side to the slidable contact surface 31a from a substantially center of the outer connection surface 432a. An inner surface in a radial direction of the base portion 432b is sloped in such a manner that the holding portion 424 is well engaged with the outer connection portion 432. Each of the outer connection surfaces 432a is arranged within the same plane as each of the inner connection surfaces 33a.

As shown in FIG. 25A, the short-circuit unit 423 includes one tabular short-circuit group 440. The short-circuit group 440 includes eight first short-circuit pieces 141, and eight second short-circuit pieces 241. In other words, eight first short-circuit pieces 141 and eight second short-circuit pieces 241 serve as totally sixteen short-circuit pieces (short-circuit lines). The first short-circuit pieces 141 and the second short-circuit pieces 241 are arranged alternately in the circumferential direction.

Each of the tabular first short-circuit pieces 141 includes a first outer short-circuit end 142, a first inner short-circuit end 143 and a first coupling portion 144.

The first outer short-circuit end 142 has a substantially rectangular tabular first contact portion 146 extending in a radial direction, and a first connection piece 145 extending perpendicularly to the first contact portion 146. In FIG. 25A, the first connection piece 145 serving as a weld portion is positioned in a clockwise side of the first contact portion 146.

As shown in FIG. 25A, as viewed in the above of FIG. 23A, the first coupling portion 144 couples the corresponding first outer short-circuit end 142 to the first inner short-circuit end 143 which is displaced by 120° in the clockwise direction from the first outer short-circuit end 142. The first coupling portion 144 has a rectangular cross-sectional. Eight first outer short-circuit ends 142 are arranged at a uniform angular interval, that is, at an interval of 45°. Eight first inner short-circuit ends 143 are also arranged at an interval of 45°.

Each of the tabular second short-circuit pieces 241 includes a second outer short-circuit end 242, a second inner short-circuit end 243 and a second coupling portion 244.

The second outer short-circuit end 242 has a second connection piece 245 and a second contact portion 246 which are line symmetrical to the first connection piece 145 and the first contact portion 146.

The second coupling portion 244 couples the corresponding second outer short-circuit end 242 to the inner short-circuit end 243 which is displaced by 120° in the clockwise direction from the second outer short-circuit end 242. Eight second outer short-circuit ends 242 are arranged at an interval of 45°. The second connection piece 245 is adjacent to the closer first connection piece 145 at an interval of 15°, and is adjacent to the far side first connection piece 145 at an interval of 30°.

The second inner short-circuit end 243 is adjacent to the closer first inner short-circuit end 143 at an interval of 15°, and is adjacent to the far side first inner short-circuit end 143 at an interval of 30°. 15° corresponds to an angle of an interval between twenty-four segments 422.

Figure 31:
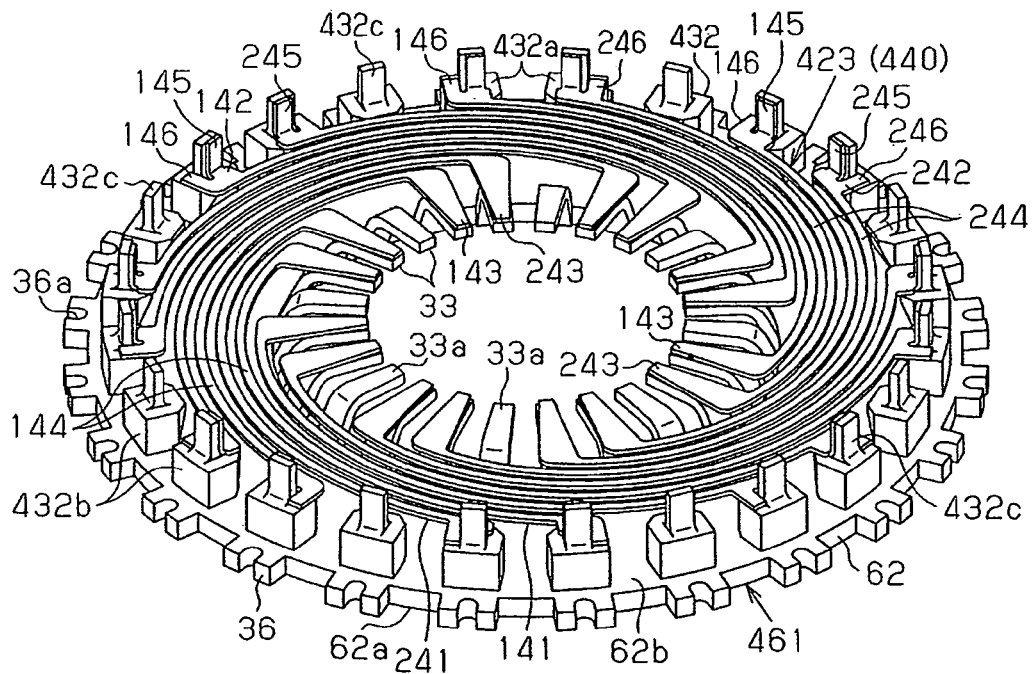
FIG. 31 is a perspective view of the mother member in FIG. 30 mounting the short-circuit unit in FIG. 25A.

As shown in FIG. 31, each of the first contact portion 146 and the second contact portion 246 is brought into contact with the outer connection surface 432a. The outer surface in the radial direction of the first connection piece 145 is welded to the inner surface in the radial direction of the connection projection 432c. The outer surface in the radial direction of the second connection piece 245 is welded to the inner surface in the radial direction of the connection projection 432c. The short-circuit unit 423 short-circuits the segments 422 at an interval of 120° with each other.

The base portion 432b and the inner connection portion 33 protrude to an opposite side to the slidable contact surface 31a from the bonded surface 31b. Accordingly, the first coupling portion 144 is in non-contact with the bonded surface 31b. The second coupling portion 244 is also in non-contact with the bonded surface 31b.

Figure 26A:
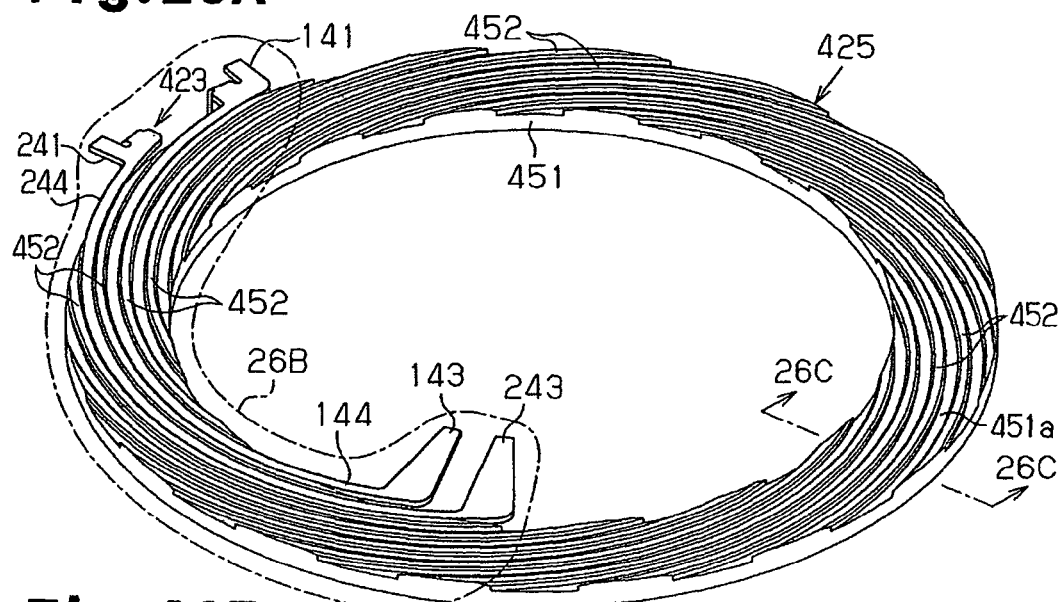
FIG. 26A is a perspective view in which a separating member shown in FIG. 23A is inverted up and down.
Figure 26B:
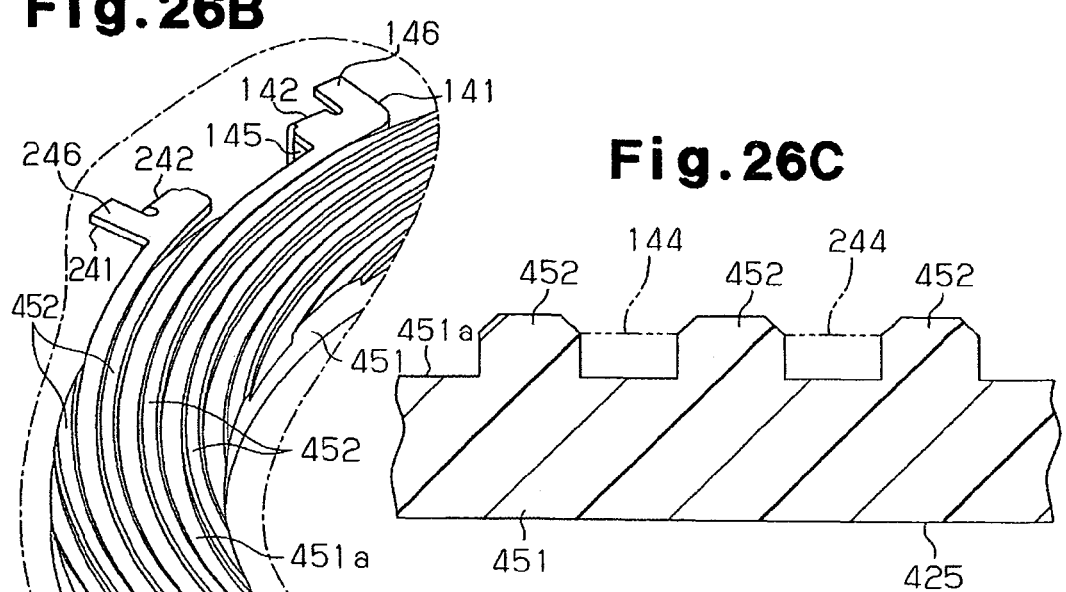
FIG. 26B is a partly enlarged view of the separating member in FIG. 26A.

As shown in FIGS. 23A and 23B, the separating member 425 is formed in a substantially circular ring shape. The separating member 425 is assembled in the short-circuit unit 423. The separating member 425 is made of a thermosetting resin having an insulating characteristic. As shown in FIG. 26A, the separating member 425 has a circular ring tabular support plate 451, and sixteen separating protrusions 452 serving as separating projections formed on the support plate 451. FIGS. 26A and 26B show the first short-circuit piece 141 and the second short-circuit piece 241 one by one.

The support plate 451 has a size corresponding to the first coupling portion 144 and the second coupling portion 244. The outer diameter of the support plate 451 is slightly smaller than the outer diameter of the first coupling portion 144. The inner diameter of the support plate 451 is slightly larger than the inner diameter of the first coupling portion 144. The thickness of the support plate 451 is slightly larger than the thickness of the first coupling portion 144.

As shown in FIGS. 26A and 26B, each of the separating protrusions 452 is positioned on the contact surface 451a of the support plate 451. The separating protrusion 452 extends along the first coupling portion 144 and the second coupling portion 244 from an inner peripheral edge of the contact surface 451a to an outer peripheral edge. The separating protrusions 452 are arranged so as to be spaced at a uniform angular interval in the circumferential direction. The width of each of the separating protrusions 452 is equal to or slightly smaller than the gap between the adjacent first coupling portion 144 and second coupling portion 244.

Figure 26C:
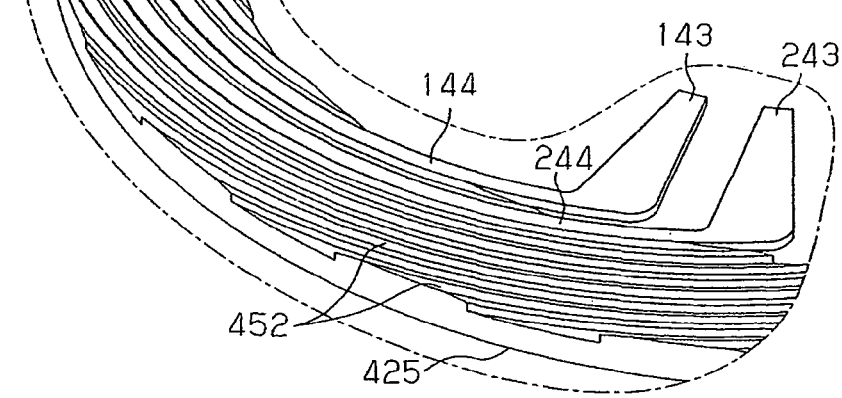
FIG. 26C is a cross-sectional view of the separating member in FIG. 26A, that is a cross-sectional view taken along line 26C-26C in FIG. 26A.

As shown in FIG. 26C, each of the separating protrusions 452 has a rectangular cross section. Both of corner portions in a distal end of each of the separating protrusions 452 are chamfered. A protruding amount of each of the separating protrusions 452 is slightly larger than the thickness of the first coupling portion 144.

As shown in FIGS. 23A and 23B, the separating protrusion 452 is arranged in an opposite side to the segment 422 with respect to the short-circuit unit 423. The separating protrusion 452 gets into the portion between the adjacent first coupling portion 144 and second coupling portion 244. The separating protrusion 452 prevents the first coupling portion 144 and the second coupling portion 244 from being short-circuited with each other. The contact surface 451a is brought into contact with the corresponding first coupling portion 144 or second coupling portion 244.

As shown in FIG. 23A, the segment 422, the short-circuit unit 423 and the separating member 425 are embedded in the holding portion 424. As viewed in the axial direction, the ring plate 51 of the holding portion 424 is flush with an outer end surface in a radial direction of the base portion 432b.

Figure 27:
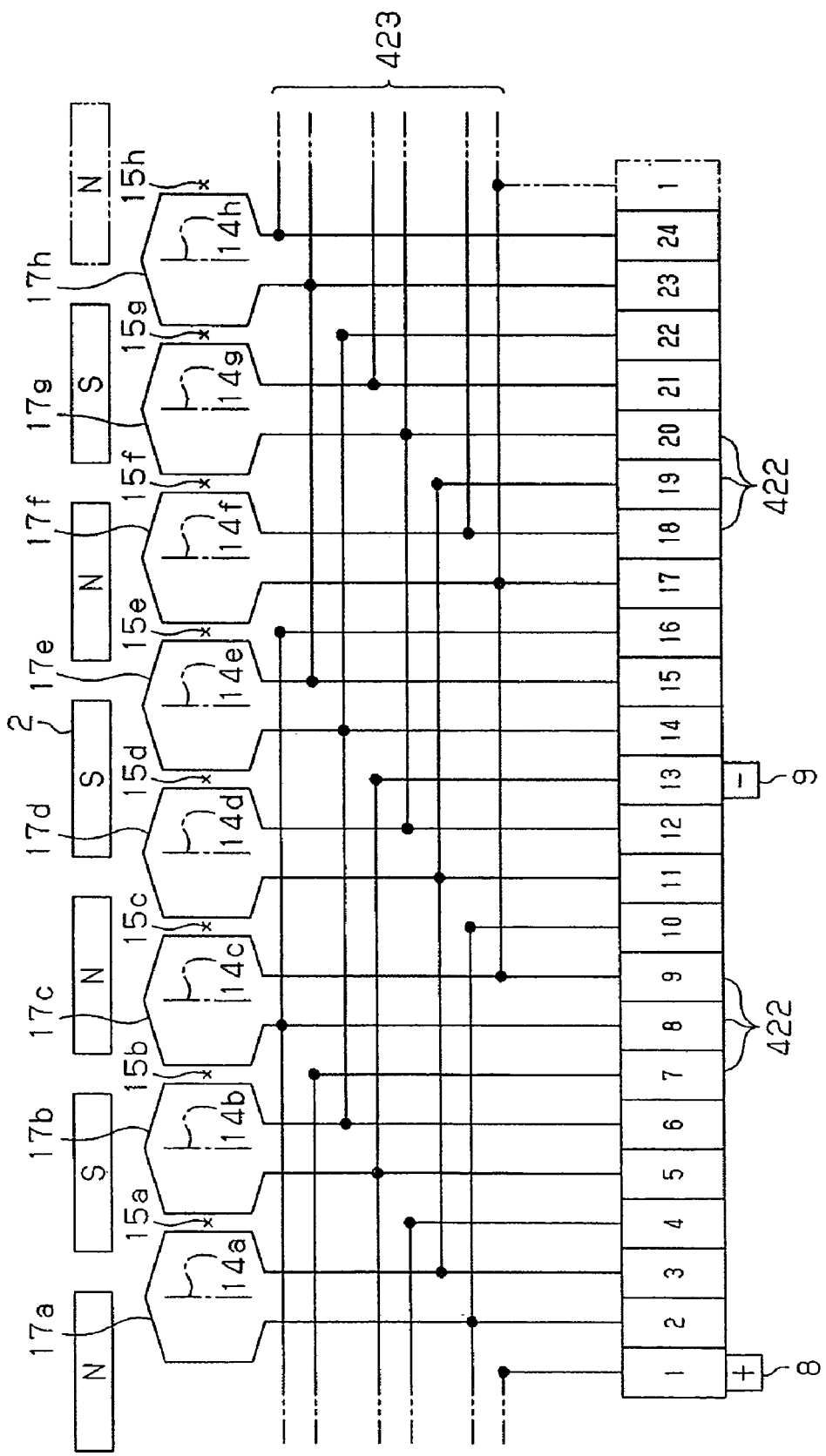
FIG. 27 is a wiring diagram of the direct-current motor in FIG. 21.

In the short-circuit unit 423 shown in FIG. 27, the number of the wiring is reduced in comparison with the short-circuit unit 423 shown in FIG. 6. Referring to FIGS. 25A and 25B, the first outer short-circuit end 142 is arranged in one of a pair of segments 422 which are adjacent to each other in the circumferential direction, and the second outer short-circuit end 242 is arranged in the other.

As shown in FIGS. 25 to 29, the fourth embodiment can short-circuit twenty-four segments 422 by the reduced number of, or sixteen short-circuit pieces 141 and 241. For example, in the first to third embodiment, twenty-four short-circuit pieces 41 are required.

In other words, in the case of setting the number of magnetic poles of the magnet 2 to P, the number of the segments 422 to (P/2)·n, and the number of the segments 422 to be set to the same electric potential to (P/2), the number of the short-circuit pieces can be reduced to ((P/2)−1)·n. In this case, the number (P/2) of the segments 422 is a multiple of the number (P/2) of the segments 422 to be set to the same electric potential.

Specifically, in the case shown in FIGS. 25 to 29, the number of magnetic poles N equals to 6, the number (P/2)·n of the segments 422 equals to 24, and the number (P/2) of the segments 422 to be set to the same electric potential equals to 3. In other words, a relation P=6 and n=8 is established. Accordingly, a total number of the short-circuit pieces 141 and 241 is set to ((P/2)−1)·n=16. Since the relation ((P/2)−1)·n=(P/2)·n−n is established, the total number of the short-circuit pieces 141 and 241 can be reduced at n, that is, eight in comparison with the number of the segments 422.

Sixteen short-circuit pieces 141 and 241 are connected to two segments 422 among twenty-four segments 422, are connected to the next two segments 422 while skipping over one-segment 422 in the circumferential direction, and are connected to the next two segments while skipping over one segment 422, and these operations are repeated periodically.

The conducting wire 19 of each of the coils 17a to 17h is welded to the segment 422 from the outer side in the radial direction in a state of being arranged in the connection groove 36a of the corresponding segment 422.

Next, a description will be given of a manufacturing method of the commutator 421.

Figure 28:
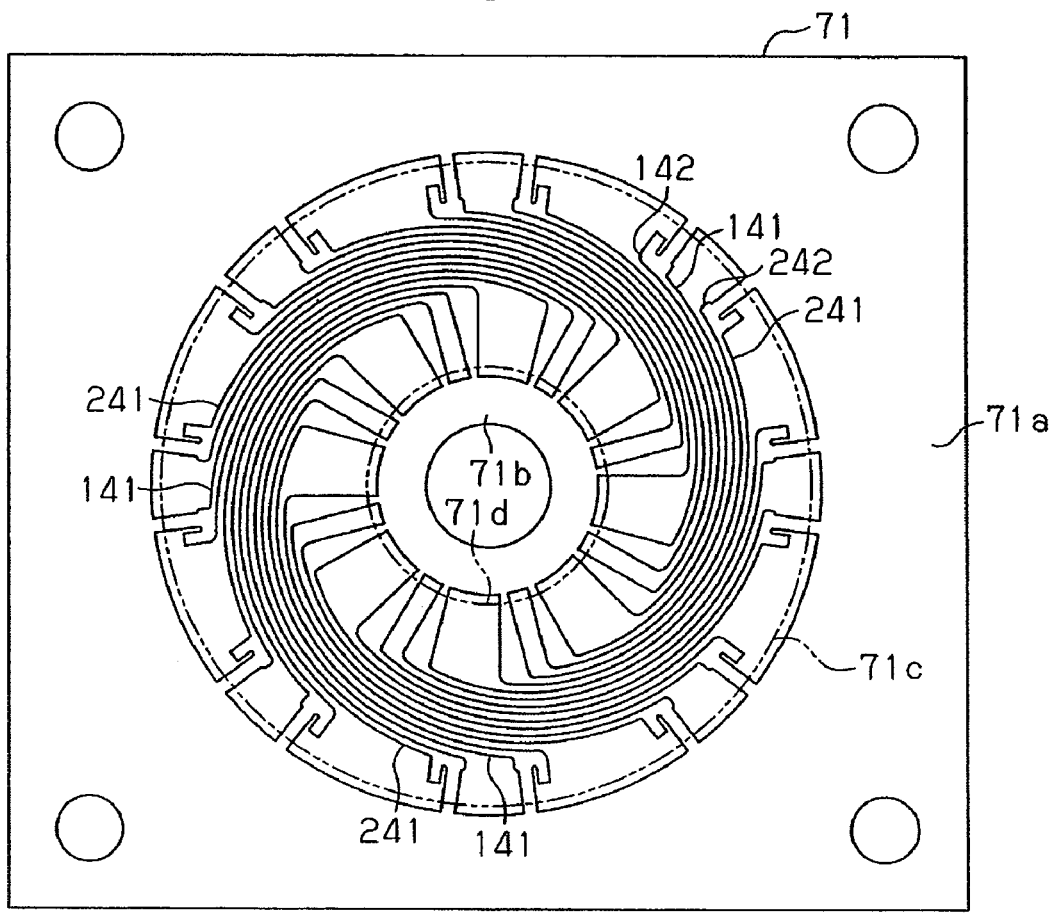
FIG. 28 is a plan view of a copper plate including the short-circuit unit shown in FIG. 25A.

As shown in FIG. 28, eight first short-circuit pieces 141 and eight second short-circuit pieces 241 are formed by press working a conductive plate member 71 such as a copper plate. At a time of finishing the press work, the plate member 71 has an outer coupling ring 71a and an inner coupling ring 71b. The outer coupling ring 71a couples the first outer short-circuit end 142 to the second outer short-circuit end 242. The inner coupling ring 71b couples the first inner short-circuit end 143 to the second inner short-circuit end 243.

FIG. 28 shows an outer cut circle 71c by a two-dot chain line, and an inner cut circle 71d by a two-dot chain line. The first short-circuit piece 141 and the second short-circuit piece 241 are disconnected from the outer coupling ring 71a along the outer cut circle 71c, and are disconnected from the inner coupling ring 71b along the inner cut circle 71d.

Figure 29:
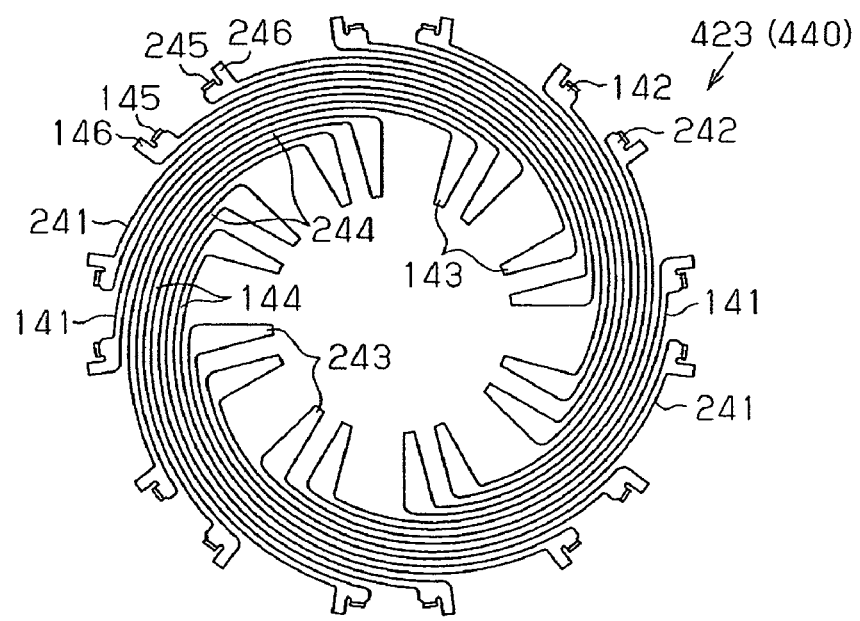
FIG. 29 is a plan view of a short-circuit group punched from the copper plate in FIG. 28.

As shown in FIG. 29, the first connection piece 145 and the second connection piece 245 are bent and formed. Accordingly, the short-circuit unit 423 constituted by one short-circuit group 440 is finished.

Figure 30:
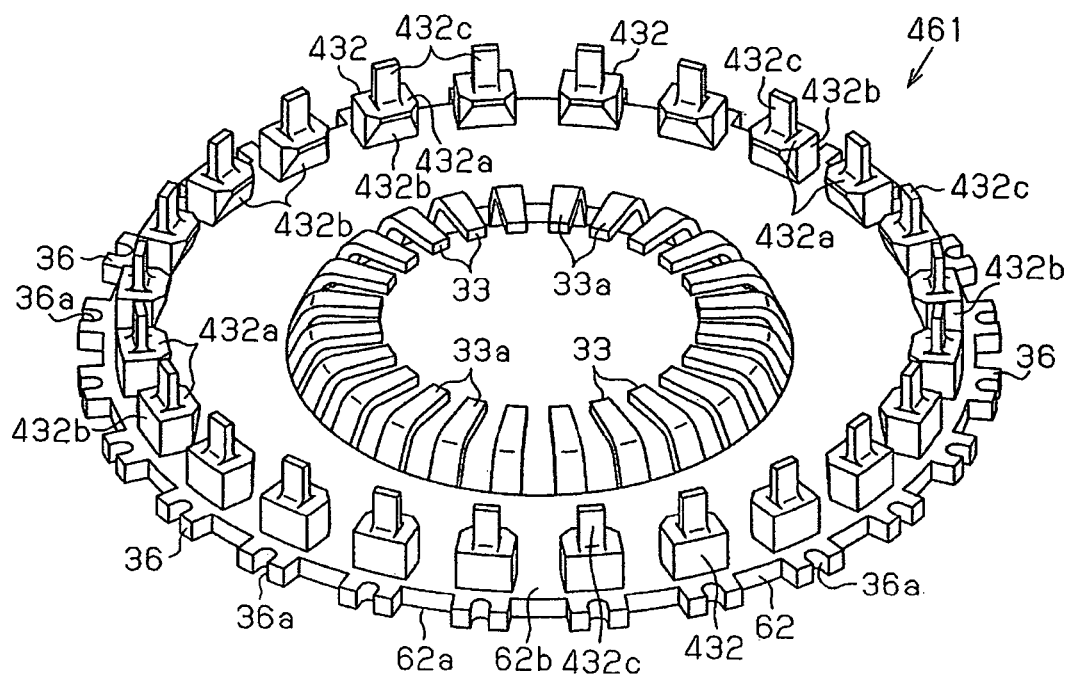
FIG. 30 is a perspective view of a mother member including a plurality of segments in FIG. 25B.

FIG. 30 shows mother members 461 of a plurality of segments 422. The mother member 461 has a circular ring tabular mother main body 62 having a flat surface 62a.

As shown in FIG. 31, the short-circuit unit 423 is arranged in the mother member 461.

The first connection piece 145 and the second connection piece 245 are respectively welded to the corresponding connection projections 432c by TIG welding. The first inner short-circuit end 143 and the second inner short-circuit end 243 are also respectively welded to the corresponding inner connection portions 33 in accordance with the TIG welding. As a result, the short-circuit unit 423 is connected to the mother member 461.

Figure 32:
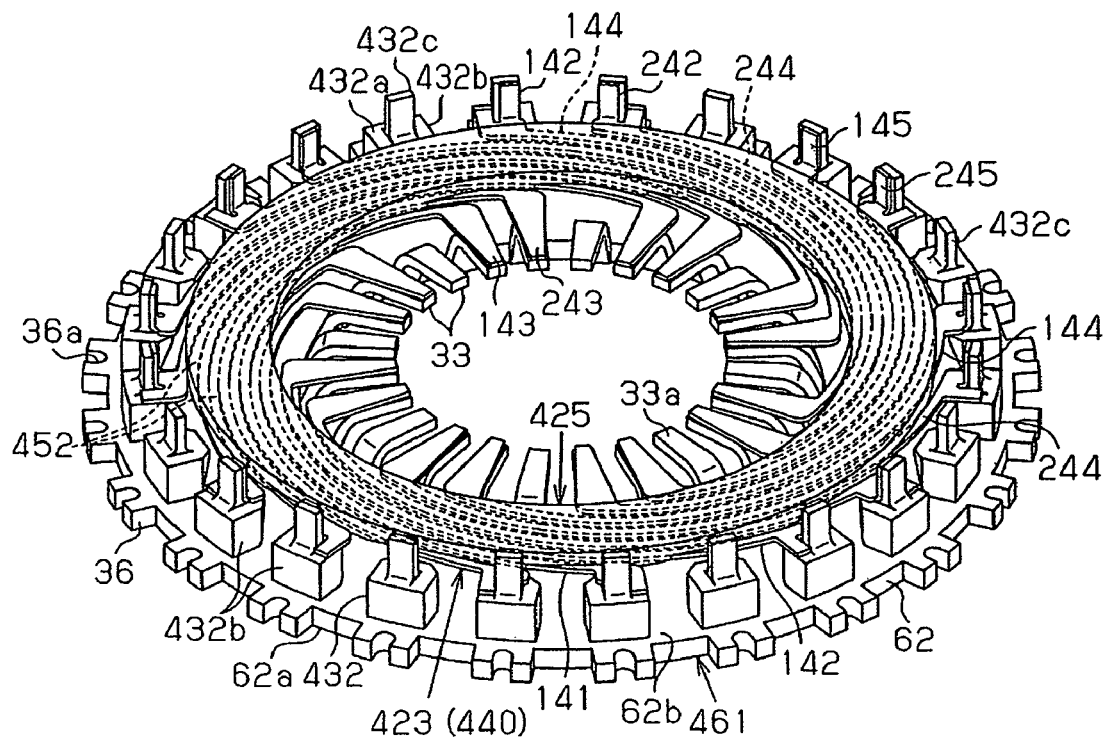
FIG. 32 is a perspective view of the short-circuit unit and the mother member in FIG. 31 mounting the separating member in FIG. 26A so as to be inverted up and down.

As shown in FIG. 32, the separating member 425 is arranged in the short-circuit unit 423. Sixteen separating protrusions 452 are arranged between the first coupling portion 144 and the second coupling portion 244. The support plate 451 is parallel to the flat surface 62a of the mother member 461.

Figure 33:
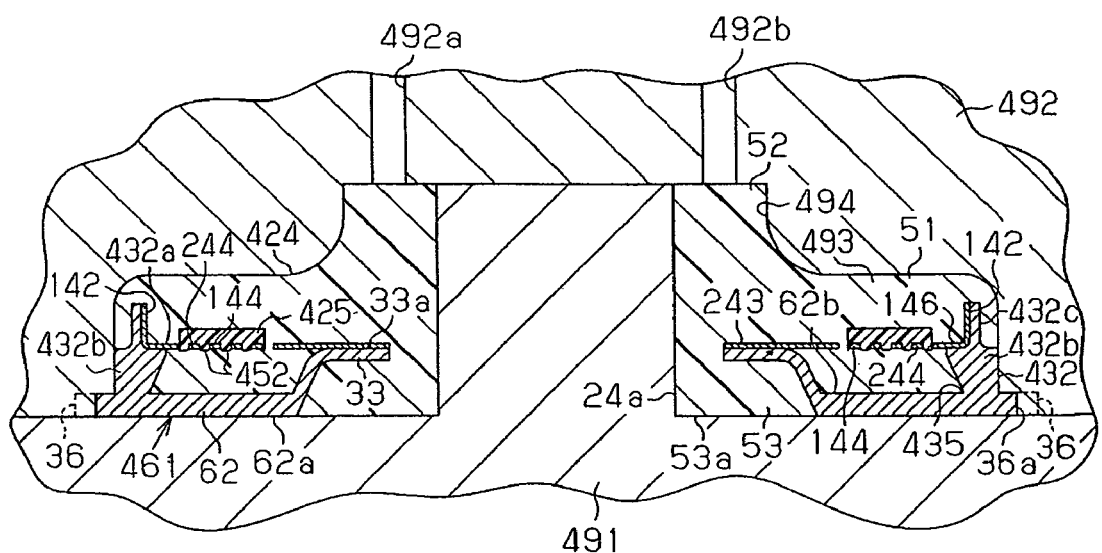
FIG. 33 is a cross-sectional view of a state in which the separating member, the short-circuit unit and the mother member in FIG. 32 are embedded in a resin within a forming die.

As shown in FIG. 33, a lower die 491 and an upper die 492 of the forming die define a cavity 494 for forming the holding portion 424. The mother member 461 and the short-circuit unit 423 are arranged in the cavity 494. The upper die 492 has inlet ports 492a and 492b communicating with the cavity 494. The cavity 494 is filled with a molten insulative resin 493 through the inlet ports 492a and 492b. The inlet ports 492a and 492b extend in the thickness direction of the mother member 461 arranged in the cavity 494, that is, the axial direction of the short-circuit unit 423, and communicate with the cavity 494. In FIG. 33, the inlet ports 492a and 492b communicate with the cavity 494 from the above. In other words, the short-circuit unit 423 is positioned between the mother member arranged in the cavity 494, and the inlet ports 492a and 492b. Accordingly, if the insulative resin 493 in the molten state fills the cavity 494, the insulative resin 493 presses the short-circuit unit 423 toward the mother member 461. Further, the insulative resin 493 presses the separating member 425 toward the short-circuit unit 423.

The molten insulative resin 493 fills between the first coupling portion 144 and the mother main body 62, and between the second coupling portion 244 and the mother main body 62. The separating protrusion 452 is arranged between the first coupling portion 144 and the second coupling portion 244. Accordingly, it is possible to prevent the pressure of the insulative resin 493 in the molten state from deforming the first coupling portion 144 and the second coupling portion 244. In other words, it is possible to prevent the first coupling portion 144 from being short-circuited with the second coupling portion 244.

The insulative resin 493 covers the connection portion between the first and second outer short-circuit ends 142 and 242, and the outer connection portion 432. In the same manner, the insulative resin 493 covers the connection portion between the first and second inner short-circuit ends, and the inner connection portion 33.

Figure 34:
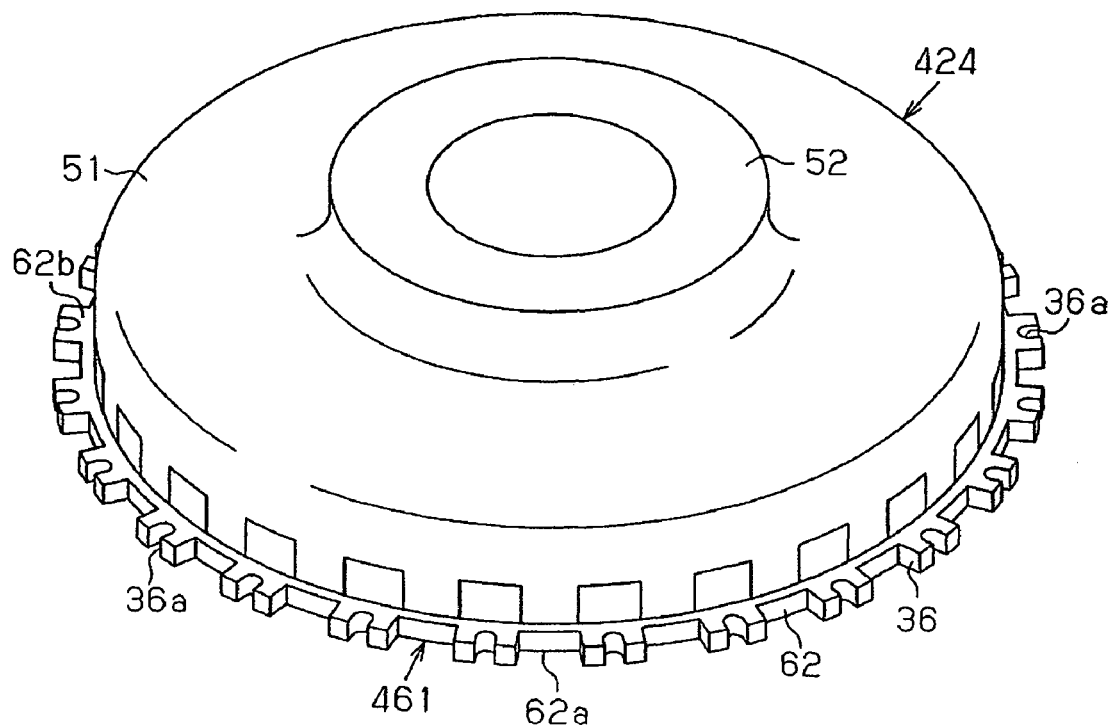
FIG. 34 is a perspective view of a holding portion removed of the forming die in FIG. 33.
Figure 35:
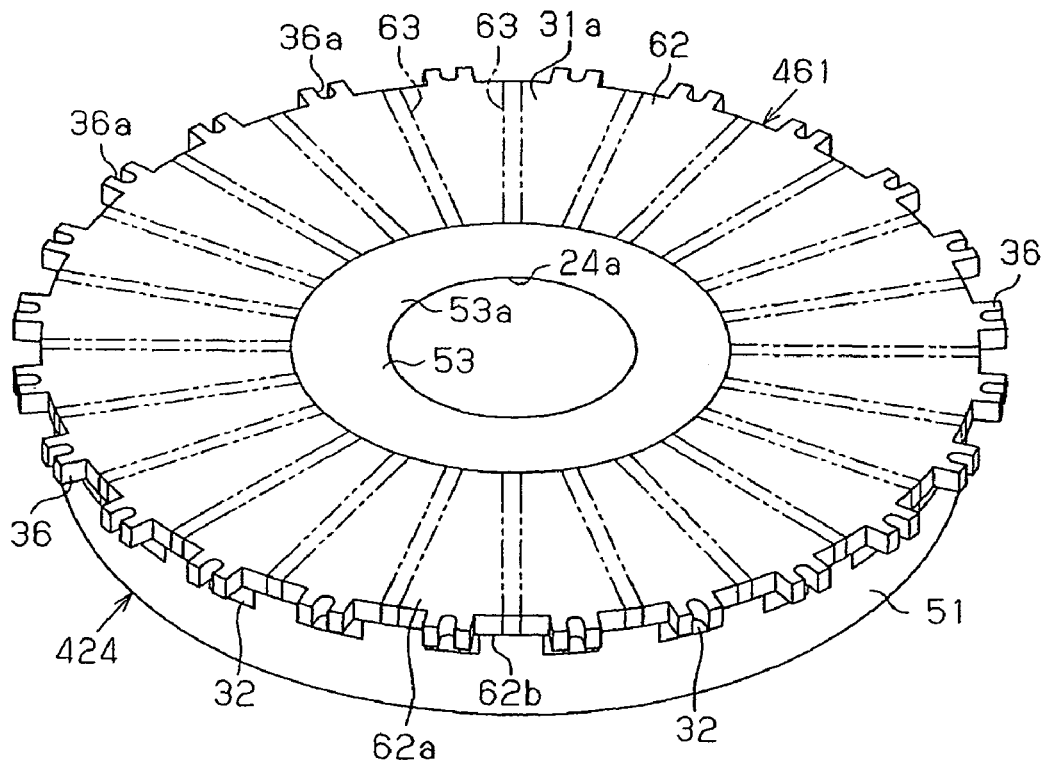
FIG. 35 is a perspective view showing a cut position of the mother member by inverting the holding portion in FIG. 34 up and down.

As shown in FIG. 34, when the insulative resin 493 is hardened by being cooled, the holding portion 424 is finished. The holding portion 424 is removed from the lower die 491 and the upper die 492.

Next, the mother member 461 in the state of being held by the holding portion 424 is cut, and twenty-four segments 422 are formed. The commutator 421 is finished.

The fourth embodiment has the following advantages.

(41) The insulative separating protrusion 452 is arranged between the first coupling portion 144 and the second coupling portion 244 which are adjacent in the circumferential direction. Accordingly, even if a molding pressure of the holding portion 424 is applied to the adjacent first coupling portion 144 and second coupling portion 244, it is possible to prevent the first coupling portion 144 and the second coupling portion 244 from being short-circuited with each other. In other words, it is possible to secure the insulation between the first coupling portion 144 and the second coupling portion 244.

(42) The separating protrusion 452 extends along the first coupling portion 144 and the second coupling portion 244. Accordingly, it is easy to secure the insulation between the first coupling portion 144 and the second coupling portion 244 which are adjacent to each other in the circumferential direction.

(43) Both corner portions of the distal end of each of the separating protrusions 452 are chamfered. In other words, each of the separating protrusions 452 is narrowed toward the distal end. Accordingly, it is easy to insert the separating protrusion 452 to the portion between the first coupling portion 144 and the second coupling portion 244.

(44) The separating member 425 includes the circular ring tabular support plate 451, and the separating protrusion 452 integrally provided in the contact surface 451a of the support plate 451. Accordingly, it is possible to easily arrange the separating protrusion 452 between the first coupling portion 144 and the second coupling portion 244 by arranging the support plate 451 in the short-circuit unit 423. Therefore, it is easy to manufacture the commutator 421.

(46) The insulative resin 493 in the molten state filling the cavity 494 pressure contacts the short-circuit unit 423 with the segment 422. As a result, it is possible to more securely connect the short-circuit unit 423 to the segment 422.

(47) The formation by the lower die 491 and the upper die 492 is executed after the first connection piece 145 and the second connection piece 245 are welded to the connection projection 432c. Accordingly, it is possible to prevent the short-circuit unit 423 from being displaced from the mother member 461 at a time of forming.

(48) In a state of setting the number of magnetic poles of the magnet 2 to P, the number of the segments 422 to (P/2)·n, and the number of the segments 422 to be set to the same electric potential to (P/2), the number of the short-circuit pieces 141 and 241 is set to ((P/2)−1)·n=(P/2)·n−n. Accordingly, it is possible to set the total number of the short-circuit pieces 141 and 241 smaller than the number of the segments 422.

Each of the embodiments mentioned above may be modified as follows.

Figure 36:
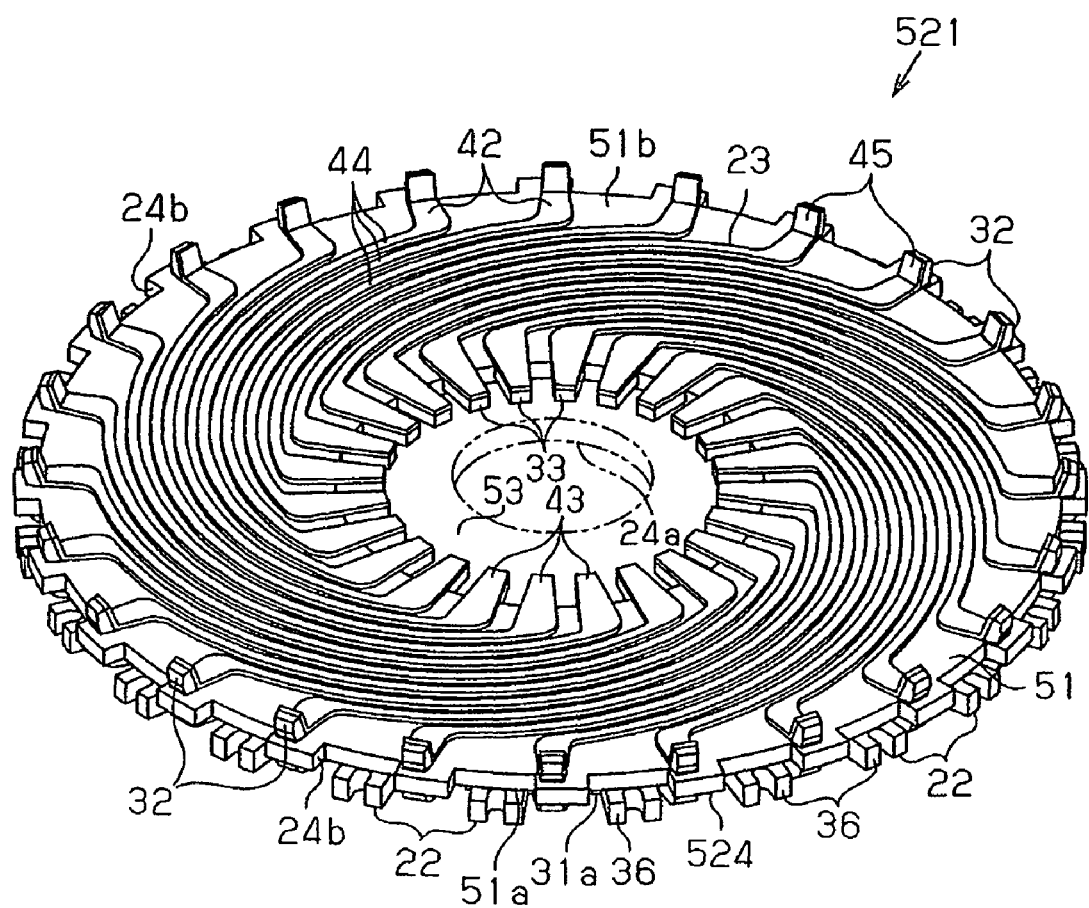
FIG. 36 is a perspective view showing a commutator in accordance with another embodiment of the present invention.
Figure 37:
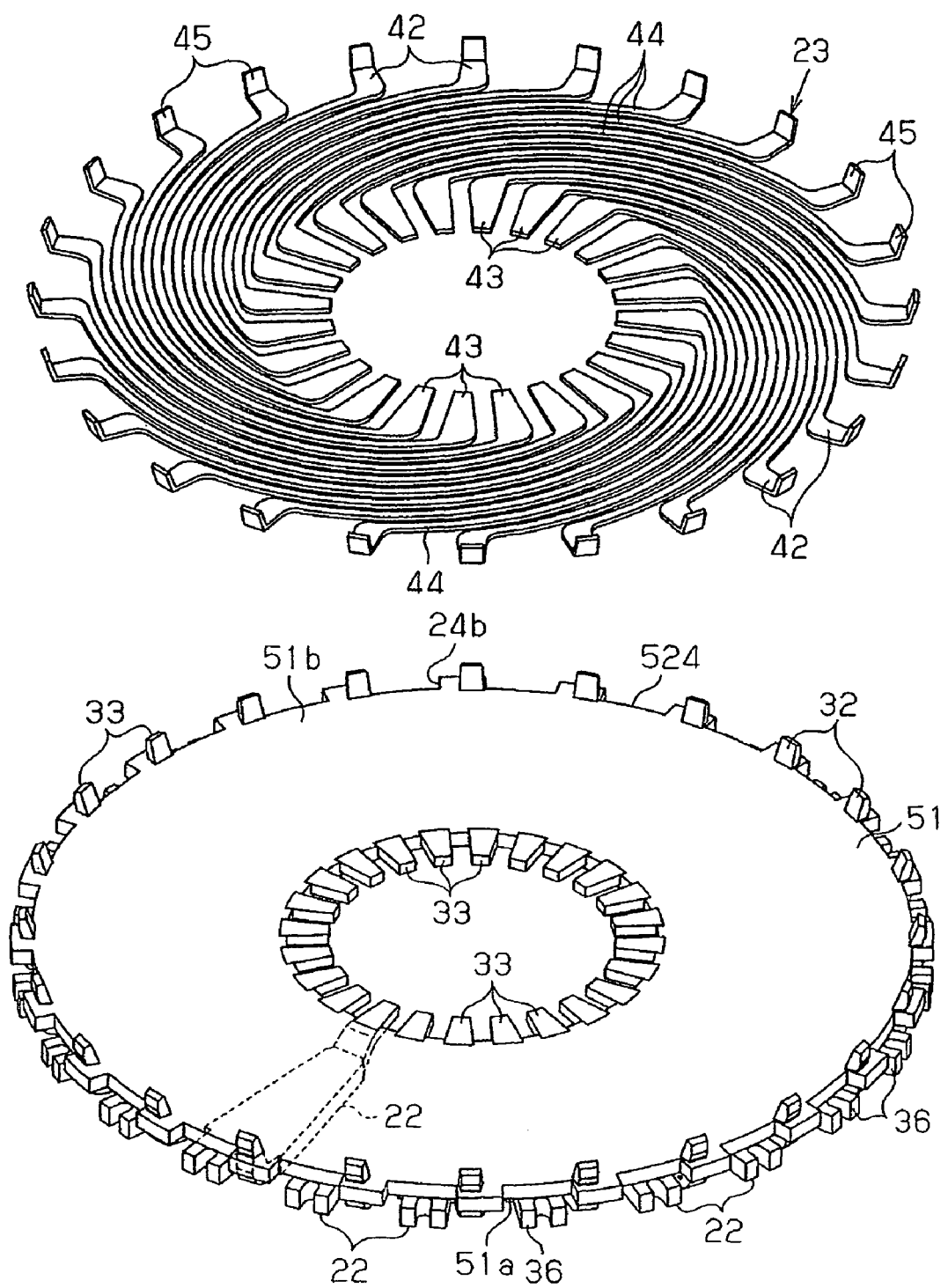
FIG. 37 is an exploded perspective view of the commutator in FIG. 36.

As shown in FIGS. 36 and 37, a holding portion 524 of a commutator 521 is integrally formed only with the segment 22. The holding portion 524 is not integrally formed with the short-circuit unit 23. In other words, the holding portion 524 is not limited to be integrally formed with both of the segment 22 and the short-circuit unit 23, but may be integrally formed with at least one of the segment 22 and the short-circuit unit 23. In FIG. 36, the short-circuit unit 23 is only welded to the segment 22.

As shown in FIG. 36, the disc-shaped holding portion 524 has a contact surface 51b in an opposite side to an end surface 51a. The contact surface 51b is parallel to the slidable contact surface 31a. The short-circuit unit 23 is arranged on the contact surface 51b. The holding portion 524 holds the segment 22 by embedding a part of the segment 22, particularly the proximal end of the outer connection portion 32. The outer connection portion 32 protrudes from the contact surface 51b. An outer circumferential surface of the holding portion 524 has a plurality of the guide grooves 24b.

The holding portion 524 shown in FIG. 37 is manufactured by the forming die such as the lower die 491 and the upper die 492 shown in FIG. 33, in such a manner as to be integrally formed with a plurality of segments 22. In a state in which the short-circuit unit 23 is arranged in the contact surface 51b, the short-circuit unit 23 is parallel to the slidable contact surface 31a. The connection piece 45 of the short-circuit unit 23 is brought into contact with the outer connection portion 32 of the segment 22. The inner short-circuit end 43 is brought into contact with the inner connection portion 33. The connection piece 45 is welded to the outer connection portion 32. The inner short-circuit end 43 is welded to the inner connection portion 33. The support portion 53 is formed in the center of the holding portion 524. The fitting hole 24a passes through the support portion 53.

In this case, in a state in which the holding portion 524 defines the positional relation between a plurality of segments 22, the short-circuit unit 23 is arranged on the segments 22. Accordingly, it is easy to arrange and weld the short-circuit unit 23 to a plurality of segments 22.

Figure 38:
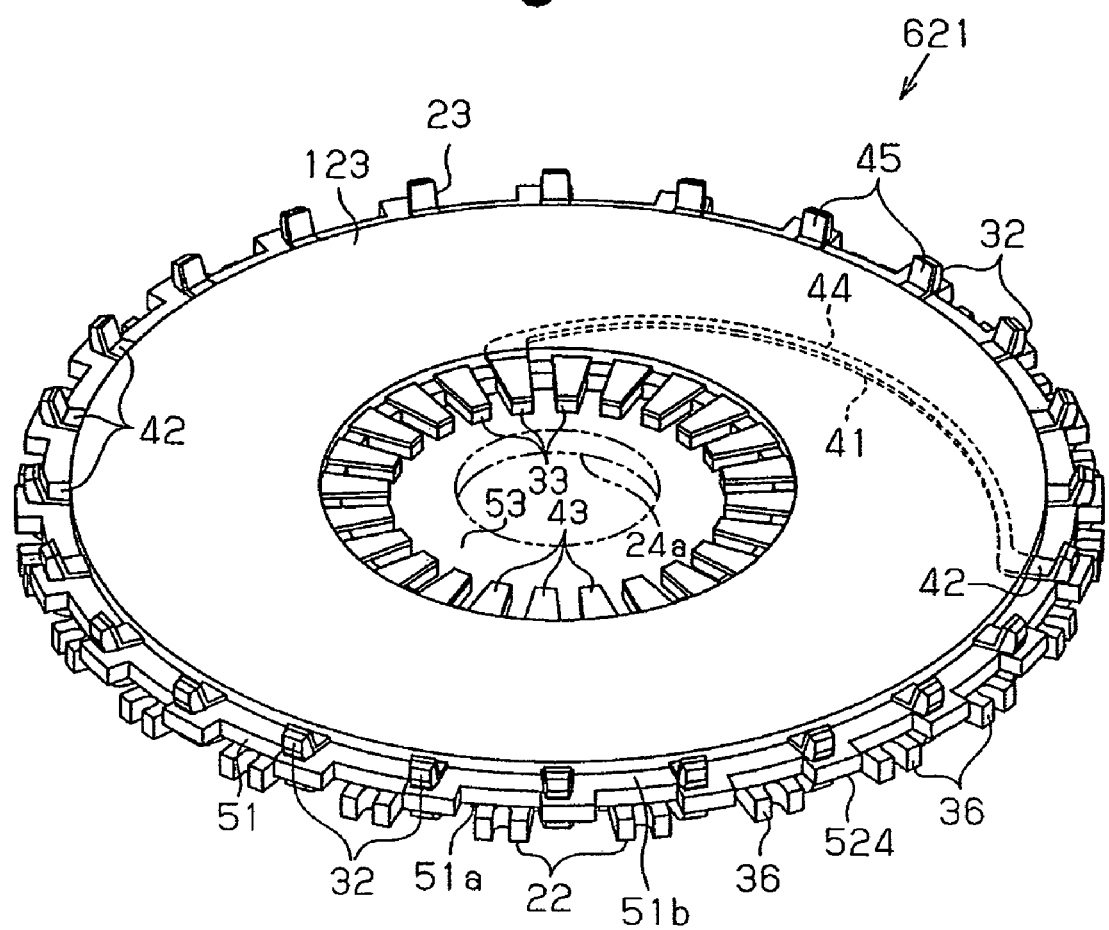
FIG. 38 is a perspective view of a commutator in accordance with further the other embodiment.
Figure 39:
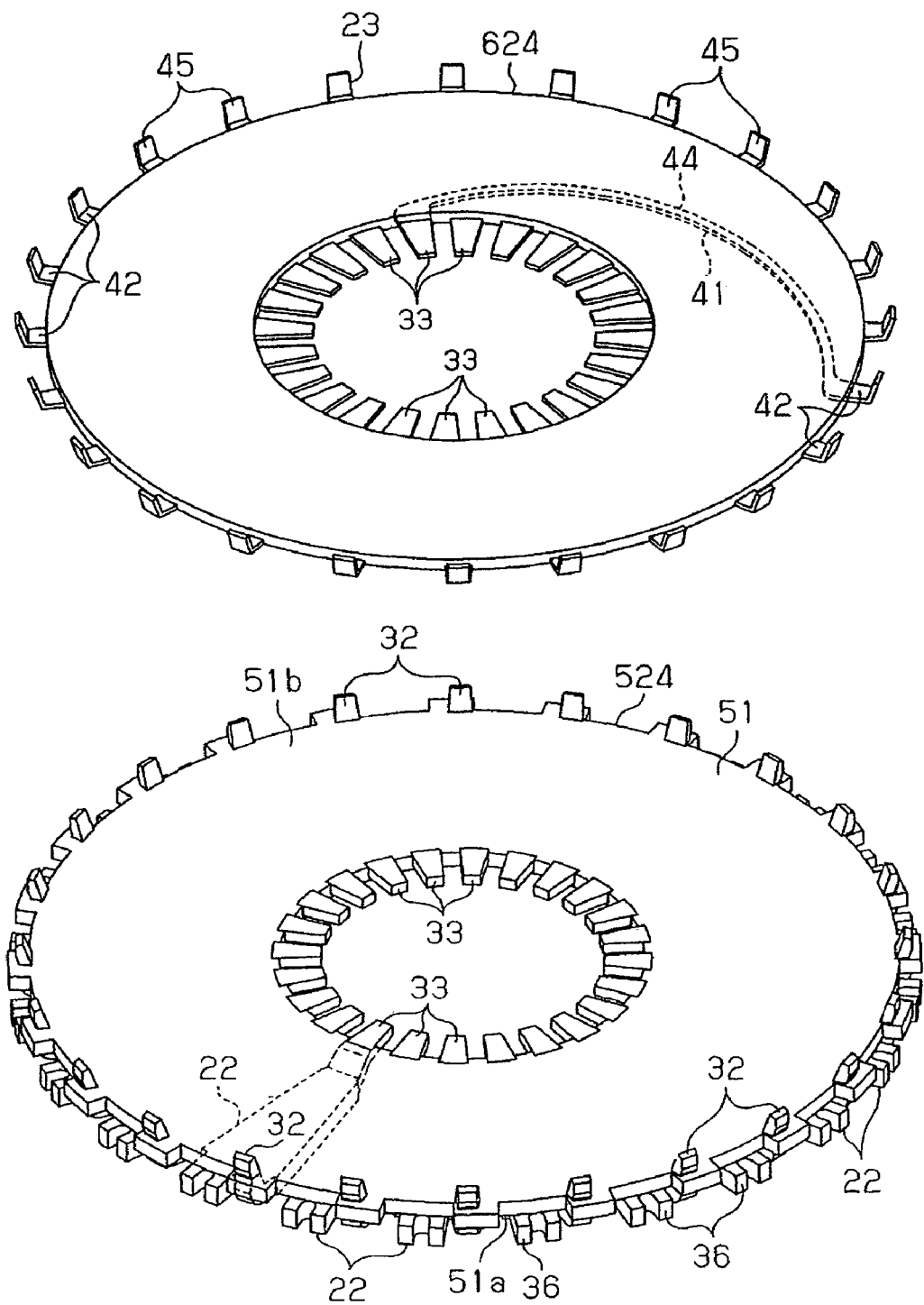
FIG. 39 is an exploded perspective view of the commutator in FIG. 38.

As shown in FIGS. 38 and 39, a second holding portion 624 is integrally formed with the short-circuit unit 23. A disc-shaped second holding portion 624 is assembled in the holding portion 524 in FIG. 37, whereby a commutator 621 is formed. In other words, a holding portion of the commutator 621 is divided into a holding portion 524 serving as a first holding portion holding a plurality of segments 22, and a second holding portion 624 holding the short-circuit unit 23. The second holding portion 624 is arranged on the contact surface 51b of the holding portion 524. The second holding portion 624 holds the short-circuit unit 23 by embedding at least a part of the short-circuit unit 23, that is, a plurality of coupling portions 44.

The outer diameter of the second holding portion 624 is slightly smaller than the outer diameter of the holding portion 524. The thickness of the second holding portion 624 is larger than the thickness of the short-circuit unit 23, and smaller than the thickness of the holding portion 524.

The connection piece 45 of the short-circuit unit 23 is welded to the outer connection portion 32 of the segment 22. The inner short-circuit end 43 is welded to the inner connection portion 33.

The insulative resin material of the holding portion 524 can be set in such a manner as to have a different nature from the insulative resin material of the second holding portion 624. For example, the insulative resin of the holding portion 524 is set to a higher hardness in comparison with the second holding portion 624, in such a manner as to hold the segment 22 with which the anode brush 8 and the cathode brush 9 are brought into slidable contact. The insulative resin of the second holding portion 624 is set to a lower hardness than the holding portion 524 because it is sufficient that it holds the thinner short-circuit unit 23 than the segment 22.

The insulative resin of the holding portion 524 may employ the same kind as the insulative resin of the second holding portion 624.

The second holding portion 624 is manufactured by the forming die such as the lower die 491 and the upper die 492 in FIG. 33, in such a manner as to be integrally formed with the short-circuit unit 23. The second holding portion 624 is arranged on the contact surface 51b of the holding portion 524, whereby the short-circuit unit 23 is arranged on the segments 22. The connection piece 45 of the short-circuit unit 23 is welded to the outer connection portion 32 of the segment 22. The inner short-circuit end 43 is welded to the inner connection portion 33.

In this case, the short-circuit unit 23 held by the second holding portion 624 is arranged on the segments 22 held by the holding portion 524. Accordingly, it is easy to arrange the short-circuit unit 23 in the segment 22.

Figure 40:
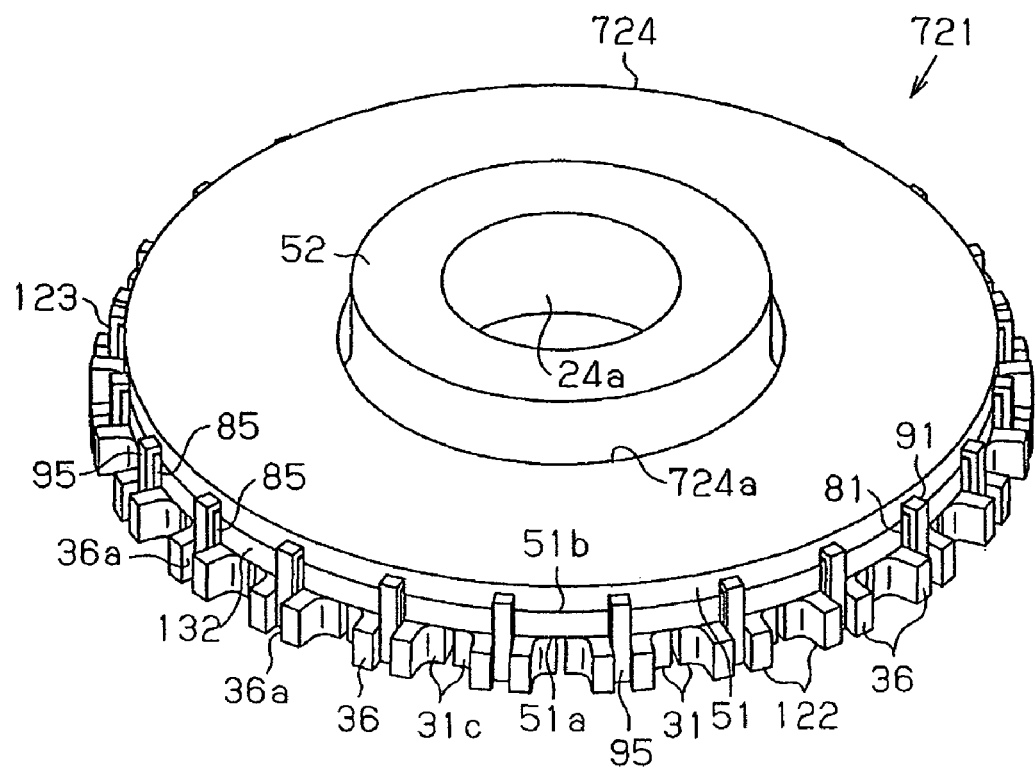
FIG. 40 is a perspective view of a commutator in accordance with another embodiment.
Figure 41:
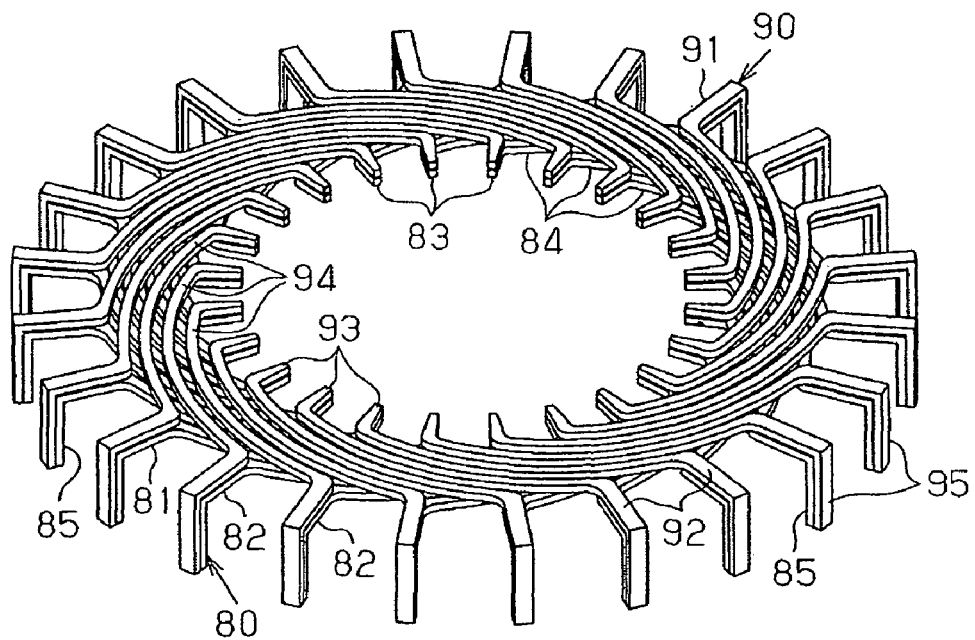
FIG. 41 is a perspective view of a short-circuit unit included in the commutator in FIG. 40.
Figure 42:
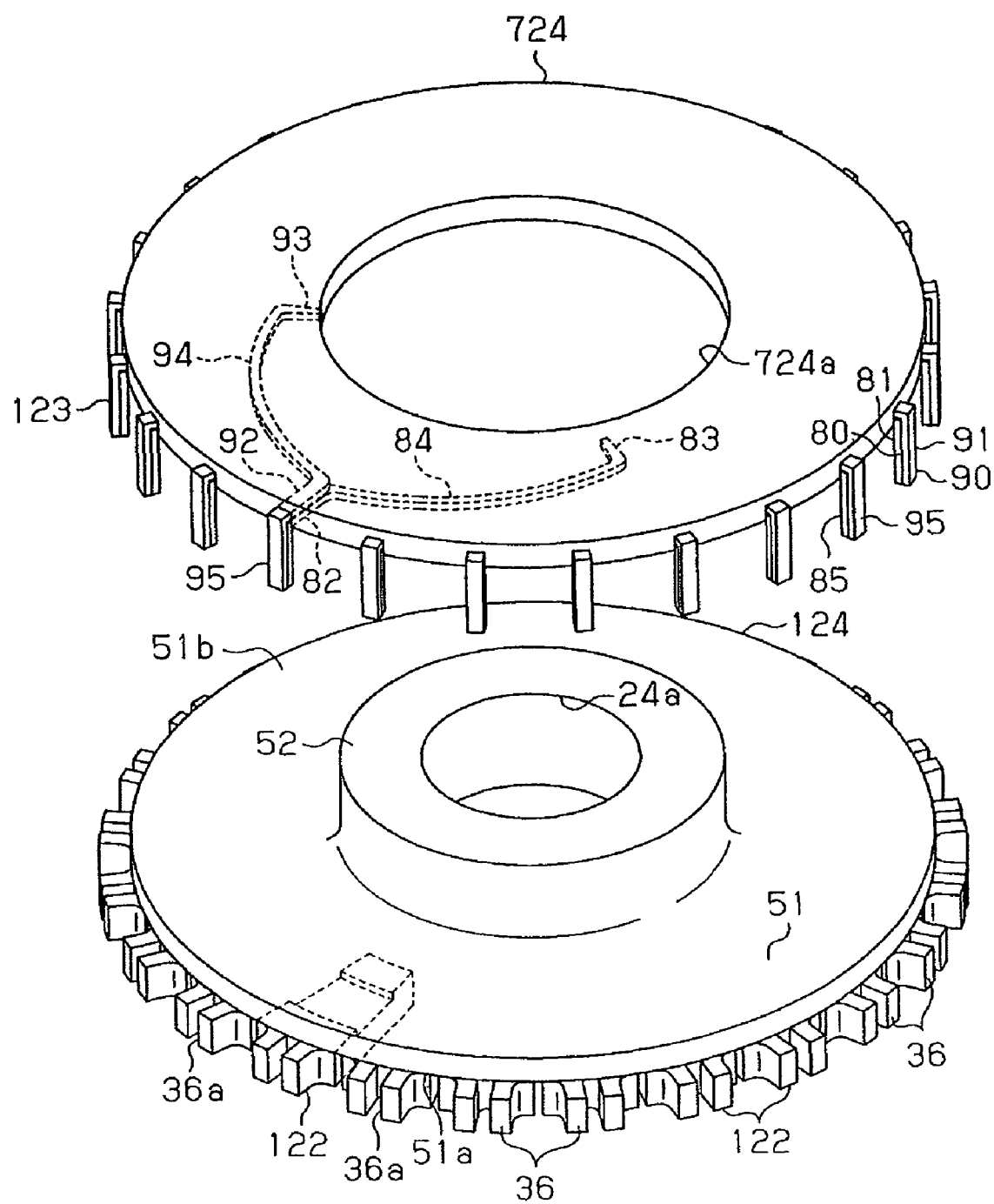
FIG. 42 is an exploded perspective view of the commutator in FIG. 40.

As shown in FIGS. 40 to 42, a second holding portion 724 is integrally formed with the short-circuit unit 123 in FIG. 13A. The disc-shaped second holding portion 724 is assembled in the holding portion 124 in FIG. 13B, whereby a commutator 721 is formed. In other words, the holding portion of the commutator 721 is divided into the holding portion 124 serving as the first holding portion holding a plurality of segments 22, and a second holding portion 724 holding the short-circuit unit 123. The second holding portion 724 is arranged on the contact surface 51b of the holding portion 124. The second holding portion 724 holds the short-circuit unit 23 by embedding the first short-circuit piece 81 and the second short-circuit piece 91. The first connection piece 85 and the second connection piece 95 protrude from an outer circumferential surface of the second holding portion 724.

As shown in FIG. 40, as viewed in the axial direction, the outer circumferential edge of the holding portion 124 exists at the same position as the outer end surface 31c in the radial direction of the segment main body 31. The outer diameter of the second holding portion 724 is equal to the outer diameter of the holding portion 124. The second holding portion 724 has an insertion hole 724a to which the boss portion 52 is inserted. The second holding portion 724 is arranged in the periphery of the boss portion 52 on the contact surface 51b. The first connection piece 85 and the second connection piece 95 are welded to the segment 122 in a state of being inserted to the connection groove 36a. The conducting wire 19 is welded to the segment 122, the first connection piece 85, and the second connection piece 95 in a state of being inserted to the connection groove 36a. FIG. 41 shows a view from which the insulating paper sheet 101 between the first coupling portion 84 and the second coupling portion 94 is omitted.

As shown in FIG. 42, the holding portion 124 and the second holding portion 724 are formed by the independent forming dies. Thereafter, the short-circuit unit 123 is arranged on the segments 122 by arranging the second holding portion 724 in the holding portion 124. The first connection piece 85 and the second connection piece 95 are inserted to the connection groove 36a. In this case, it is easy to arrange the short-circuit unit 123 in the segment 122.

The first coupling portion 84 and the second coupling portion 94 may be separated from each other by being curved slightly. For example, a recess may be formed in respective facing surfaces of the first coupling portion 84 and the second coupling portion 94.

As shown in FIG. 41, the first outer short-circuit end 82 may be welded to the second outer short-circuit end 92 before manufacturing the second holding portion 724.

A similar connection piece to the second connection piece 95 may be formed in the second inner short-circuit end 93. Further, a similar connection piece to the first connection piece 85 may be formed in the first inner short-circuit end 83.

Figure 43:
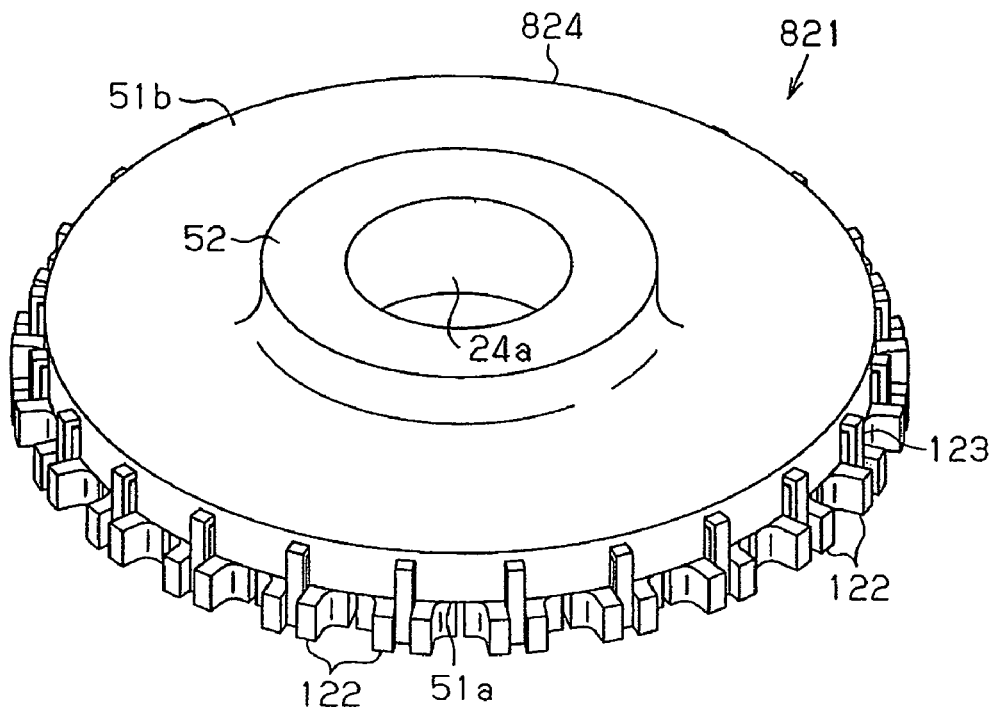
FIG. 43 is a perspective view of a commutator in accordance with another embodiment.

As shown in FIG. 43, a holding portion 824 of a commutator 821 is integrally formed in both of the segment 122 and the short-circuit unit 123. In other words, the holding portion 824 is thicker than the holding portion 124 in FIG. 13B in such a manner as to embed the short-circuit unit 123. The outer diameter of the holding portion 824 is equal to the outer diameter of the holding portion 124 in FIG. 13B.

Figure 44:
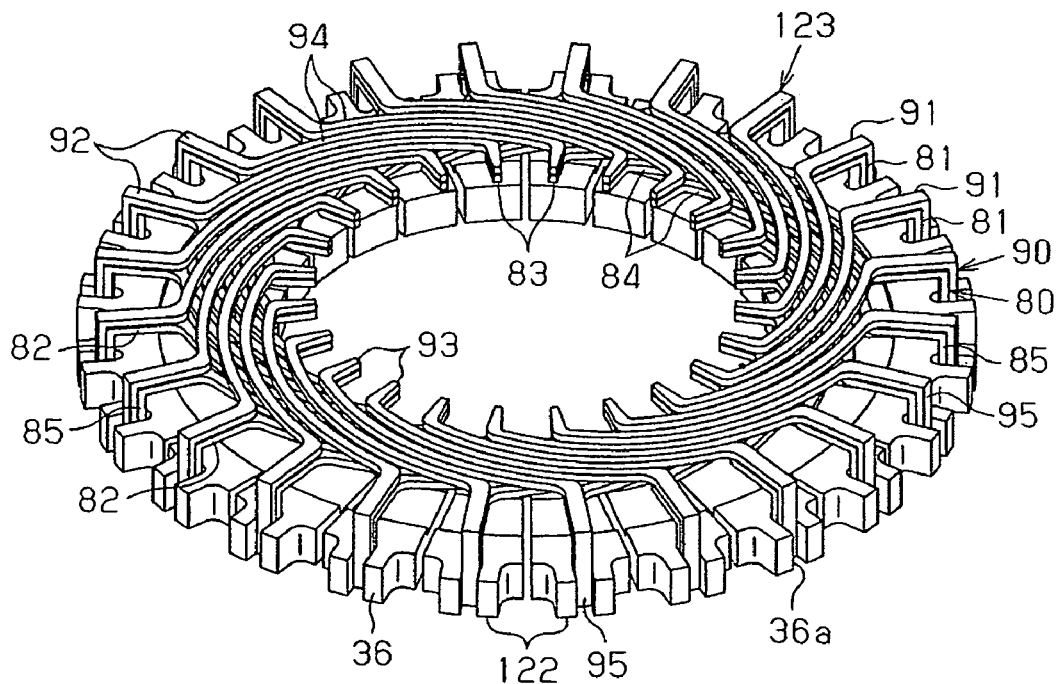
FIG. 44 is a perspective view of a short-circuit unit and a plurality of segments included in the commutator in FIG. 43.

As shown in FIG. 44, in a state in which the short-circuit unit 123 is arranged on the segments 122, the holding portion 824 is integrally formed by the forming die. The short-circuit unit 123 may be arranged on the segments 122 within the forming die.

In the first embodiment, the connection piece 45 is not limited to be welded to the outer connection portion 32 by the TIG welding, but may be welded by resistance welding or may be soldered. Further, the connection piece 45 may be swaged to the outer connection portion 32, or may be electrically connected by being simply brought into contact therewith.

In the same manner, the inner short-circuit end 43 may be electrically connected to the inner connection portion 33 by being soldered, swaged or brought into contact therewith. At the same time, the first outer short-circuit end 82 may be electrically connected to the second outer short-circuit end 92 by being soldered, swaged or brought into contact therewith. The first connection piece 85 may be electrically connected to the second connection piece 95 by being soldered, swaged or brought into contact therewith.

The first connection piece 85 extending in the axial direction as shown in FIG. 13A may be formed in each of the outer short-circuit end 42 and the inner short-circuit end 43 shown in FIG. 7A. The first connection piece 85 is connected to the outer end surface in the radial direction of the segment 22 or the inner end surface in the radial direction.

The segment 122 shown in FIG. 11A may be replaced by the segment 22 shown in FIG. 7A. In this case, the first outer short-circuit end 82 and the second outer short-circuit end 92 shown in FIG. 11A are replaced by the outer short-circuit end 42 shown in FIG. 7A.

The first inner short-circuit end 83 and the second inner short-circuit end 93 shown in FIG. 11A may be connected to the segment 122.

The short-circuit unit 23 shown in FIG. 7A and the segment 22 shown in FIG. 7B may be formed to be parallel to each other. The segment 22 may be first formed and the short-circuit unit 23 may be formed later.

The outer diameter D1 of the commutator 21 shown in FIG. 1 may be smaller than the inner diameter d1 of the virtual cylinder defined by a plurality of magnets 2 (D<d1). The closer to the outer diameter d0 of the core 13 the outer diameter D1 of the commutator 21 is, the closer to the coil connection portion 36 of the segment 22 the leading position of the conducting wire 19 of each of the coils 17a to 17h comes to. As shown in FIGS. 2B and 8, the conducting wire 19 of each of the coils 17a to 17h is led out in the axial direction from the outer circumferential surface of the core 13. Accordingly, it is possible to shorten the length of the conducting wire 19 necessary for connecting the coils 17a to 17h to the segment 22.

In the case that the outer diameter D1 of the commutator 21 is equal to the outer diameter d0 of the core 13, it is easiest to connect the conducting wire 19 of each of the coils 17a to 17h to the coil connection portion 36.

The outer diameter D1 of the commutator 21 may be smaller than the outer diameter d0 of the core 13.

In each of the embodiments mentioned above, the boss portion 52 may be deleted.

The short-circuit unit 23 in FIG. 7A is not limited to be structured by one short-circuit group 40, but may be structured by a plurality of short-circuit groups. For example, all the coupling portions 44 of a plurality of short-circuit groups may couple the outer short-circuit end 42 to the inner short-circuit end 43 which is displaced by 120° in the same direction.

The short-circuit unit 123 shown in FIG. 13A is not limited to be structured by the first short-circuit group 80 and the second short-circuit group 90, but may be structured by three or more short-circuit groups. For example, the outer short-circuit ends of three of more outer short-circuit groups are laminated. The inner short-circuit ends of the respective short-circuit groups are also laminated. At least a pair of short-circuit groups in three or more short-circuit groups is laminated in such a manner that the coupling portions are directed opposite to each other.

The feeding brushes (8, 9) are brought into slidable contact with the commutator 21 from the axial direction. Accordingly, as is different from the conventional commutator with which the feeding brush is brought into slidable contact from the radial direction, the thickness of the holding portions 24 and 124 in accordance with the present invention can be made smaller than the thickness of the feeding brushes (8, 9). Accordingly, even in the case that the short-circuit units 23 and 123 are structured by a plurality of short-circuit groups, it is possible to suppress the enlargement of the thickness of the commutator 21.

An angle θ corresponding to the interval between the segments 22 and 122 which the short-circuit units 23 and 123 mentioned above short-circuit is not limited to 120°.

The outer short-circuit end 42, the inner short-circuit end 43 and the coupling portion 44 of the short-circuit group 40 are not limited to be completely flat in all the positions. At least a part of the short-circuit group 40 may have an uneven shape or may be formed in a curved shape.

Figure 45:
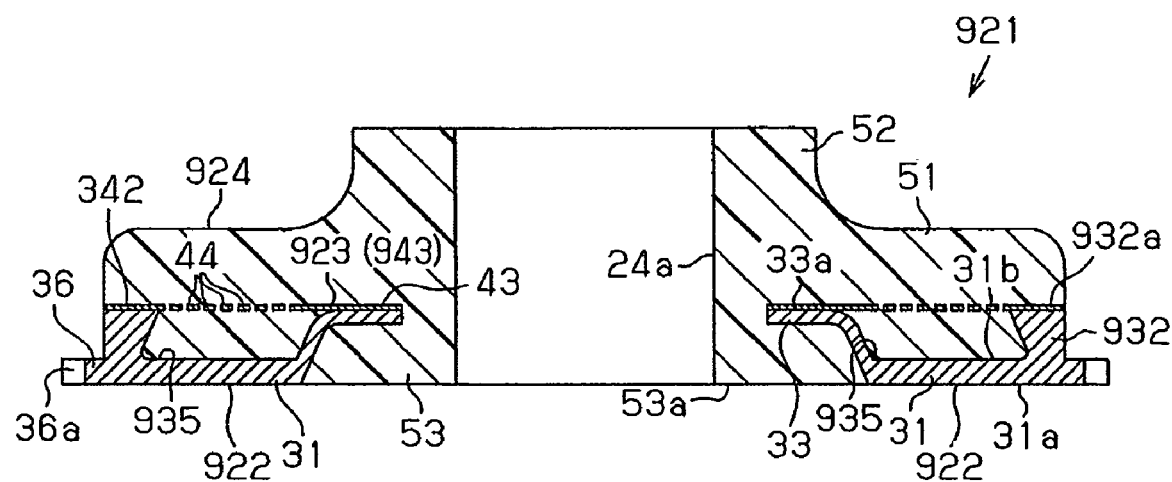
FIG. 45 is a cross-sectional view of a commutator in accordance with another embodiment.
Figure 46A:
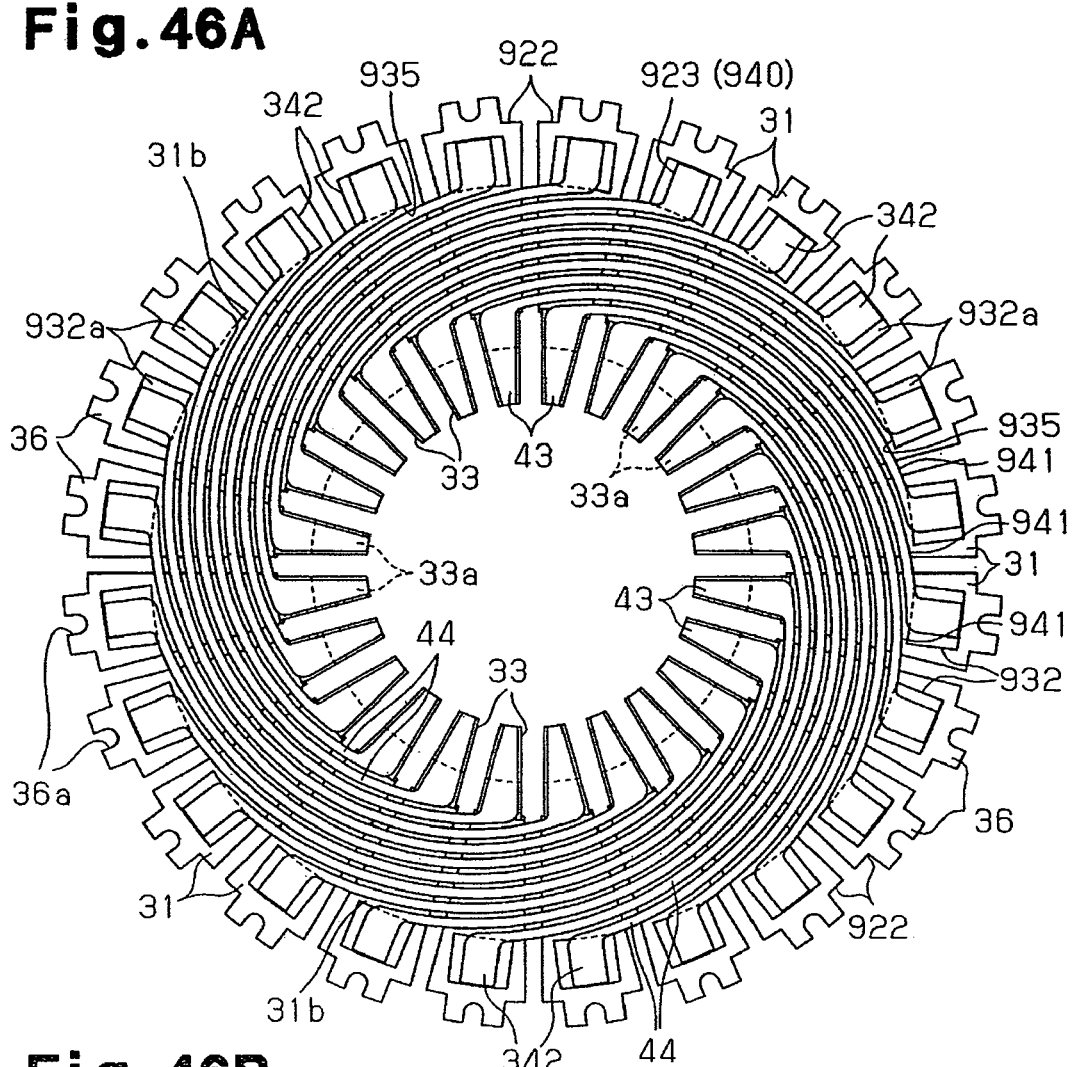
FIG. 46A is a plan view of a plurality of segments and a short-circuit unit included in the commutator in FIG. 45.

As shown in FIGS. 45 and 46A, a commutator 921 and a short-circuit unit 923 are constituted by one short-circuit group 940. The short-circuit group 940 has twenty-four short-circuit pieces 941. Each of the short-circuit pieces 941 includes the outer short-circuit end 342 in FIG. 17A, the inner short-circuit end 43 in FIG. 5, and the coupling portion 44 in FIG. 5. The short-circuit unit 923 is formed in a flat shape.

Figure 46B:
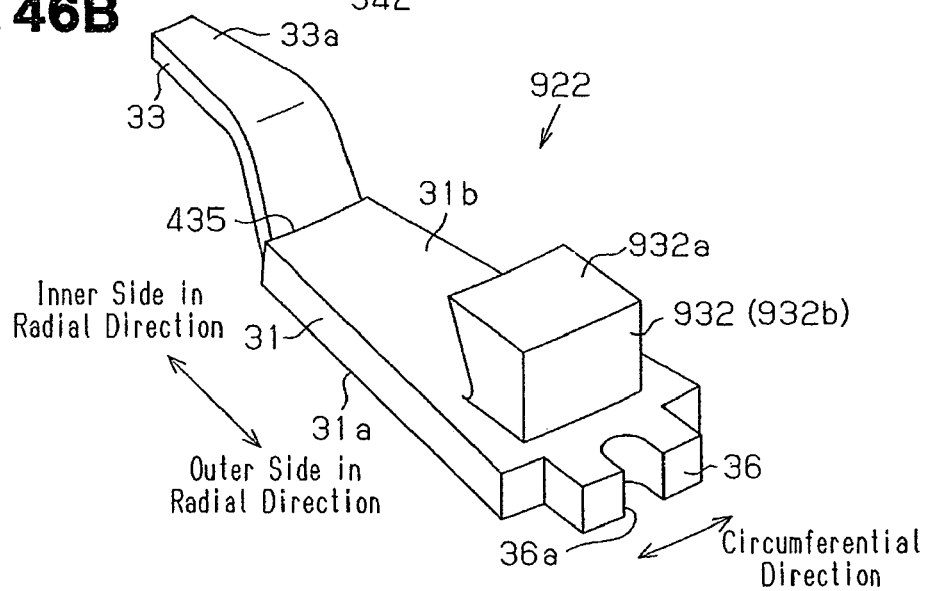
FIG. 46B is an enlarged perspective view of the segment shown in FIG. 46A.

As shown in FIG. 46B, the segment 922 has the segment main body 31 and the inner connection portion 33 shown in FIG. 7B. Further, the segment 922 has an outer connection portion 932. The outer connection portion 932 is formed in a block shape protruding to an opposite side to the slidable contact surface 31a. An opposite surface to the slidable contact surface 31a in the outer connection portion 932 serves as an outer connection surface 932a. The outer connection portion 932 and the inner connection portion 33 define a separating recess 935 therebetween. An inner surface in a radial direction of the outer connection portion 932 is sloped in such a manner that the holding portion 924 is well engaged with the outer connection portion 932.

As shown in FIG. 45, in a state in which the holding portion 924 holds the segment 922, an inner end in a radial direction of each of the segments 922 is brought into contact with the support portion 53.

Figure 47:
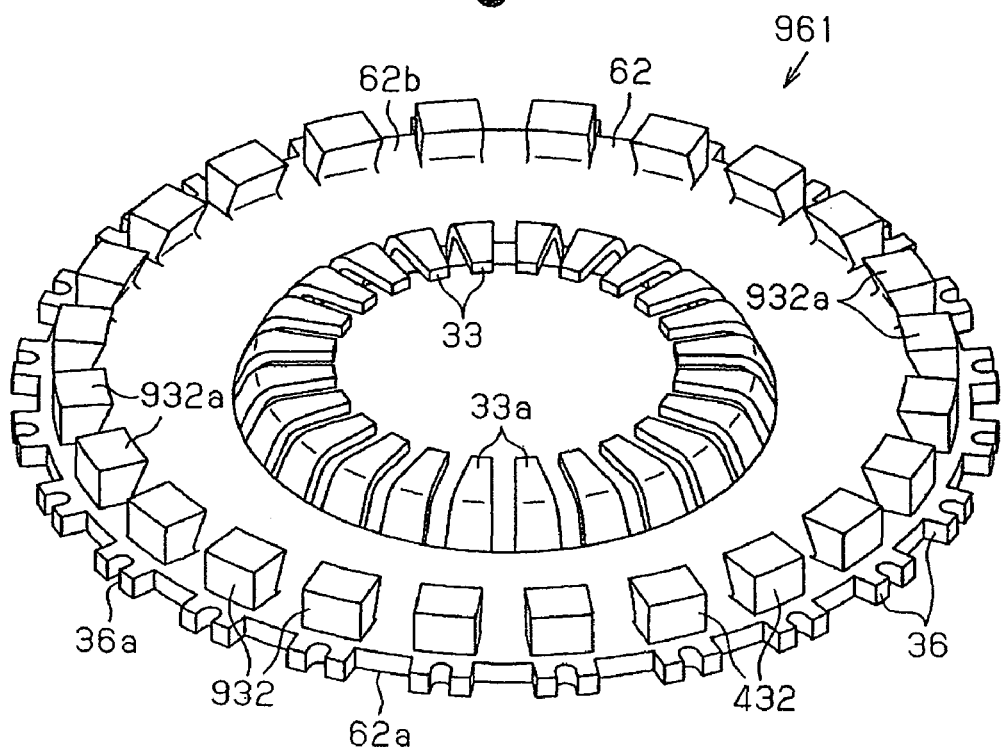
FIG. 47 is a perspective view of a mother member including a plurality of segments in FIG. 46A.

As shown in FIG. 47, a mother member 961 has the mother main body 62, and a plurality of inner connection portions 33 and a plurality of outer connection portions 432 protruding from the bonded surface 62b of the mother main body 62.

Figure 48:
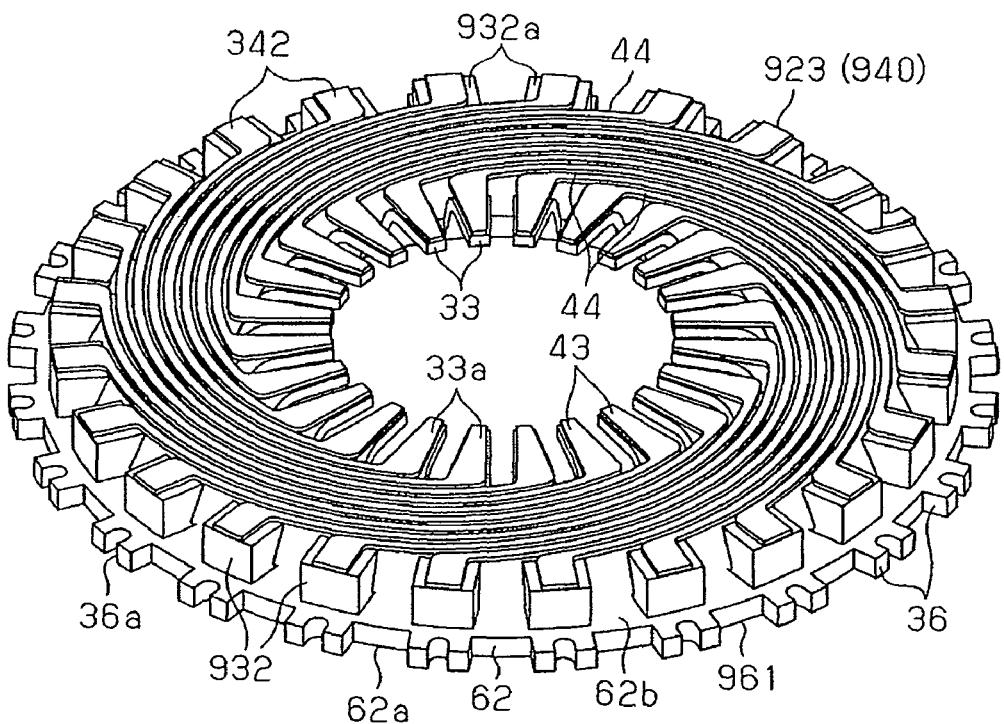
FIG. 48 is a perspective view of the mother member in FIG. 47 mounting the short-circuit unit in FIG. 46A.

FIG. 48 shows the short-circuit unit 923 arranged in the mother member 961. The holding portion 924 is formed in such a manner as to integrally hold the mother member 961 and the short-circuit unit 923. The mother member 961 is cut into the separated segments 922.

Figure 49:
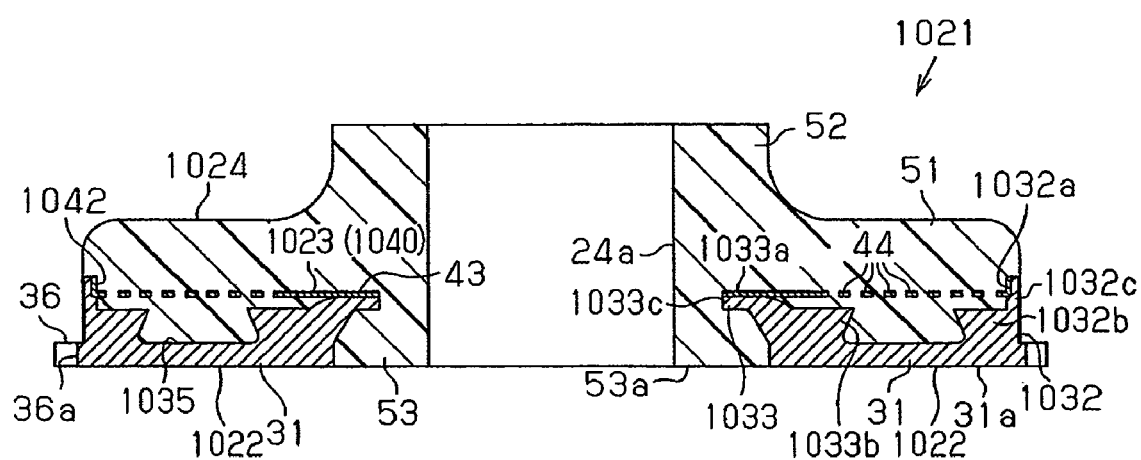
FIG. 49 is a cross-sectional view of a commutator in accordance with another embodiment.
Figure 50A:
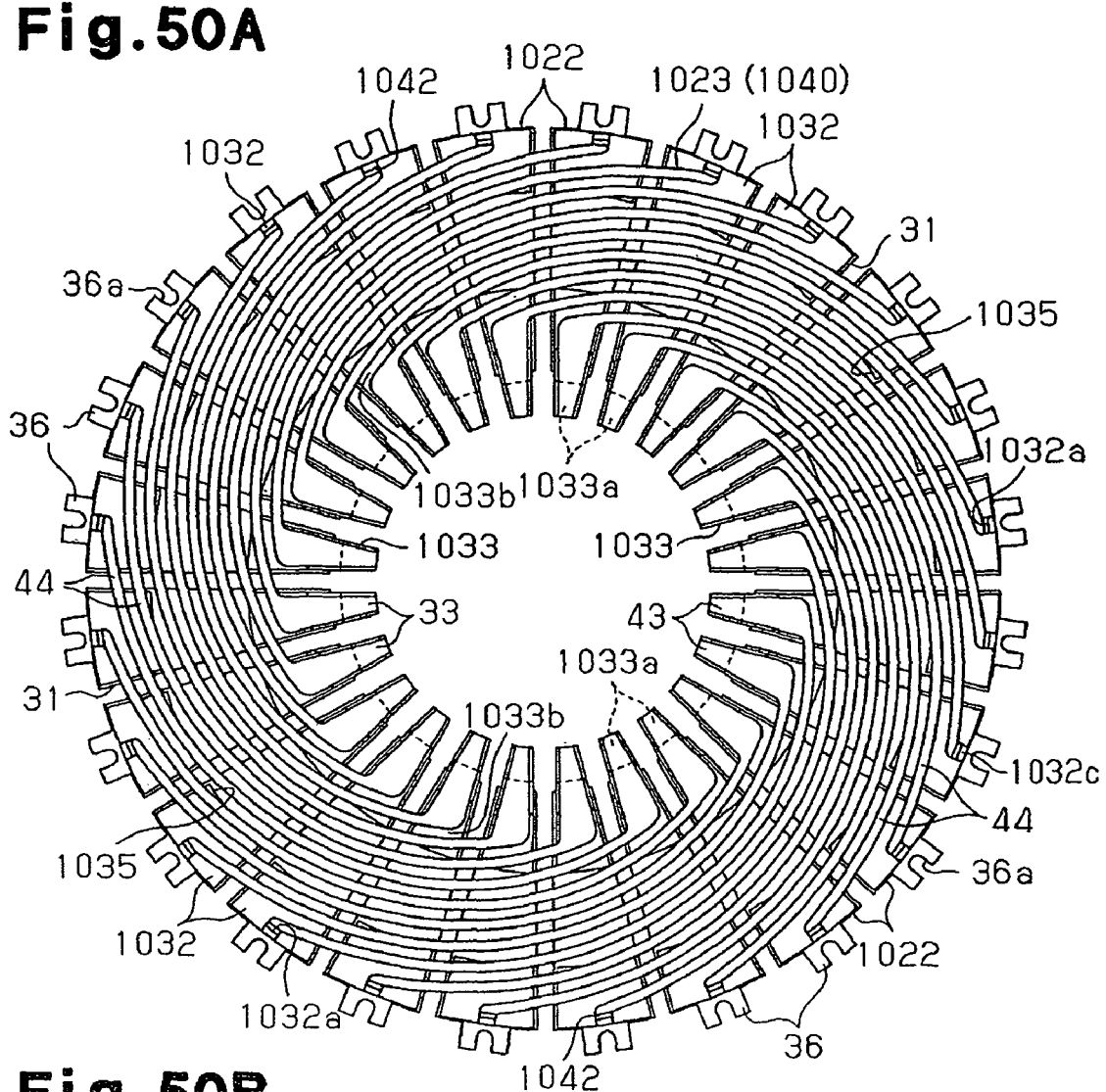
FIG. 50A is a plan view of a plurality of segments and a short-circuit unit included in the commutator in FIG. 49.

As shown in FIGS. 49 and 50A, a commutator 1021 has twenty-four segments 1022, a short-circuit unit 1023 and a holding portion 1024. The holding portion 1024 integrally holds the segments 1022 and the short-circuit unit 1023.

Figure 50B:
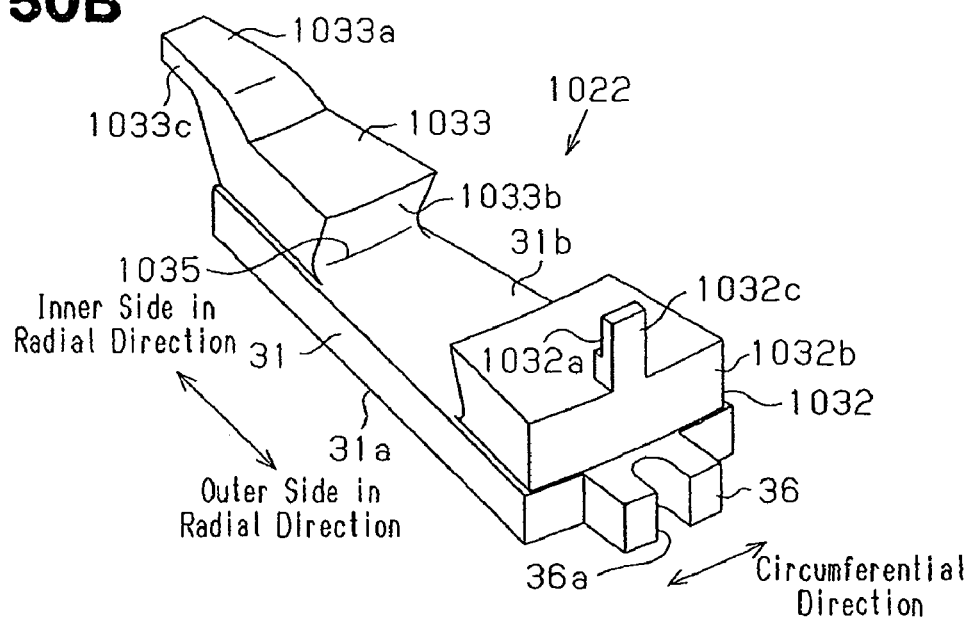
FIG. 50B is an enlarged perspective view of the segment shown in FIG. 50A.

As shown in FIG. 50B, each of the segments 922 has the segment main body 31, an outer connection portion 1032 and an inner connection portion 1033. The outer connection portion 1032 has a base portion 1032b and a connection projection 1032c. An outer connection surface 1032a formed in an L-shaped form as viewed from the circumferential direction is formed in the connection projection 1032c. In other words, the outer connection surface 1032a has a parallel surface and a vertical surface with respect to the slidable contact surface 31a.

The inner connection portion 1033 has a base portion 1033b and a connection projection 1033c extending diagonally upward toward an inner side in the radial direction from the base portion 1033b. An outer surface in the radial direction of the base portion 1033b is formed diagonal in such a manner that the holding portion 1024 is well engaged with the inner connection portion 1033. The connection projection 1033c has an inner connection surface 1033a which is parallel to the slidable contact surface 31a. The inner connection surface 1033a is formed in a trapezoidal shape in which the dimension in the circumferential direction becomes smaller toward the inner side in the radial direction, as viewed in the axial direction. The inner connection surface 1033a exists within the same plane as the parallel surface of the outer connection surface 1032a.

The outer connection portion 1032 and the inner connection portion 1033 define a separating recess 1035 between both the elements.

As shown in FIGS. 49 and 50A, the short-circuit unit 1023 is constituted by one short-circuit group 1040. The short-circuit group 1040 has twenty-four segments 1022. Each of the segments 1022 has an outer short-circuit end 1042, the inner short-circuit end 43 and the coupling portion 44.

Each of the outer short-circuit ends 1042 has an L-shaped form which is brought into contact with the parallel surface and the vertical surface of the outer connection surface 1032a. The dimension in the circumferential direction of each of the outer short-circuit ends 1042 is equal to the dimension in the circumferential direction of the outer connection surface 1032a, that is, the dimension in the circumferential direction of the connection projection 1033c.

The outer short-circuit end 1042 is welded to the outer connection portion 1032. The inner short-circuit end 43 is welded to the inner connection portion 1033.

Figure 51:
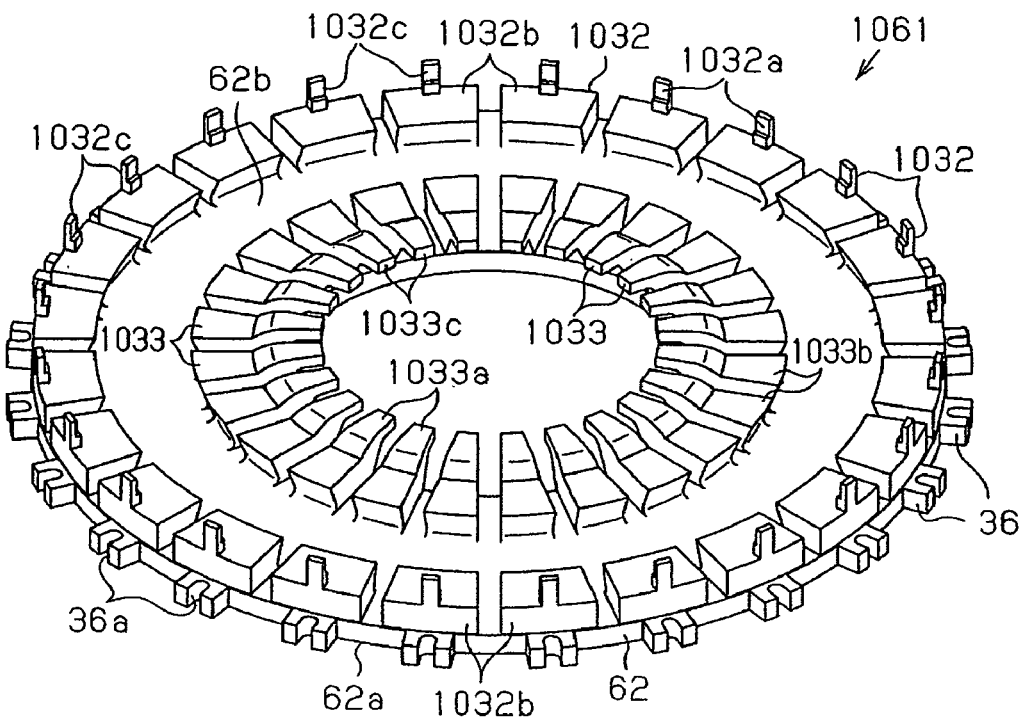
FIG. 51 is a perspective view of a mother member including a plurality of segments in FIG. 50A.

As shown in FIG. 51, the mother main body 62 of the mother member 1061 is provided with twenty-four outer connection portions 1032, and twenty-four inner connection portions 1033.

Figure 52:
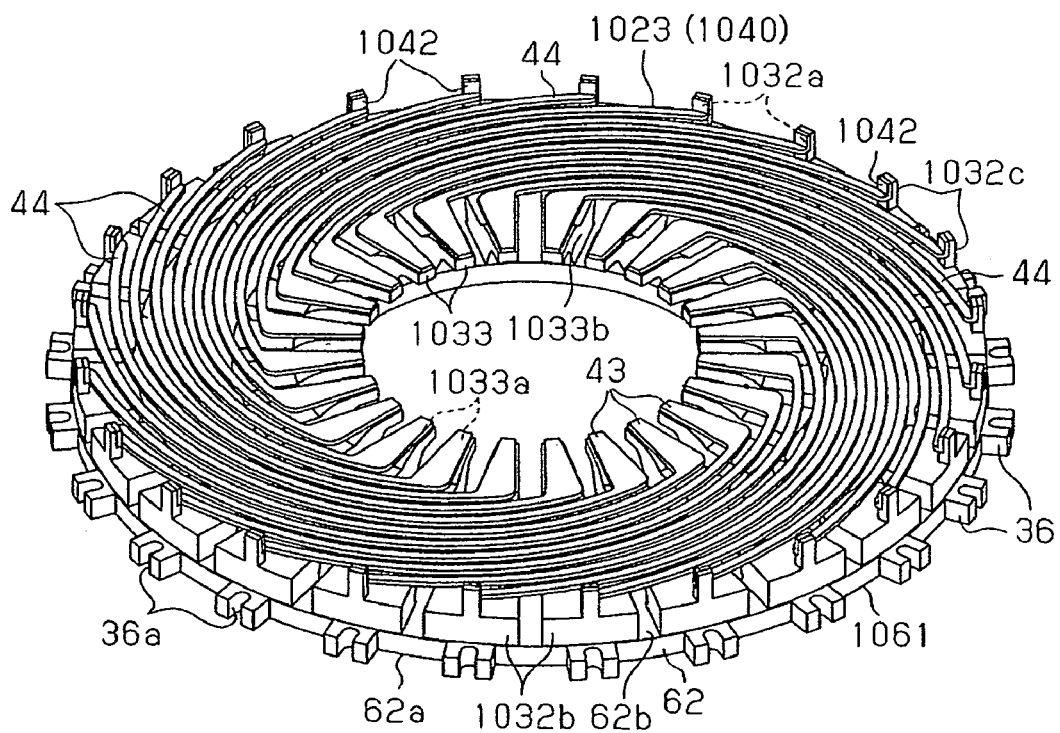
FIG. 52 is a perspective view of the mother member in FIG. 51 mounting the short-circuit unit in FIG. 50A.

As shown in FIG. 52, the short-circuit unit 1023 is arranged in the mother member 1061. The holding portion 1024 is formed in such a manner as to integrally hold the short-circuit unit 1023 and the mother member 1061. The mother member 1061 is cut into twenty-four separated segments 1022.

The coil connection portion 36 may be provided at other positions than the outer end in the radial direction of the segment main body 31.

The distal end surface 53a of the support portion 53 is not limited to exist within the same plane as the slidable contact surface 31a. The distal end surface 53a may be retracted to an inner side of the holding portion 24 in comparison with the slidable contact surface 31a.

The distal end surface 53a may protrude to an outer side of the holding portion 24 in comparison with the slidable contact surface 31a. In this case, a contact area between the outer circumferential surface of the rotary shaft 12 and the inner circumferential surface of the holding portion 24 becomes enlarged. In other words, the commutator 21 is further stably fixed to the rotary shaft 12.

The mother member 61 may be formed by press working the conductive plate member.

The mother member 61 may be formed by using a forging die. In this case, the forging is executed in such a manner that a pressure is applied to the conductive metal corresponding to the material of the mother member 61 from the axial direction of the mother member 61.

In the lower die 491 and the upper die 492 shown in FIG. 33, the filling direction of the insulative resin 493 in the molten state to the cavity 494 is not limited to the thickness direction of the mother member 161.

A part of the connection portion to the outer connection portion 32 in the outer short-circuit end 42 may be exposed from the holding portion 24. In other words, the holding portion 24 may cover at least a part of the connection portion. A part of the connection portion to the inner connection portion 33 in the inner short-circuit end 43 may be exposed from the holding portion 24. In other words, the holding portion 24 may cover at least a part of the connection portion.

The support plate 451 of the separating member 425 may be formed in a loop shape, or a polygonal shape in addition to the circular ring shape.

The support plate 451 of the separating member 425 is not limited to be formed in the ring shape, but may be formed in an arcuate shape. One ring may be structured by a plurality of arcuate shaped support plates.

Figure 53A:
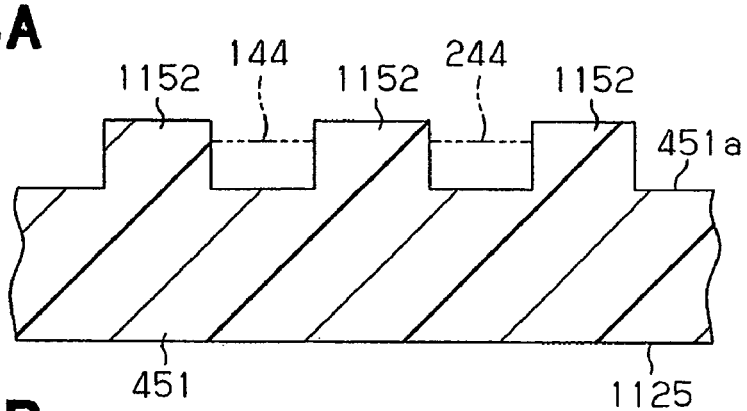
FIG. 53A is a partly cross-sectional view of a separating member in accordance with another embodiment.

As shown in FIG. 53A, a separating member 1125 may have a separating protrusion 1152 having a rectangular cross-sectional shape.

Figure 53B:
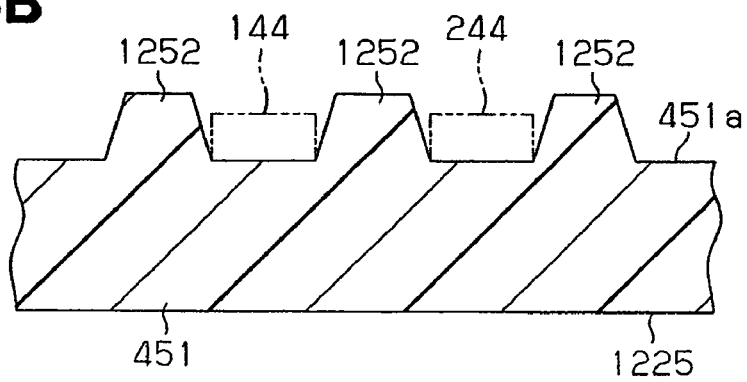
FIG. 53B is a partly cross-sectional view of a separating member in accordance with another embodiment.

As shown in FIG. 53B, a separating member 1225 may have a separating protrusion 1252 provided with a width which becomes gradually smaller toward the distal end from the contact surface 451a.

Figure 54:
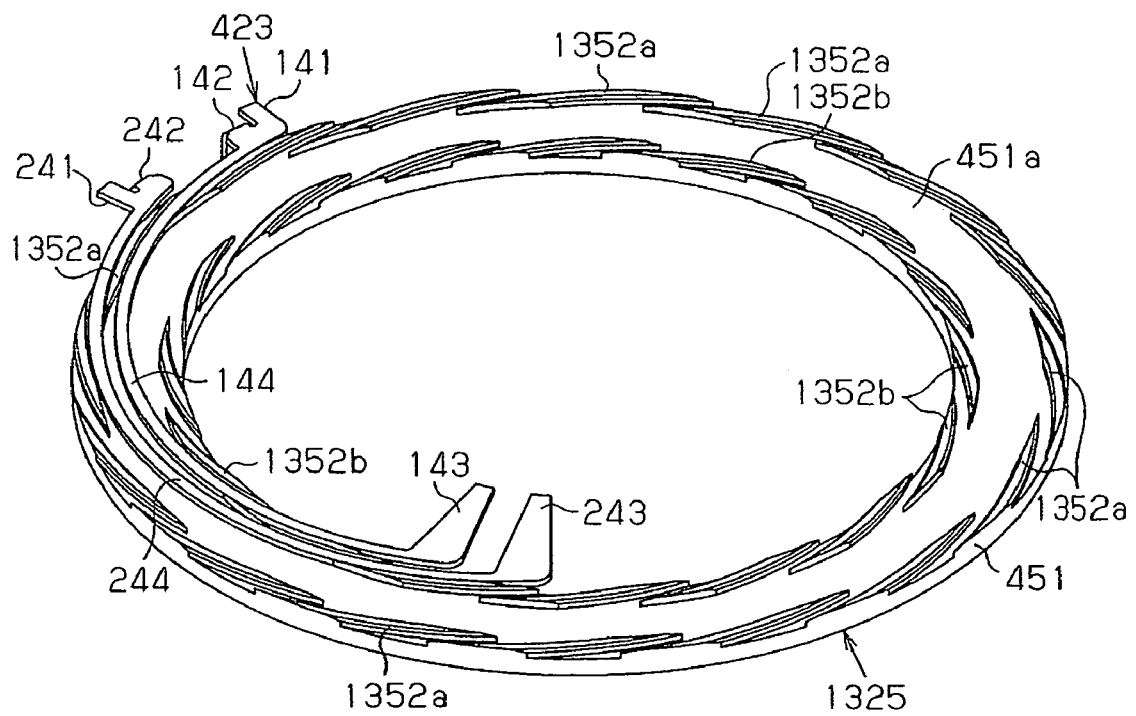
FIG. 54 is a perspective view of a separating member in accordance with another embodiment.

As shown in FIG. 54, a separating member 1325 may have a plurality of first separating protrusions 1352a which are arranged in the circumferential direction in an outer end in the radial direction of the support plate 451, and a plurality of second separating protrusions 1352b which are arranged in the circumferential direction in an inner end in the radial direction of the support plate 451. The number of the first separating protrusions 1352a is totally sixteen, and the number of the second separating protrusions 1352b is totally sixteen. Each of the first separating protrusions 1352a isolates the first short-circuit piece 141 from the second short-circuit piece 241. Each of the second separating protrusions 1352b also isolates the first short-circuit piece 141 from the second short-circuit piece 241. FIG. 54 shows only a pair of first short-circuit piece 141 and second short-circuit piece 241.

Figure 55A:
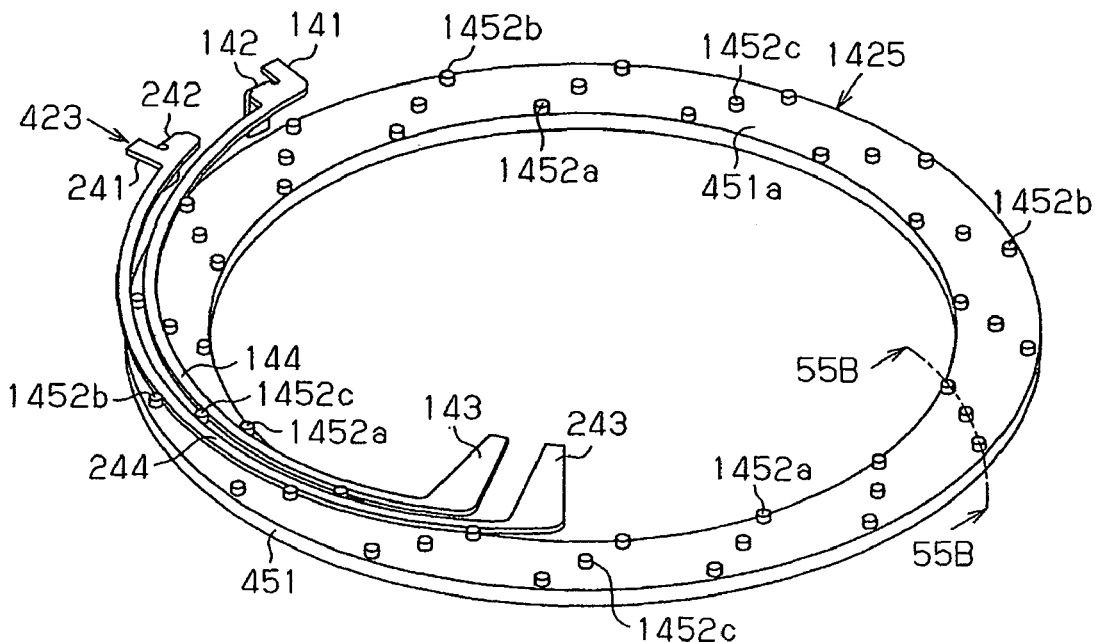
FIG. 55A is a perspective view of a separating member in accordance with another embodiment.
Figure 55B:
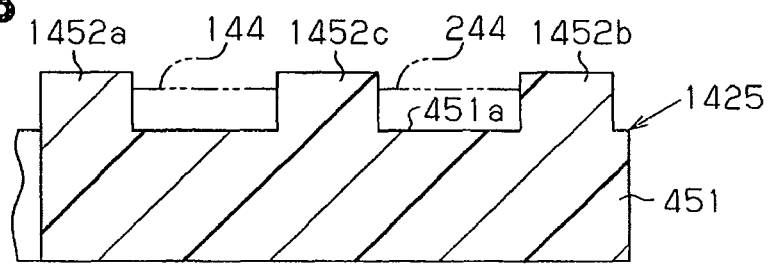
FIG. 55B is an enlarged cross-sectional view of a plurality of separating projections provided in the separating member in FIG. 55A, that is, a cross-sectional view taken along line 55B-55B in FIG. 55A.

As shown in FIGS. 55A and 55B, a separating member 1425 may have an inner separating projection 1452a protruding from the contact surface 451a of the support plate 451, an outer separating projection 1452b, and an intermediate separating projection 1452c. Each of the inner separating projection 1452a, the outer separating projection 1452b and the intermediate separating projection 1452c is formed in a columnar shape.

The inner separating projection 1452a is positioned in the inner end in the radial direction of the support plate 451. The outer separating projection 1452b is positioned in the outer end in the radial direction of the support plate 451. The intermediate separating projection 1452c is positioned in the intermediate portion with respect to the radial direction of the support plate 451. The inner separating projection 1452a, the outer separating projection 1452b and the intermediate separating projection 1452c are arranged on an involute curve. In other words, the inner separating projection 1452a, the intermediate separating projection 1452c and the outer separating projection 1452b are arranged in this order between a pair of first coupling portion 144 and second coupling portion 244.

Figure 55C:
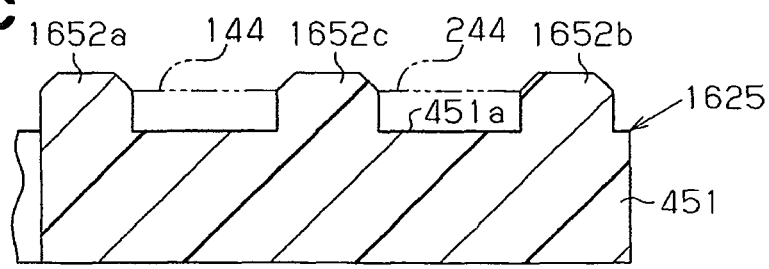
FIG. 55C is an enlarged cross-sectional view of a separating projection in accordance with another embodiment.

As shown in FIG. 55C, a separating member 1625 may have an inner separating projection 1652a, an outer separating projection 1652b and an intermediate separating projection 1652c, in which both corners of distal ends are chamfered respectively.

Figure 55D:
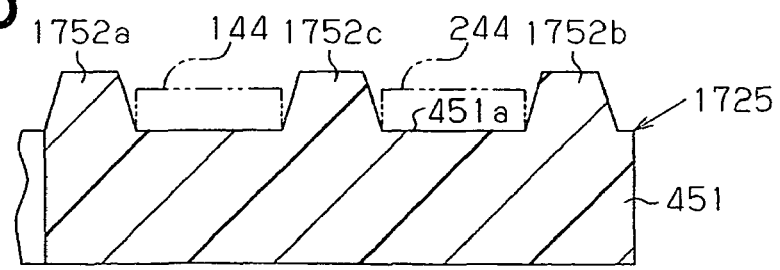
FIG. 55D is an enlarged cross-sectional view of a separating projection in accordance with another embodiment.

As shown in FIG. 55D, a separating member 1725 may have an inner separating projection 1752a, an outer separating projection 1752b and an intermediate separating projection 1752c, which respectively have a width being smaller toward the distal end from the contact surface 451a.

Each of the inner separating projection 1452a, the outer separating projection 1452b and the intermediate separating projection 1452c is not limited to the columnar shape, but may be formed in a rectangular columnar shape.

The number of the separating projections (1452a to 1452c) arranged on one involute curve mentioned above is not limited to three, but may be two or less, or may be four or more.

Figure 56:
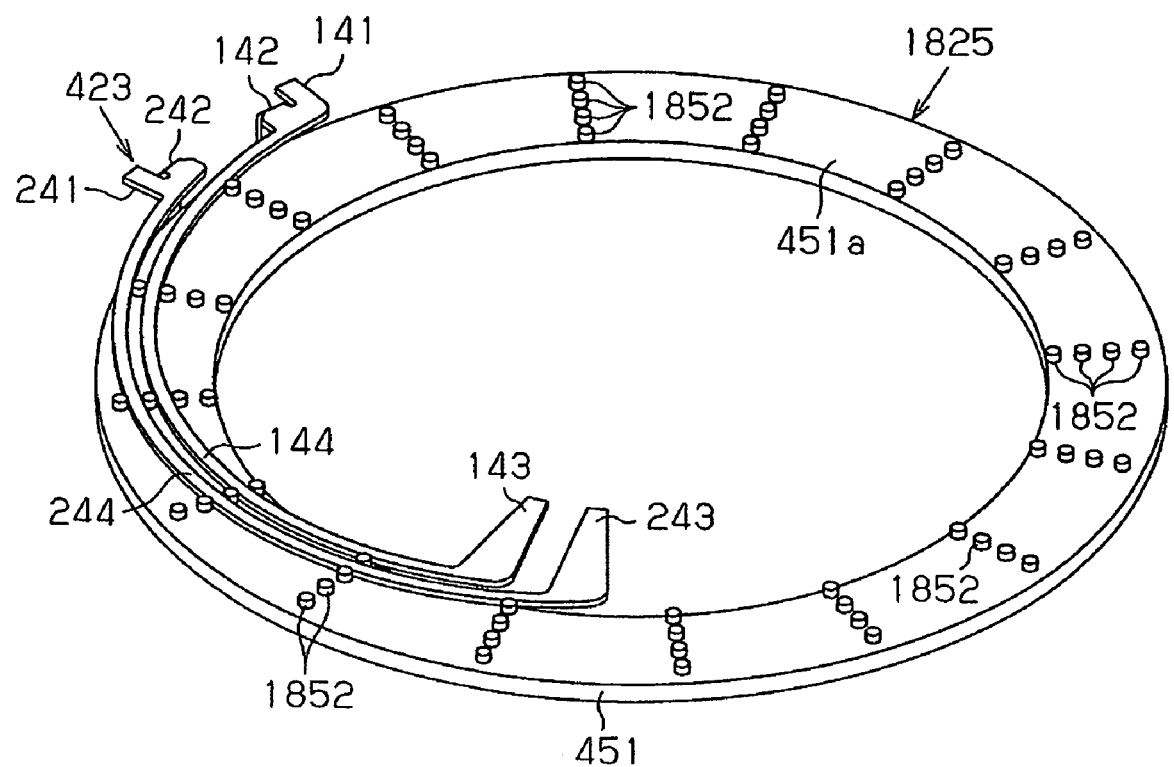
FIG. 56 is a perspective view of a separating member in accordance with another embodiment.

As shown in FIG. 56, in a separating member 1825, a plurality of separating projections 1852 may be arranged in a radial pattern. Four separating projections 1852 are arranged in the radial direction of the support plate 451.

The material of the separating member 425 is not limited to the thermosetting resin having the insulating characteristic, but may be constituted by a thermoplastic resin having an insulating characteristic. In this case, the material of the thermoplastic resin is prepared in such a manner as to prevent the separating member 425 from being softened in the cavity 494.

The short-circuit unit 23 mentioned above may be formed in a completely flat tabular shape provided with neither bent position nor curved position.

The number of the magnetic poles of the magnet 2 provided in the direct-current motor M mentioned above is not limited to six, but may be set to even numbers equal to or more than four. The number of the coils 17a to 17h may be appropriately changed in correspondence to the number of magnetic poles of the magnet 2. The number of the segments 22 is not limited to twenty-four, but may be set to be equal to twelve or more. The number of the segments 22 is desirably set to a least common multiple of the number of magnetic poles of the magnet 2 and the number of the teeth.

Although the multiple embodiments have been described herein, it will be clear to those skilled in the art that the present invention may be embodied in different specific forms without departing from the spirit of the invention. The invention is not to be limited to the details given herein, but may be modified within the scope and equivalence of the appended claims.

What is claimed is:

1. A commutator with which a feeding brush is brought into slidable contact the commutator comprising;
    a tabular holding portion defining a thickness direction, the holding portion having one end in the thickness direction;
    a plurality of segments arranged in the one end in a radial pattern, each of the segments having a slidable contact surface which is perpendicular to the thickness direction, wherein the feeding brush is brought into slidable contact with the slidable contact surface; and
    a tabular short-circuit unit short-circuiting the segments to be set to the same electric potential, the short-circuit unit being arranged parallel to the slidable contact surface, the short-circuit unit including a tabular short-circuit group, the short-circuit group including a plurality of outer short-circuit ends, the same number of inner short-circuit ends as the outer short-circuit ends, and the same number of coupling portions as the outer short-circuit ends, the outer short-circuit ends being arranged in a circumferential direction, the inner short-circuit ends being arranged in the circumferential direction in an inner side in a radial direction than the outer short-circuit ends,
    wherein all of the coupling portions respectively couple the outer short-circuit ends corresponding thereto to the inner short-circuit ends which are displaced by a predetermined angle with respect to the outer short-circuit ends, as viewed in the thickness direction,
    wherein each of the segments has an outer connection portion provided in an outer end in the radial direction, and an inner connection portion provided in an inner end in the radial direction, and
    wherein the outer short-circuit ends are connected to the outer connection portions, and the inner short-circuit ends are connected to the inner connection portions.

2. The commutator according to claim 1, wherein all of the coupling portions respectively couple the outer short-circuit ends corresponding thereto to the inner short-circuit ends which are displaced by a predetermined angle in the same direction with respect to the outer short-circuit ends, as viewed in the thickness direction.

3. The commutator according to claim 1, wherein the short-circuit group is one of a plurality of short-circuit groups, and the short-circuit unit includes a plurality of the short-circuit groups, wherein a plurality of the short-circuit groups are laminated in such a manner that the outer short-circuit ends are laminated with each other in the thickness direction, and the inner short-circuit ends are laminated with each other in the thickness direction, and
    wherein a plurality of the short-circuit groups include at least a pair of the short-circuit groups, and the pair of short-circuit groups are laminated in such a manner that the coupling portions are directed opposite to each other, and the coupling portions are in non-contact state in the laminating direction.

4. The commutator according to claim 2, wherein the short-circuit unit includes one the short-circuit group,
    wherein the segments to be set to the same electric potential are arranged so as to be spaced at an angle 9 in the circumferential direction; and
    wherein each of the coupling portions couples the outer short-circuit end corresponding thereto to the inner short-circuit end which is displaced by the angle θ from the outer short-circuit end.

5. The commutator according to claim 3, wherein the short-circuit unit includes two the short-circuit groups,
    wherein the segments to be set to the same electric potential are arranged so as to be spaced at an angle 0 in the circumferential direction, and
    wherein each of the coupling portions couples the outer short-circuit end corresponding thereto to the inner short-circuit end which is displaced by the angle (9/2) from the outer short-circuit end.

6. The commutator according to claim 1, wherein the outer short-circuit end has a connection piece extending in the thickness direction,
    wherein the connection piece is arranged in such a manner as to face an outer end in the radial direction of the segment, and
    wherein the connection piece is connected to the segment, whereby the outer short-circuit end is electrically connected to the segment.

7. The commutator according to claim 1, wherein a center portion of the holding portion has a fitting hole passing through the holding portion in the thickness direction,
    wherein the holding portion has a cylindrical boss portion provided in an opposite side to the slidable contact surface in the fitting hole, and the boss portion has an inner diameter equal to a diameter of the fitting hole, and
    wherein the short-circuit unit is arranged in an outer side in the radial direction with respect to the boss portion.

8. The commutator according to claim 1, wherein the holding portion holds both of the segments and the short-circuit unit.

9. The commutator according to claim 1, wherein each of the segments has an end surface in an opposite side to the slidable contact surface, an outer connection portion protruding from the end surface, an inner connection portion protruding from the end surface in an inner side in the radial direction than the outer connection portion, and a separating recess positioned between the outer connection portion and the inner connection portion, and
    wherein the short-circuit unit is arranged on the segments in such a manner that the outer short-circuit end is arranged on the outer connection portion, the inner short-circuit end is arranged on the inner connection portion, and the coupling portion faces the separating recess.

10. The commutator according to claim 9, wherein the holding portion has an insulating characteristic, and a part of the holding portion fills the separating recess.

11. The commutator according to claim 9, wherein the commutator is provided in an armature of a motor, and the armature has coils,
wherein each of the segments is provided with a coil connection portion connected to the coil corresponding thereto, and
wherein the coil connection portion protrudes to an outer side in the radial direction from an outer end in the radial direction of the segment.

12. The commutator according to claim 9, wherein the holding portion has a support portion provided in an inner side in the radial direction with respect to a plurality of the segments arranged in the circumferential direction,
wherein the support portion is brought into contact with an inner end in the radial direction of the segment, and
wherein the support portion has a distal surface arranged within the same plane as the slidable contact surface.

13. The commutator according to claim 1, wherein the holding portion made of the insulative resin holds the segments and the short-circuit unit,
wherein the commutator further has an insulative separating member, and
wherein the separating member has a plurality of separating projections which are respectively arranged between the coupling portions adjacent to each other in the circumferential direction.

14. The commutator according to claim 13, wherein the separating projection is constituted by a separating protrusion extending along the coupling portion between the coupling portions which are adjacent to each other in the circumferential direction.

15. The commutator according to claim 14, wherein the separating protrusion extends from one end of the coupling portion to the other end.

16. The commutator according to claim 13, wherein the separating projection is formed in a columnar shape, and is arranged at a plurality of positions between the coupling portions which are adjacent to each other in the circumferential direction.

17. The commutator according to claim 13, wherein the separating projection protrudes from the separating member, and a dimension of the separating projection between the coupling portions which are adjacent to each other becomes smaller toward a protruding end from the separating member.

18. The commutator according to claim 13, wherein the separating member made of the insulative resin has a circular ring tabular support plate, and the separating projection is provided integrally on one surface of the support plate.

19. The commutator according to claim 1, wherein the number of the outer short-circuit ends is equal to the number of the segments.

20. The commutator according to claim 1, wherein the number of the segment is $(P/2)\cdot n$, the number of the segments to be set to the same electric potential is $(P/2)$, and the number of the outer short-circuit ends is $((P/2)-1)\cdot n$.

21. A commutator with which a feeding brush is brought into slidable contact, the commutator comprising:
a plurality of segments extending in a radial pattern, each of the segments having a slidable contact surface with which the feeding brush is brought into slidable contact, an end surface in an opposite side to the slidable contact surface, an outer connection portion protruding from the end surface, an inner connection portion protruding from the end surface in an inner side in a radial direction than the outer connection portion, and a separating recess positioned between the outer connection portion and the inner connection portion;
a holding portion holding the segments in such a manner that a plurality of the slidable contact surfaces are arranged within the same plane; and
a tabular short-circuit unit short-circuiting the segments to be set to the same electric potential with each other, the short-circuit unit being arranged parallel to the slidable contact surface, and including a plurality of outer short-circuit ends, the same number of inner short-circuit ends as the outer short-circuit ends, and the same number of coupling portions as the outer short-circuit ends, the outer short-circuit ends being arranged in a circumferential direction, the inner short-circuit ends being arranged in the circumferential direction in an inner side in a radial direction than the outer short-circuit ends, each of the coupling portions coupling the outer short-circuit end corresponding thereto to the inner short-circuit end which is displaced by a predetermined angle in the circumferential direction from the outer short-circuit end, and the short-circuit unit being arranged on the segments in such a manner that the outer short-circuit ends are arranged on the outer connection portion, the inner short-circuit ends are arranged on the inner connection portion, and the coupling portions face the separating recess.

22. A commutator with which a feeding brush is brought into slidable contact, the commutator comprising:
a plurality of segments arranged in a circumferential direction, each of the segments having a slidable contact surface with which the feeding brush is brought into slidable contact;
a tabular short-circuit unit short-circuiting the segments to be set to the same electric potential with each other, the short-circuit unit being arranged parallel to the slidable contact surface, and including a tabular short-circuit group, the short-circuit group including a plurality of outer short-circuit ends, the same number of inner short-circuit ends as the outer short-circuit ends, and the same number of coupling portions as the outer short-circuit ends, the outer short-circuit ends being arranged in the circumferential direction, the inner short-circuit ends being arranged in the circumferential direction in an inner side in a radial direction than the outer short-circuit ends, all of the coupling portions respectively coupling the outer short-circuit ends corresponding thereto to the inner short-circuit ends which are displaced by a predetermined angle with respect to the outer short-circuit ends, as viewed in the thickness direction, each of the segments having an outer connection portion provided in an outer end in the radial direction and an inner connection portion provided in an inner end in the radial direction, the outer short-circuit ends being connected to the outer connection portions, and the inner short-circuit end being connected to the inner connection portions;
a holding portion made of an insulative resin, the holding portion holding the segments and the short-circuit unit; and
an insulative separating member, the separating member having a plurality of separating projections each arranged between the coupling portions which are adjacent in the circumferential direction.

* * * * *